United States Patent [19]

Altman et al.

[11] Patent Number: 4,912,549
[45] Date of Patent: Mar. 27, 1990

[54] VIDEO SIGNAL SYNCHRONIZATION SYSTEM AS FOR AN EXTENDED DEFINITION WIDESCREEN TELEVISION SIGNAL PROCESSING SYSTEM

[75] Inventors: Ted N. Altman, East Windsor; Charles B. Dieterich, S. Brunswick Twp., Middlesex Co.; Tzy-Hong Chao, Morrisville, all of N.J.

[73] Assignee: RCA Licensing Corporation, Princeton, N.J.

[21] Appl. No.: 241,277

[22] Filed: Sep. 7, 1988

[51] Int. Cl.[4] .............................................. H04N 5/073
[52] U.S. Cl. ...................................... 358/17; 358/150; 358/149; 358/153
[58] Field of Search .................. 358/17, 12, 142, 150, 358/152, 141, 148, 21 V, 21 R, 153, 149

[56] References Cited

U.S. PATENT DOCUMENTS

| | | | |
|---|---|---|---|
| 4,159,486 | 6/1979 | Lacy | 358/186 |
| 4,309,721 | 1/1982 | Christropher | 358/128.5 |
| 4,660,072 | 4/1987 | Fukinuki | 358/12 |
| 4,670,786 | 6/1987 | Ricciardi | 358/149 |
| 4,672,443 | 6/1987 | Dischert et al. | 358/141 X |
| 4,730,215 | 3/1988 | Jose et al. | 358/12 X |
| 4,782,383 | 11/1988 | Isnardi | 358/12 |
| 4,816,899 | 3/1989 | Strolle et al. | 358/141 |
| 4,837,611 | 6/1989 | Faroudja | 358/12 |
| 4,839,720 | 6/1989 | Isnardi | 358/12 |
| 4,845,562 | 7/1989 | Koslov et al. | 358/141 |

OTHER PUBLICATIONS

Hopkins, R. "Advanced Television Systems", IEEE Trans. on Consumer Electronics, Feb. 1988, pp. 1–15.
Yasumoto, Y. et al. "A Wide Aspect Ratio Television System with Full NTSC Compatibility, IEEE Trans. on Consumer Electronics", Feb. 1988, pp. 121–127.
Matsuvra, S. "Ghost Canceller Control Reference Signals are Inserted Into TV Signal", Nikkei Electronics Oct. 1987, pp. 213–225.
Miki, Y. et al. "A Ghost Cancelling Reference Signal by Pseudo Random Sequence", National Convention of the Television Society, 1987, pp. 333–334.
Yasumoto, Y. et al. "An Extended Definition Television System Using Quadrature Modulation of the Video Carrier with Inverse Nyquist Filter", IEEE Trans. on Consumer Electronics Aug. 1987, pp. 173–180.

Primary Examiner—Howard W. Britton
Assistant Examiner—Mark R. Powell
Attorney, Agent, or Firm—Joseph S. Tripoli; Eric P. Herrmann; James B. Hayes

[57] ABSTRACT

Apparatus and method of synchronizing the component signals of a multi-component augmented television signal between its generation reception are disclosed. The disclosed apparatus includes circuitry which generates a training signal that indicates the position of the first pixel in each horizontal line interval of the video signal. This training signal is inserted into one horizontal line interval of the active video signal for transmission. The receiver includes circuitry which separates the training signal and derives a timing signal from it. The timing signal is used to define the pixel positions of various decoded components of the received video signal to facilitate their combination. The timing signal is also used to align the color subcarrier signal and to generate other carrier and subcarrier signals used in the decoding process. Two training signals are disclosed: a pseudo-random noise sequence and a time-reversed, all-pass filtered, raised-cosine 2T pulse.

21 Claims, 39 Drawing Sheets

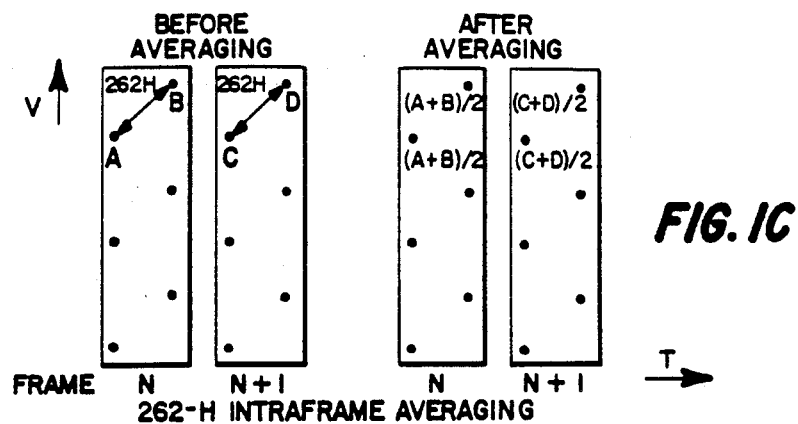
FIG. IC
262-H INTRAFRAME AVERAGING
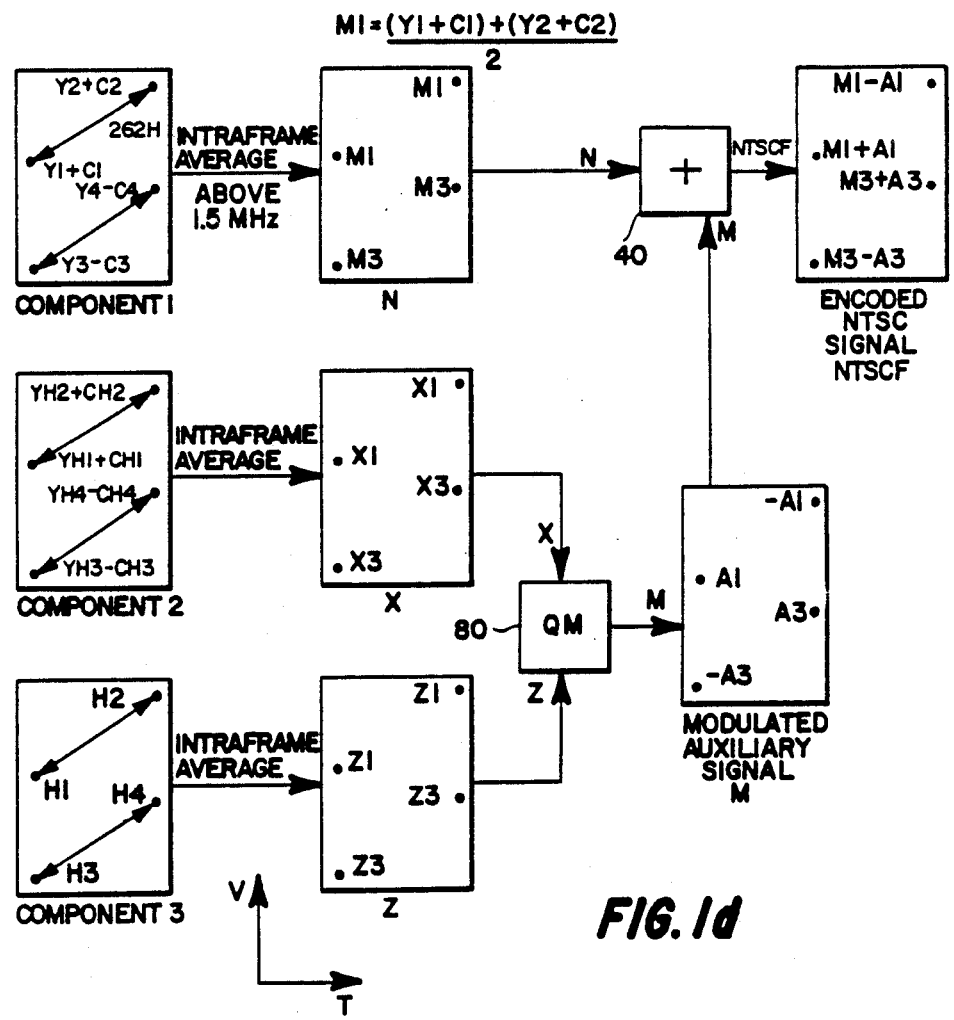
FIG. Id

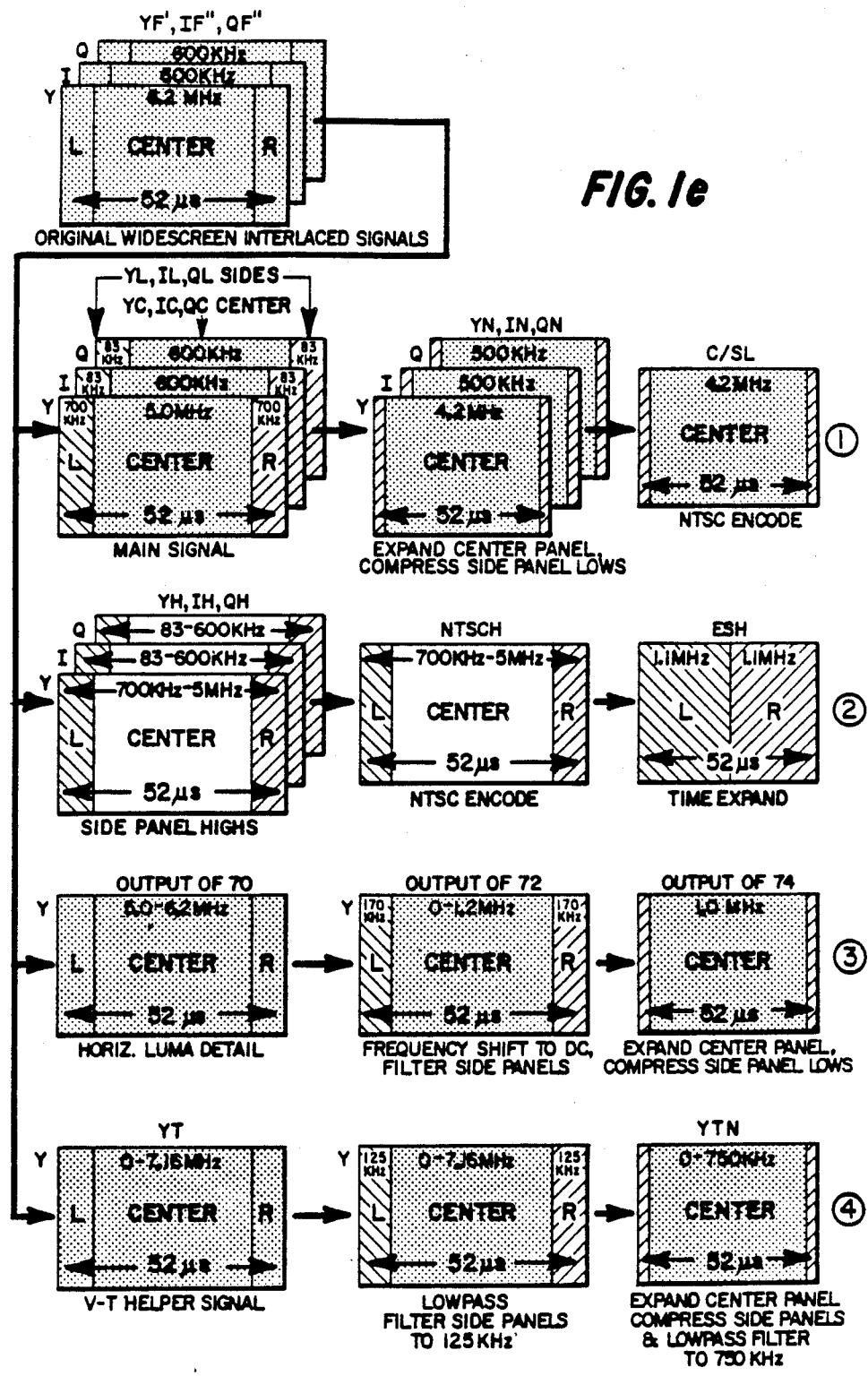

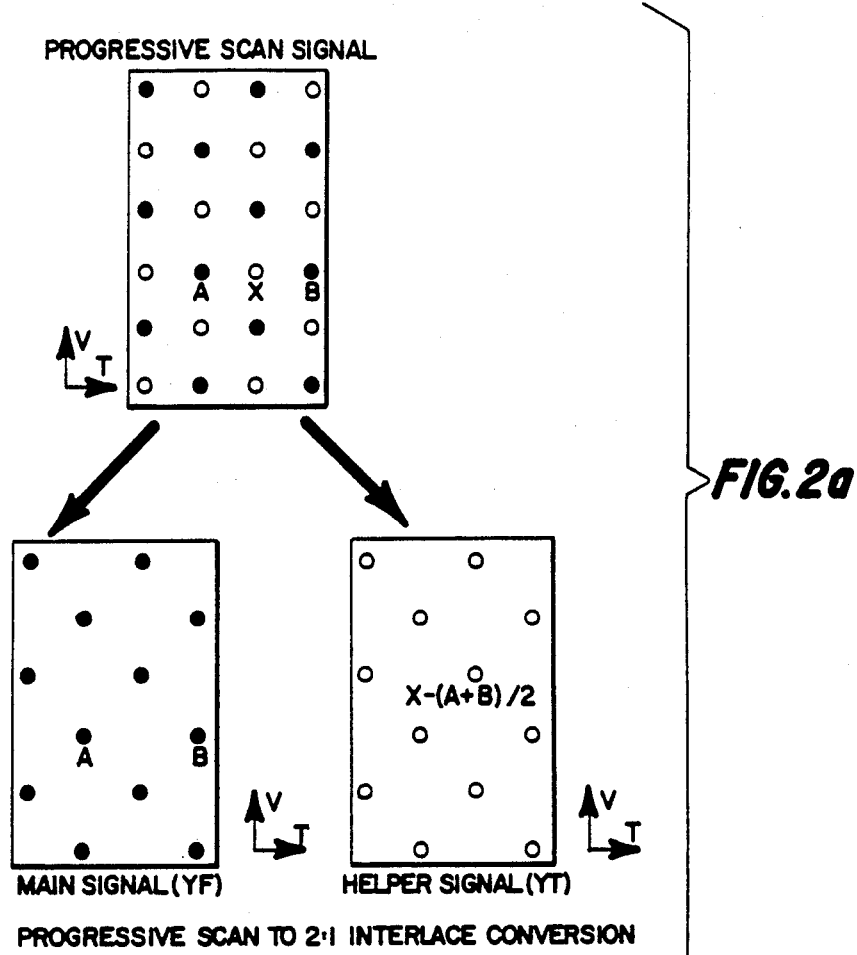

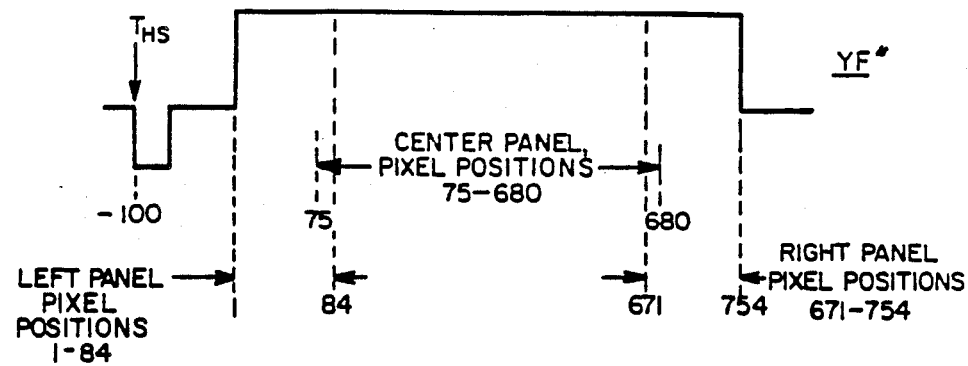
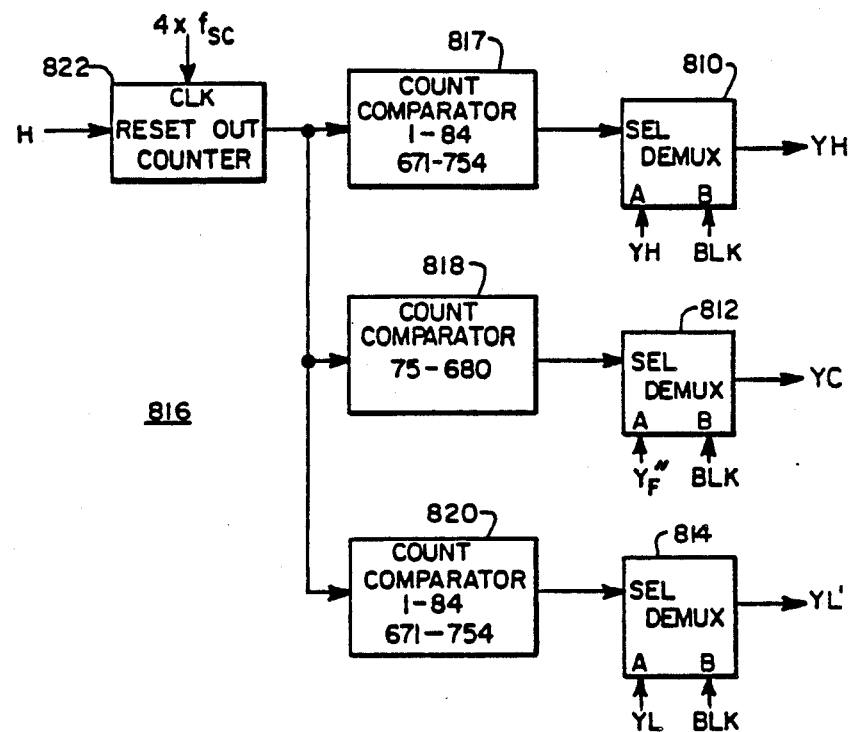
FIG. 8

| | WEIGHTING COEFFICIENTS | | | | | | | | |
|---|---|---|---|---|---|---|---|---|---|
| | a1 | a2 | a3 | a4 | a5 | a6 | a7 | a8 | a9 |
| V-T BANDPASS FILTER | $\frac{1}{16}$ | $-\frac{1}{8}$ | $\frac{1}{8}$ | $-\frac{1}{16}$ | $\frac{1}{4}$ | $-\frac{1}{16}$ | $\frac{1}{8}$ | $-\frac{1}{8}$ | $-\frac{1}{16}$ |
| V-T BANDSTOP FILTER | $\frac{1}{16}$ | $\frac{1}{8}$ | $-\frac{1}{8}$ | $\frac{1}{16}$ | $\frac{3}{4}$ | $\frac{1}{16}$ | $-\frac{1}{8}$ | $\frac{1}{8}$ | $\frac{1}{16}$ |
*FIG. 10a*
*FIG. 10b*
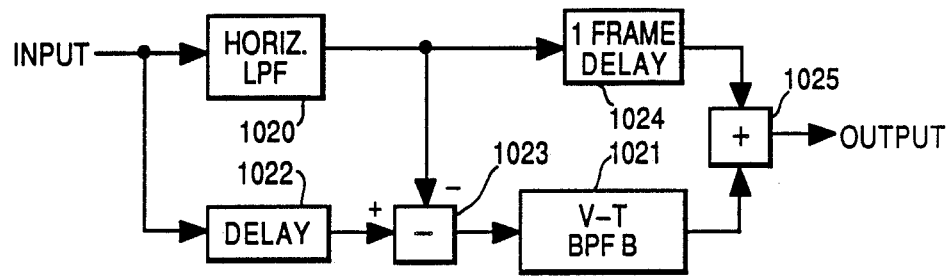
*FIG. 10c*
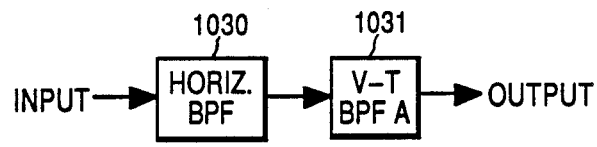

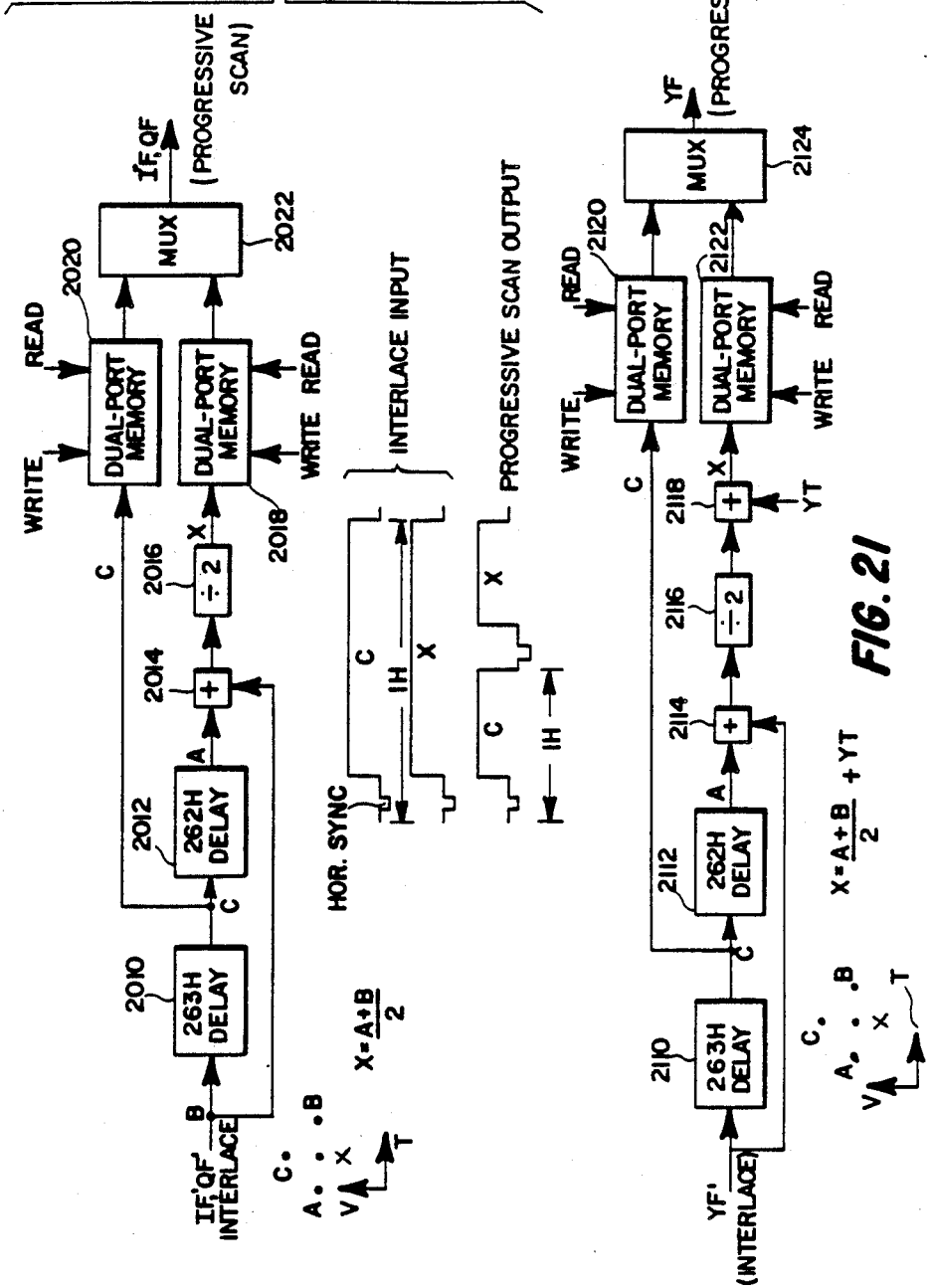

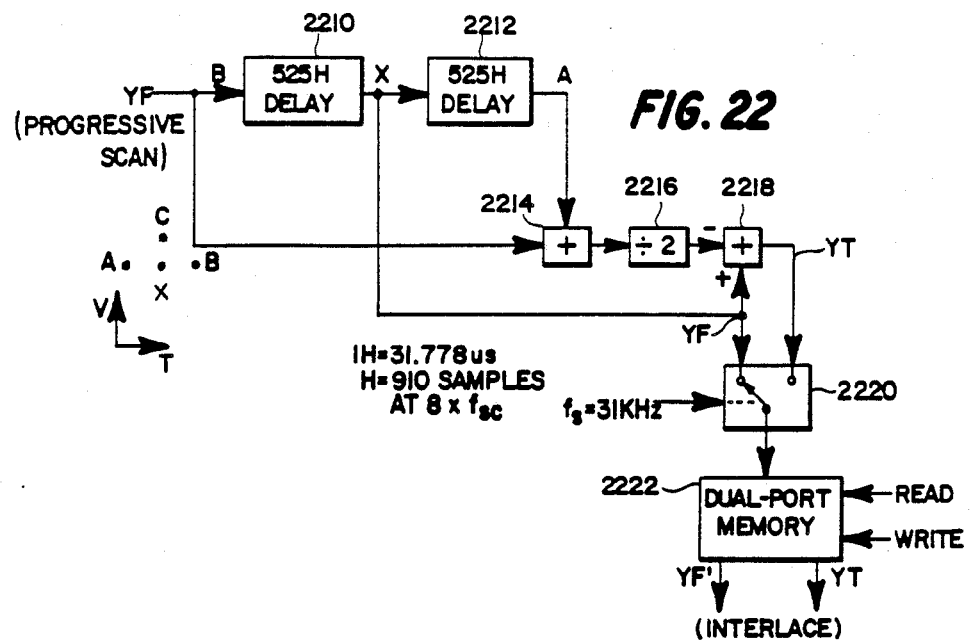

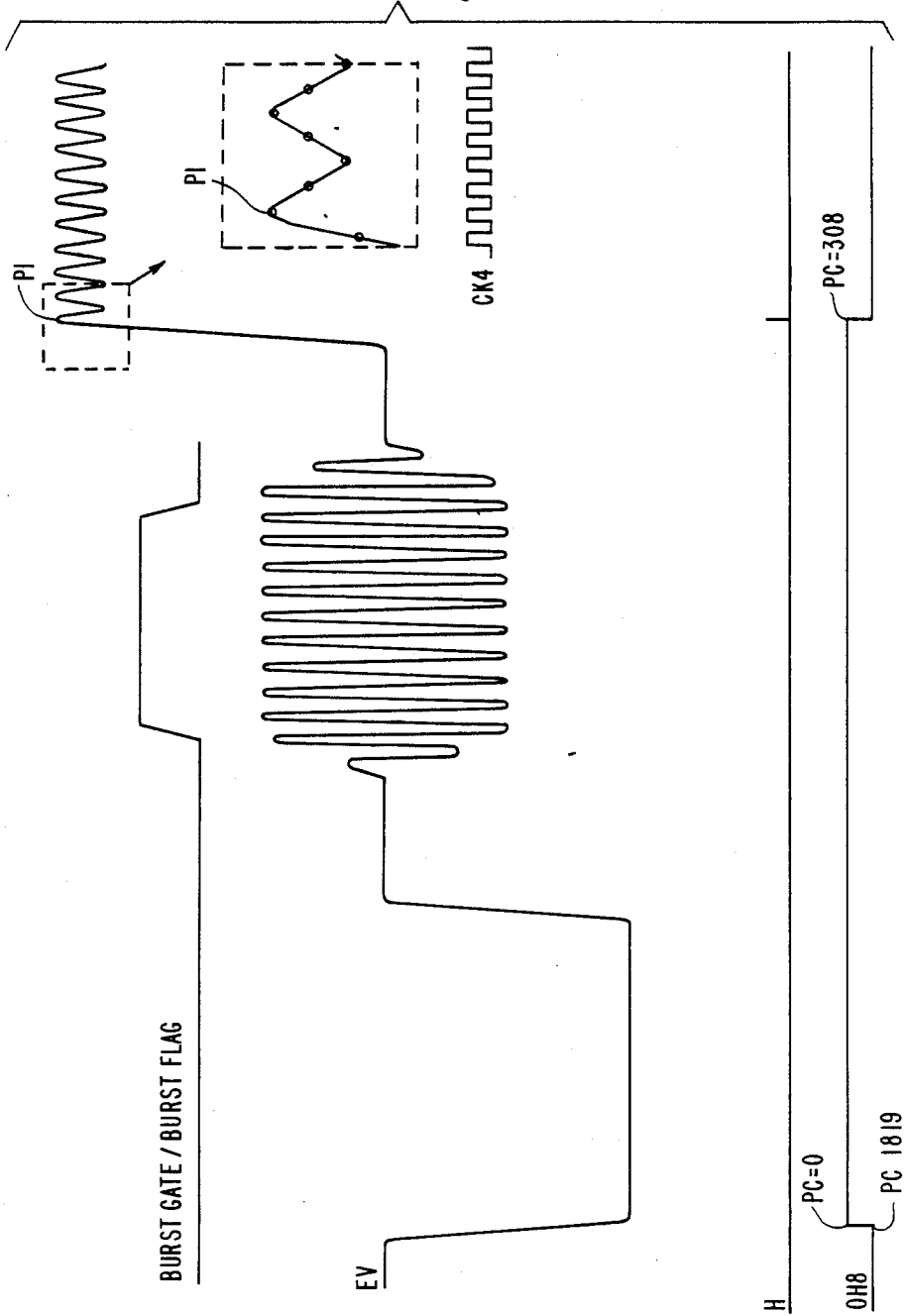

ALL-PASS FILTERED RAISED-COSINE 2T PULSE

RAISED-COSINE 2T PULSE

VIDEO SIGNAL SYNCHRONIZATION SYSTEM AS FOR AN EXTENDED DEFINITION WIDESCREEN TELEVISION SIGNAL PROCESSING SYSTEM

BACKGROUND OF THE INVENTION

This invention relates to apparatus and a method for synchronizing various component signals of an augmented television signal so that they may be properly recombined at a receiver to reproduce an enhanced image.

A conventional television receiver, such as a receiver in accordance with NTSC broadcast standards adopted in the United States and elsewhere, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate or equal the aspect ratio of the human eye than does the 4:3 aspect ratio of a conventional television receiver. Video images having a 5:3 aspect ratio have received particular attention since this ratio approximates that of motion picture film. However, widescreen television systems which simply transmit signals having an increased aspect ratio as compared to conventional systems are incompatible with conventional aspect ratio receivers. This makes widespread adoption of widescreen systems difficult.

It is therefore desirable to have a widescreen system which is compatible with conventional television receivers. One such system is disclosed in a copending U.S. patent application of C. H. Strolle et al., Ser. No. 078,150 now U.S. Pat. No. 4,816,899, "Widescreen Television System", filed July 27, 1987.

It is even more desirable to have such a compatible widescreen system with provisions for enhancing or extending the definition of the displayed image so as to provide extra image detail. For example, such widescreen EDTV (extended definition television) system may include apparatus for providing a progressively scanned image.

EDTV systems have been proposed which include provisions for inserting a signal representing the more detailed areas of an image into a portion of the video spectrum which is currently unused or which is not used efficiently under current television standards. One of these proposals is set forth in U.S. Pat. No. 4,660,072 issued in the name of T. Fukinuki on Apr. 21, 1987 and hereby incorporated by reference. A second proposal is presented in an article by Y. Yasumoto et al. "An Extended Definition Television System Using Quadrature Modulation of the Video Carrier with Inverse Nyquist Filter" IEEE Transactions on Consumer Electronics, August, 1987, PP 173–180, which is hereby incorporated by reference. A third proposal is presented in an article by M. A. Isnardi et al. entitled "Decoding Issues in the ACTV System", IEEE Transactions on Consumer Electronics, February 1988, pp 111–120, which is hereby incorporated by reference.

In the Fukinuki proposal, relatively high frequency information is separated from an original high definition video signal, frequency converted to occupy a lower band of frequencies and then modulated onto an alternate subcarrier signal which is within the frequency spectrum of a conventional video signal. This alternate subcarrier signal, like the chrominance subcarrier signal of a conventional composite video signal, is an odd multiple of one-half the horizontal line frequency but, unlike the chrominance subcarrier signal, it switches in phase by 180° from field to field. This modulated alternate subcarrier signal may be substantially recovered at the receiver.

In the receiver, the high resolution signal is recovered from the modulated alternate subcarrier, restored to its original band of frequencies and added to the conventionally decoded luminance signal to produce a high definition luminance signal.

The Yasumoto et al. proposal uses an enhancement signal which may represent either high frequency luminance information or side-panel information needed to expand the aspect ratio of a transmitted image from 4:3 to, for example, 5:3. This enhancement signal is frequency converted to occupy a lower band of frequencies and then modulated onto a carrier which is in quadrature phase relative to the picture carrier signal of the transmitted video signal.

At the receiver, this enhancement signal is recovered by synchronous demodulation of the video signal. The recovered signal is then frequency converted to occupy its original band of frequencies and combined with the conventionally processed video signal to produce an enhanced (high definition or widescreen) video image.

The Isnardi et al. proposal compresses side panel low frequency information of a widescreen image into the horizontal overscan region of a compatible NTSC Television signal. The high frequency information for the side panels and high frequency information for the entire widescreen image are quadrature modulated onto an interlaced carrier which changes phase by 180° from field to field. A fourth signal component, which is used to reconstruct a progressive scan image from the interlace scan signal, is modulated in quadrature with the combined first three components onto the video carrier signal.

At the receiver, a combination of synchronous demodulation and intra-frame processing is used to recover the four components. These components are combined to produce an extended definition television signal.

In any of the systems described above, slight timing errors may occur in the signals used for frequency-converting the enhancement signals at the transmitter and at the receiver, or in signals used to determine relative pixel locations of the side panel and center panel information for the extended definition and/or enhanced aspect ratio image. These timing errors may distort the reproduced enhanced image causing, for example, dark areas of detailed information to appear erroneously bright or causing visible seams where the side panel and center panel regions of a wide aspect ratio image are joined.

SUMMARY OF THE INVENTION

The present invention is embodied in apparatus for synchronizing the various components of an augmented video signal after it is received. The apparatus includes circuitry in a video signal generation system for producing a training signal which is indicative of an instant in time and circuitry for adding the training signal to the augmented video signal. In the receiver, the apparatus includes circuitry for processing the training signal component of the augmented video signal to develop a reference time signal and circuitry for aligning components of said augmented video signal to the reference time signal.

BRIEF DESCRIPTION OF THE DRAWING

FIGS. 1b-1e contain diagrams helpful in understanding the operation of the disclosed system;

FIGS. 6-12 and 14-27 illustrate aspects of the disclosed system in greater detail.

DETAILED DESCRIPTION

Figure 1:
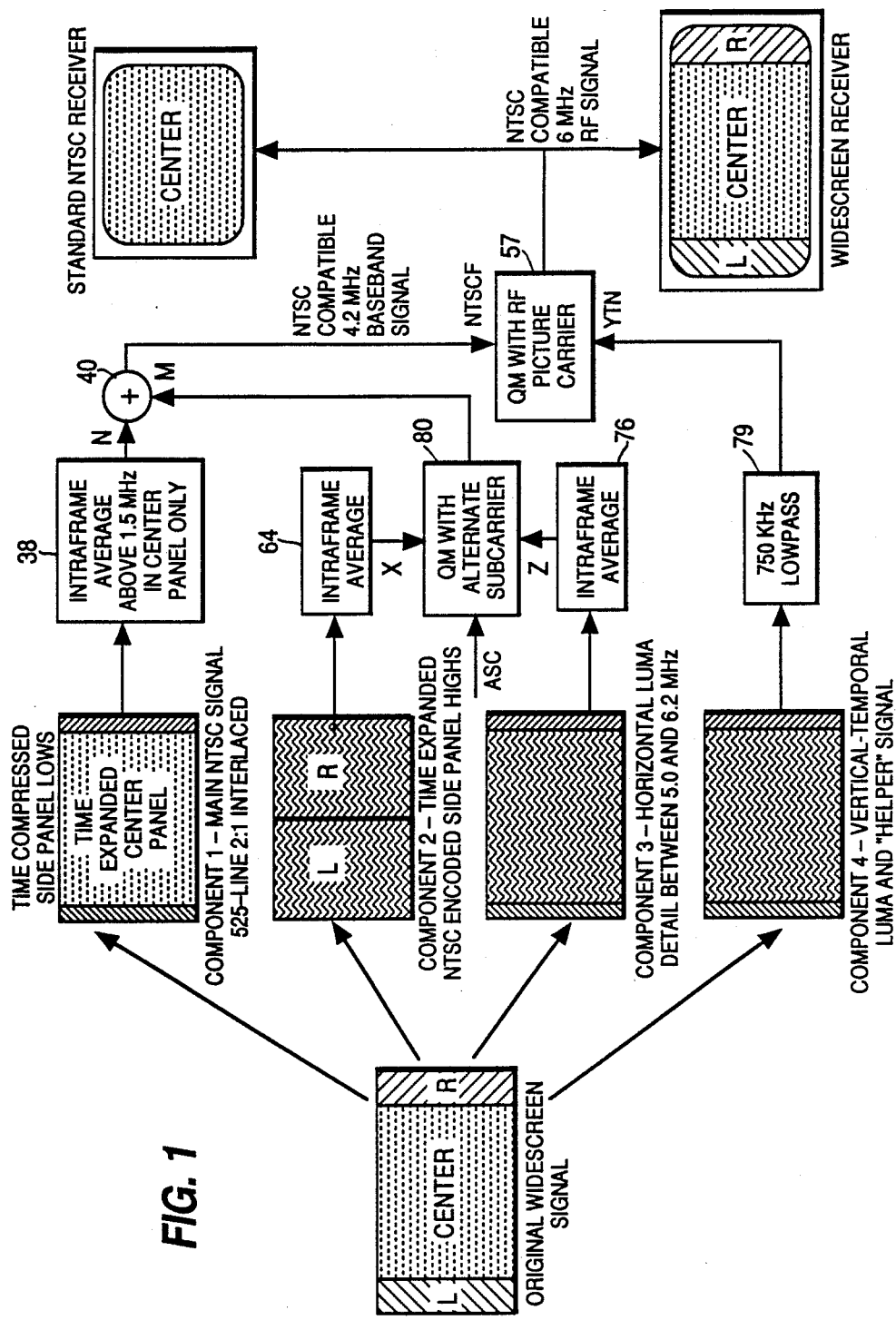
FIG. 1 illustrates a general overview of a compatible widescreen EDTV encoder system in accordance with the present invention.

In the drawings, single line arrows may represent busses for conveying multiple bit parallel digital signals, or signal paths for conveying analog signals or single bit digital signals. The type of signal conveyed by a bus or signal path is made clear in the context in which it is discussed. As will be appreciated by those skilled in the art, apparatus for providing compensating delays may be required in certain of the signal paths. Such delay apparatus is not shown to simplify the description.

The system shown in FIG. 1 is substantially the same as the encoder set forth in the above-referenced article by Isnardi et al.

Figure 1A:
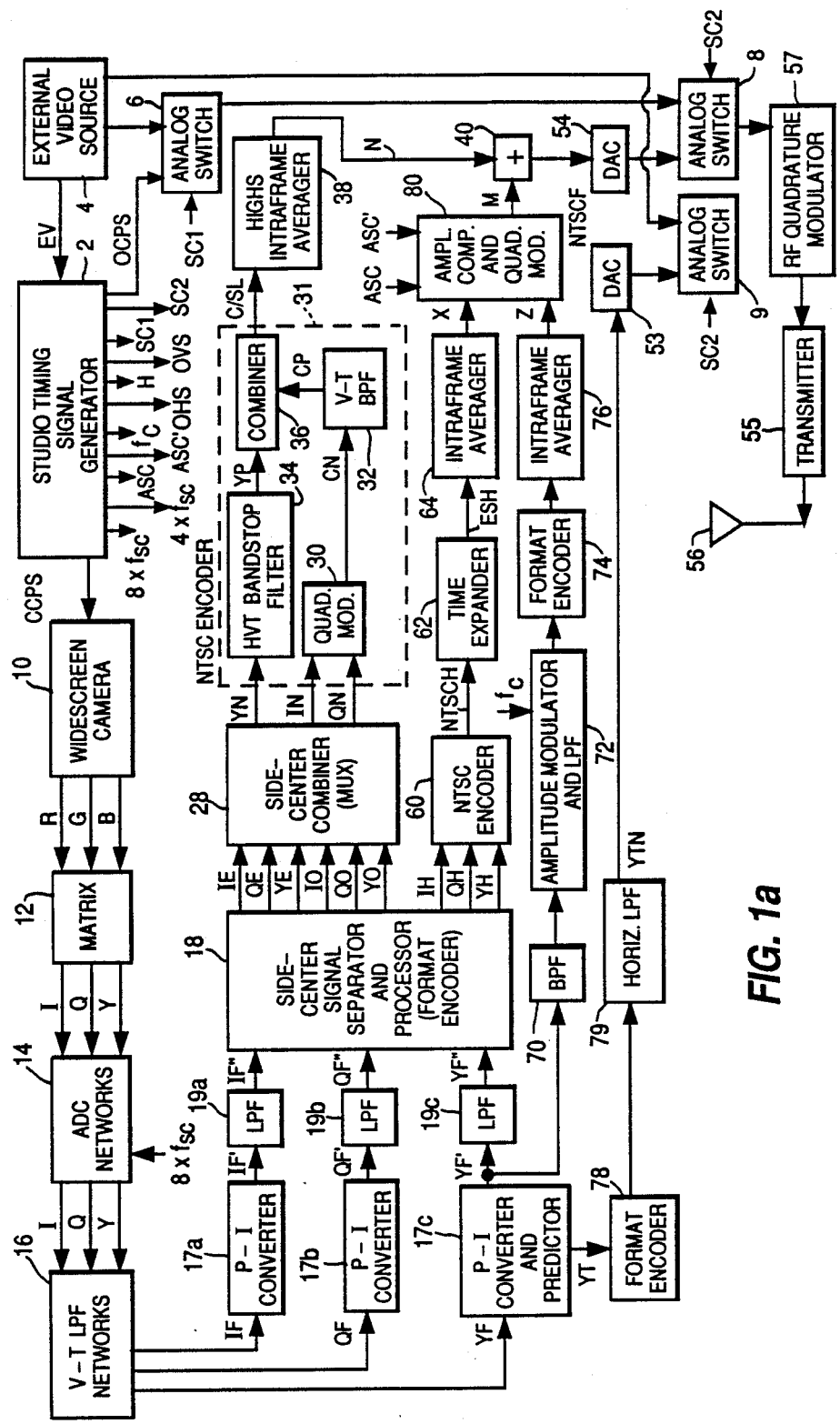
FIG. 1a shows a detailed block diagram of the encoder for the disclosed system.

In this system, elements which are common to the more detailed system of FIG. 1a are identified by the same reference number. As shown in FIG. 1, an original widescreen progressive-scan signal with left, right and center panel information is processed so as to develop four separate encoding components. These four components are illustrated generally in FIG. 1 in the context of an image display. Processing of the first component, which contains time expanded center panel pixel data and time compressed side panel pixel data, is such that the resulting luminance bandwidth does not exceed the NTSC luminance bandwidth of 4.2 MHz. This signal is color encoded in standard NTSC format, and the luminance and chrominance components of this signal are suitably pre-filtered (e.g., using field comb filters) to provide improved luminance-chrominance separation at both standard NTSC and widescreen receivers. In processing signals which represent the first component, the relative timing of the portions of the signal which represent the side and center panels is important. Even a slight error in the relative timing of these components may produce a visible seam in the reproduced image.

The second component, which includes side panel high frequency information, is time expanded to reduce its horizontal bandwidth to about 1.1 MHz. This component is spatially uncorrelated with the main signal (the first component), and special precautions are taken to mask its visibility on standard NTSC receivers. These precautions are described below. The relative timing of the side and center panel signal components is important for the second component as well. In addition, since, as described below, component 2 is quadrature modulated with component 3 onto an alternate subcarrier. The alternate subcarrier is desirably kept in strict phase alignment between the transmitter and the receiver.

The 5.0 to 6.2 MHz extended high-frequency luminance information for the center panel region is contained in the third component. This component is first heterodyned to occupy a frequency range of 0 to 1.2 MHz and then mapped into the standard 4:3 format. The mapping operation spatially correlates the third component with the main signal (the first component) to mask its visibility on standard NTSC receivers. The compressed side panel information of the third component exhibits a bandwidth which is one-sixth that of the center information (0-1.2 MHz). For the third component, the relative timing of the side and center panel signals, the phase of the alternate subcarrier signal and the frequency and phase of the 5 MHz signal used to shift the frequency spectrum of the third component between 5-6.2 MHz and 0-1.2 MHz are all of great importance.

It is contemplated that the processing of the component 3 signals may be simplified by compressing an entire field of component 3 signal into the center panel region instead of expanding the center panel portion and compressing the side panel portion as shown. This alternative technique could produce slightly lower center panel resolution, improved side panel resolution and would simplify the circuits used to decode the component 3 signal at the receiver. This modification would also make the circuits which process the component 3 signals less sensitive to the relative timing of the signals representing the side and center panel portions of the image.

The fourth component is a vertical-temporal helper signal which is used to convert the received interlace scan signal into a progressive scan format. This signal is mapped into standard 4:3 format to correlate it with the main signal component and thereby mask its visibility on standard NTSC receivers. The horizontal bandwidth of the vertical-temporal helper signal is limited to 750 KHa.

In FIG. 1, the first, second, and third components are processed by respective intraframe averagers 38, 64, and 76 (a type of vertical-temporal (V-T) filter) to eliminate V-T crosstalk between the main and auxiliary signal components at a widescreen receiver. The first component is intraframe averaged only above 1.5 MHz. The second and third intraframe averaged components, identified as X and Z, are non-linearly amplitude compressed and then used to quadrature modulate, in a block 80, a 3.108 MHz alternate subcarrier signal ASC, having a phase which alternates by 180° from line-to-line and from field to field. A modulated signal (M) from block 80 is added to the intraframe averaged first component (N) in an adder 40. The output signal produced by the adder 40 is a 4.2 MHz bandwidth baseband signal (NTSCF). To aid in synchronizing the receiver to the signal provided by the transmitter, a composite synchronizing signal and a training signal which specifies the timing of the first pixel on each horizontal line of a field are inserted into the signal NTSCF as described below. The signal NTSCF and a 750 KHz low pass filtered fourth component (YTN) from a filter 79, are used to quadrature modulate an RF picture carrier in a block 57 to produce an NTSC compatible RF signal. This signal can be transmitted to a standard NTSC receiver or a widescreen progressive scan receiver via a single, standard bandwidth, broadcast channel.

When received by a standard NTSC receiver, only the center panel portion of the main signal (the first component) is seen. The second and third components may create a low amplitude interference pattern that is not perceived at normal viewing distances and at normal picture control settings. The fourth component is removed completely in receivers with synchronous video detectors. In receivers with envelope detectors, the fourth component is processed but not perceived because it is correlated with the main signal.

Figure 1B:
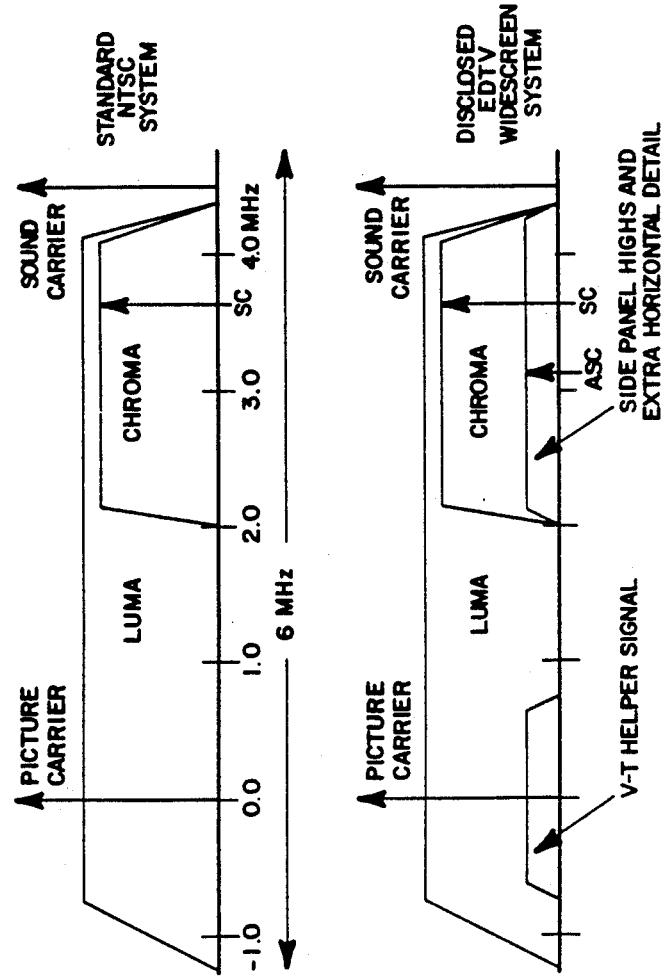

FIG. 1b illustrates the RF spectrum of the disclosed EDTV widescreen system, including the auxiliary information, compared to the RF spectrum of a standard NTSC system. In the spectrum of the disclosed system the side panel highs and the extra high frequency horizontal luminance detail information extend approximately 1.1 MHz on either side of the 3.108 MHz alternate subcarrier (ASC) frequency. The V-T helper signal information (component 4) extends 750 KHz on either side of the main signal picture carrier frequency.

A widescreen progressive scan receiver includes apparatus for reconstructing the original widescreen Progressive scan signal. Compared to a standard NTSC signal, the reconstructed widescreen signal has left and right side panels with standard NTSC resolution, and a 4:3 aspect ratio center panel with superior horizontal and vertical luminance detail, particularly in stationary portions of an image.

Two basic considerations govern the signal processing associated with the development and processing of the first, second, third, and fourth signal components. These considerations are compatibility with existing receivers, and recoverability at the receiver.

Full compatibility implies receiver and transmitter compatibility such that existing standard receivers can receive widescreen EDTV signals and produce a standard display without special adaptors. Compatibility in this sense requires, for example, that the transmitter image scanning format is substantially the same as, or within the tolerance of, the receiver image scanning format. Compatibility also means that extra non-standard signal components are desirably physically or perceptually hidden in the image produced on a standard receiver. To achieve compatibility in the latter sense, the disclosed system uses techniques described below to hide the auxiliary components.

Recovery of components 1, 2, and 3 at a widescreen progressive scan receiver is aided by the use of intraframe averaging at the transmitter and receiver. Intraframe averaging is one signal conditioning technique that prepares two signals which are to be combined so that they can be recovered efficiently and accurately afterwards. The type of signal conditioning employed for this purpose essentially involves making two signals identical on a field basis. Intraframe averaging is a convenient technique for achieving this objective, but other techniques can also be used. Intraframe averaging is basically a linear, time varying digital pre-filtering and post-filtering process.

The process of intraframe averaging in the time domain is illustrated generally by FIG. 1c, wherein pairs of fields are made identical by averaging pairs pixels (A, B and C,D) that are 262H apart. The average value replaces both of the original values of each pair. FIG. 1d illustrates the process of intraframe averaging in the context of the system of FIG. 1. Starting with components 2 and 3, pairs of pixels (picture elements) 262H apart are averaged, and the average value (e.g., X1, X3 and Z1, Z3) replaces the original pixel values. This V-T averaging only occurs within a frame, it does not cross frame boundaries. In the case of component 1, intraframe averaging is performed only on information above approximately 1.5 MHz so as not to affect lower frequency vertical detail information. In the case of components 1 and 2, intraframe averaging is performed on a composite signal including luminance (Y) and chrominance (C) components throughout the chrominance band. The chrominance component of the composite signal survives intraframe averaging because pixels 262H apart are "in-phase" with respect to the color subcarrier. The phase of the new alternate subcarrier is controlled so that it is exactly out of phase for pixels 262H apart. Thus when components 2 and 3 (after quadrature modulation) are added to component 1 in unit 40, pixels 262H apart have the form (M+A) and (M−A), where M is a sample of the main composite signal above 1.5 MHz, and A is a sample of the auxiliary modulated signal.

With intraframe averaging, V-T crosstalk is virtually eliminated, even in the presence of motion. At the receiver it is a simple matter to recover the main and auxiliary signals exactly, i.e., free from crosstalk, by averaging and differencing pixel samples 262H apart within a frame as described below. Also at the receiver, components 2 and 3 are separated by quadrature demodulation and component 4 is recovered by quadrature demodulation using a synchronous RF detector.

In a widescreen DTV receiver, after the training signal and the four video signal components have been recovered, the composite signals are NTSC decoded and separated into luminance and chrominance components. Using timing data obtained from the training signal, inverse mapping is performed on all components to recover the widescreen aspect ratio, and the side panel highs are combined with the lows to recover full side panel resolution. The extended high frequency luminance detail information is shifted to its original frequency range and added to the luminance signal, which is converted to a progressively scanned format using temporal interpolation assisted by the helper signal. The chrominance signal is converted to progressive scan format using unassisted temporal interpolation. Finally, the progressive scan luminance and chrominance signals are converted to analog form and matrixed to produce R, G, and B color image signals for display by a widescreen progressively scanned display device.

Figure 2:
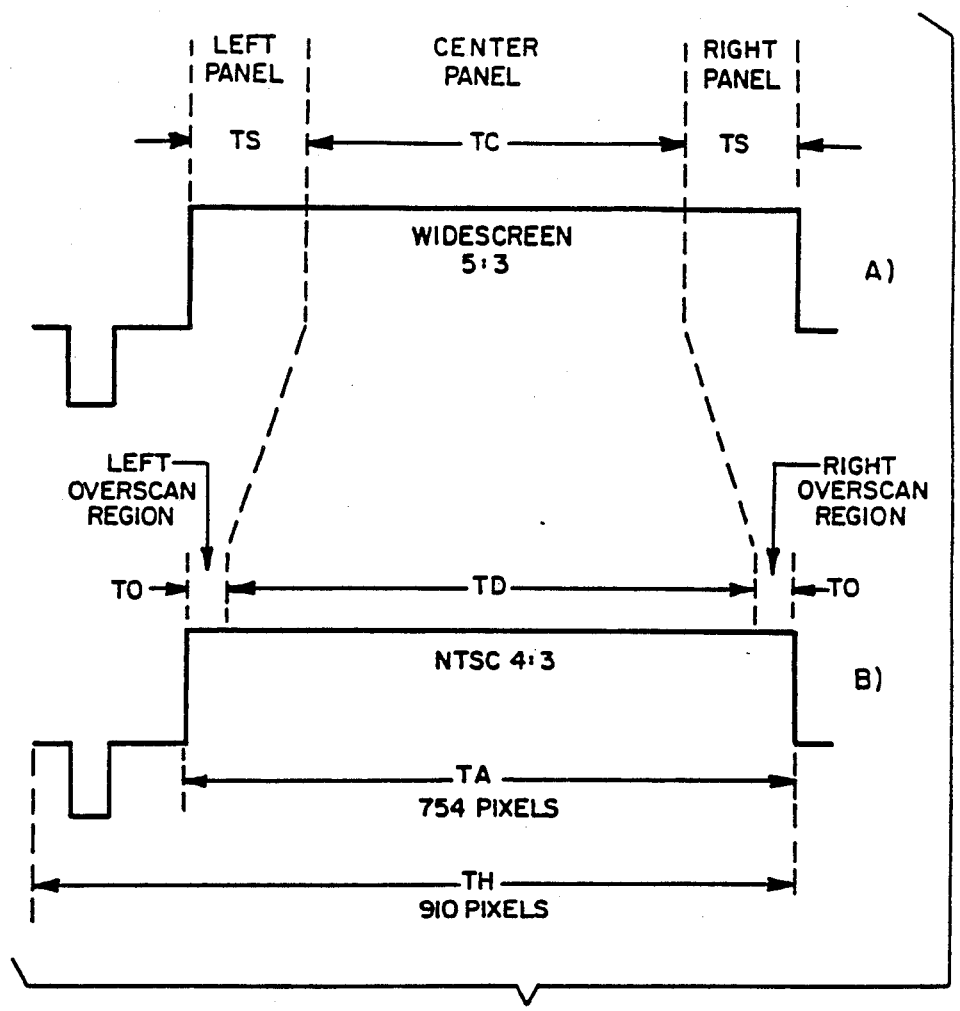
FIGS. 2-5 depict signal waveforms and diagrams helpful in understanding the operation of the disclosed system.

Before discussing the compatible widescreen encoding system of FIG. 1a, reference is made to signal waveforms A and B of FIG. 2. Signal A is a 5:3 aspect ratio widescreen signal that is to be converted to a standard NTSC compatible signal with a 4:3 aspect ratio as depicted by signal B. Widescreen signal A includes a center panel portion associated with primary image information occupying an interval TC, and left and right side panel portions associated with secondary image information and occupying intervals TS. In this example the left and right side panels exhibit substantially equal aspect ratios, less than that of the center panel which is centered therebetween.

The widescreen EDTV encoding system is shown in greater detail in FIG. 1a. Referring to FIG. 1a, an exemplary widescreen progressive scan camera 10 which is synchronized by a composite synchronization signal, CCPS, provided by a studio timing signal generator 2, provides a 525 line/field, 60 field/second widescreen color signal with R, G, B components and an aspect ratio of 5:3. The widescreen camera 10 has a greater aspect ratio and a greater video bandwidth than a standard NTSC camera.

The color video signal processed by the encoder system of FIG. 1 contains both luminance and chrominance signal components. The luminance and chrominance signals contain both low and high frequency information, which in the following discussion will be referred to as "lows" and "highs", respectively.

The wide bandwidth widescreen progressive scan color video signals from camera 10 are matrixed in a unit 12 to derive a luminance component, Y, and color difference signal components I, and Q, from the R, G, B color signals. The wideband signals Y, I, Q are sampled at 8×fsc, eight-times, the chrominance subcarrier frequency, fsc and are converted from analog to digital (binary) form individually by separate analog-to-digital converters (ADCs) in an ADC unit 14. The digital Y, I and Q signals are then filtered by separate vertical-temporal (V-T) low pass filters in a filter unit 16 to produce filtered signals YF, IF, and QF. These signals are each of the form indicated by waveform A in FIG. 2. The separate V-T filters are linear time invariant filters of the type shown in FIG. 10d as will be discussed. These filters reduce vertical-temporal resolution slightly, particularly diagonal V-T resolution, to prevent unwanted interlace artifacts (such as flicker, jagged edges, and other aliasing related effects) in the main signal after progressive to interlace scan conversion. The filters maintain nearly full vertical resolution in stationary portions of the image.

Figure 10:
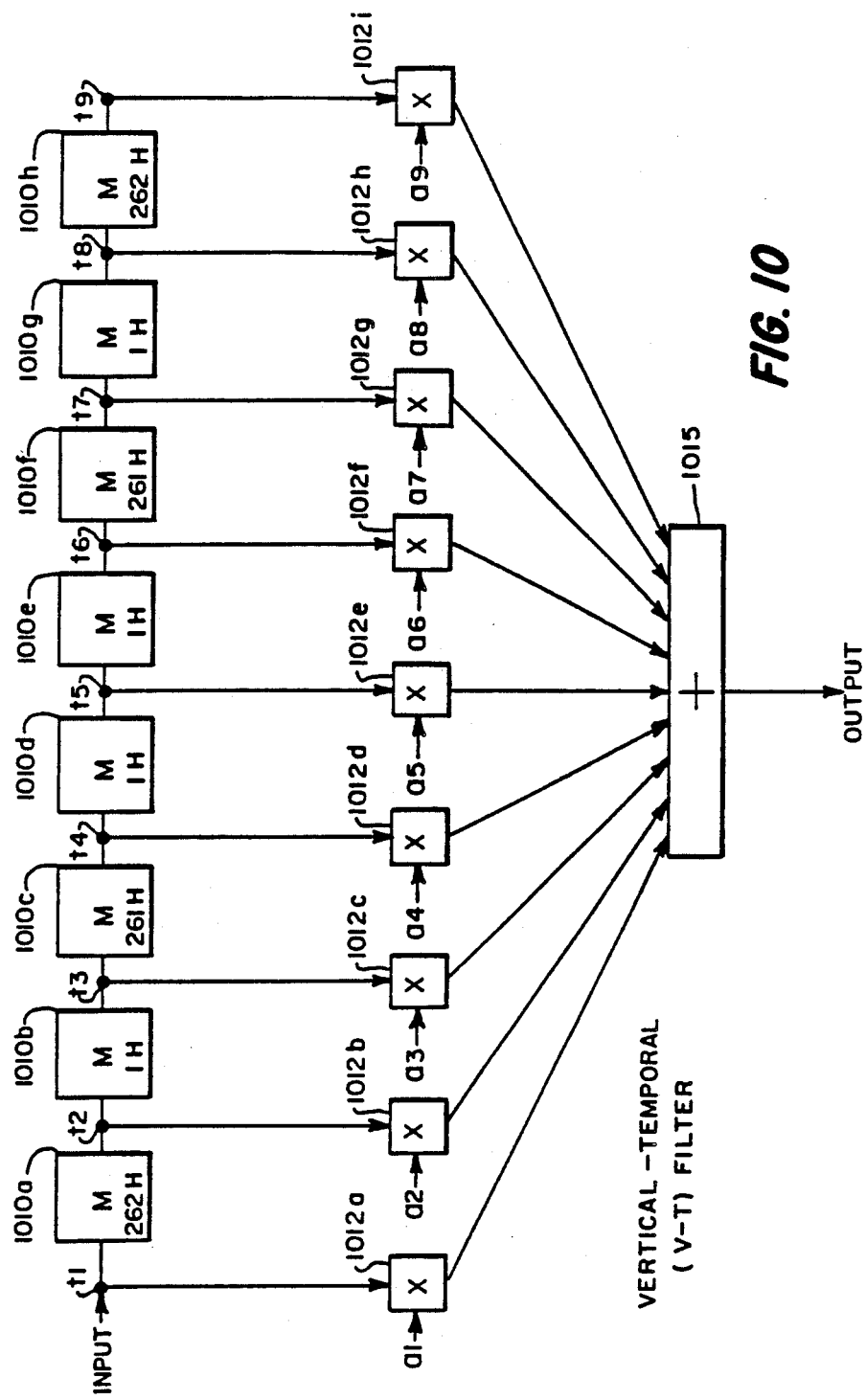
Figure 10D:
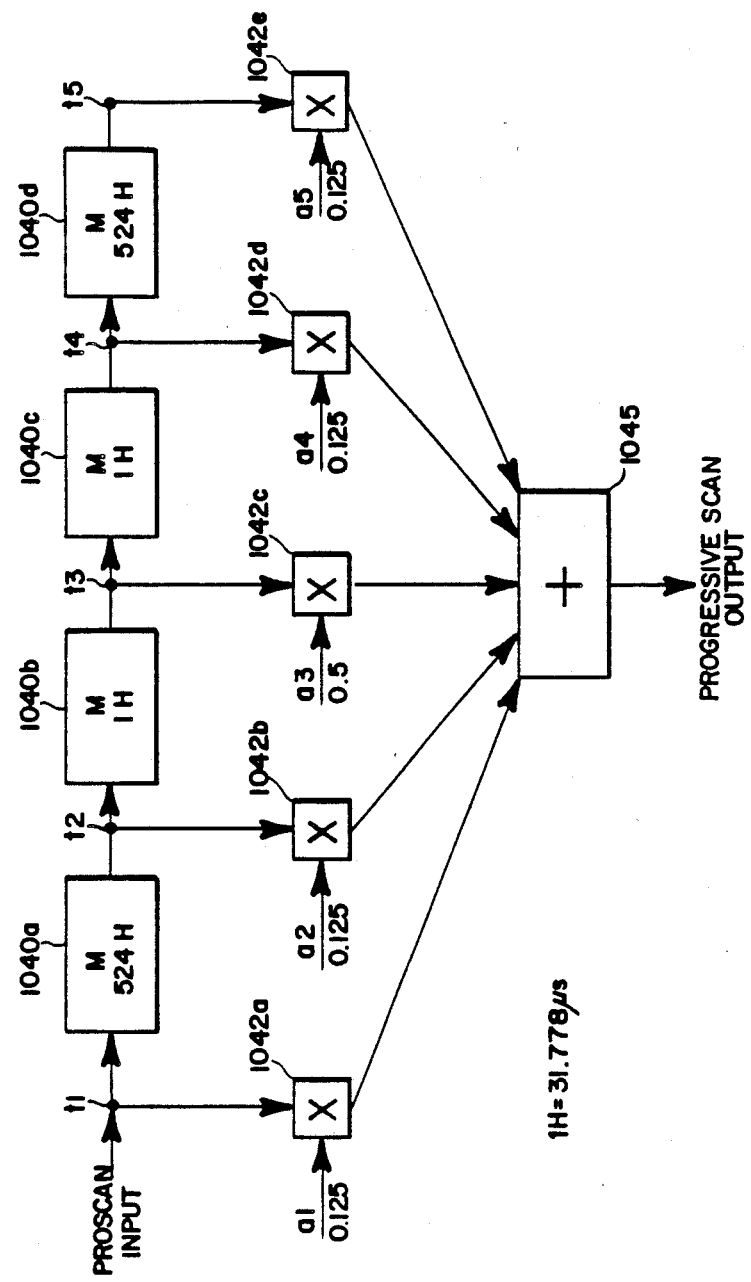

In the filter shown in FIG. 10d, a sample of a progressively scanned signal T$_3$ is averaged with corresponding samples of signals representing the previous and subsequent horizontal lines of the image (T$_4$ and T$_2$, respectively) and with corresponding samples of signals representing the previous and subsequent image frames (T$_5$ and T$_1$, respectively) to produce a sample of a progressively scanned output signal. The weighting factors for the samples of the signals T$_1$, T$_2$, T$_3$, T$_4$ and T$_5$ are ⅛, ⅛, ½, ⅛, and ⅛ respectively.

The progressive scan signals from filter network 16 exhibit a bandwidth of 0-14.32 MHz and are respectively converted into 2:1 interlaced signals by means of progressive (P) to interlace (I) scan converters 17a, 17b and 17c. Examplary P to I scan converters for the luminance signal, YF, (17C) and for the color difference signals IF and QF (17a and 17b) are shown in FIGS. 22 and 23, respectively. FIG. 22 also shows a diagram of a portion of a progressively scanned input signal YF with samples A, B, C and X in a vertical (V) and temporal (T) plane as indicated. In the converter shown in FIG. 22, the signal YF is subjected to consecutive time delays of 525H via elements 2210 and 2212 for producing samples X and A which are delayed relative to sample B. Samples B and A, which are separated by two field intervals, are summed by an adder 2214 and the resultant sum is applied to a divide-by-two network 2216. An output signal from network 2216 is subtracted from the sample X in a network 2218 to produce a signal YT. This signal is applied to one input of a switch 2220. Another input of switch 2220 receives delayed signal YF from the output of delay 2210. The switch 2220 operates at twice the interlaced horizontal line scanning rate and applies an output signal to a dual port memory 2222. The memory 2222 is conditioned by read and write control signals (READ and WRITE) to store sample values provided by the switch 2220 at an 8×fsc rate and to provide samples YF' and YT in parallel at a 4×fsc rate. The signals READ and WRITE may be, for example, 4×fsc and 8×fsc signals provided by the studio timing signal generator 2.

The converter in FIG. 22 includes an error prediction network. One output of the memory 2222, YF', is the interlaced subsampled version of the prefiltered progressive scan luminance component. Another output signal of the network shown in FIG. 22, YT, comprises vertical-temporal information derived from image frame difference information and represents a temporal prediction error between actual and predicted values of luminance samples which are deleted in the P to I conversion process. Signal YT is a luminance "helper" signal that assists to reconstruct the progressive scan signal at the receiver. Essentially, the signal YT compensates for an error that the receiver is expected to make with respect to non-stationary image signals. In stationary portions of an image the error is zero, since the pixel values in a region of the image do not change from frame to frame. FIG. 2a illustrates the algorithm used to develop helper signal YT. It has been found that a chrominance helper signal is not needed as a practical matter since the human eye is less sensitive to a lack of chrominance vertical or temporal detail.

In FIG. 23 a progressively scanned color difference signal IF (or QF) is applied to a 525H delay element 2310 before being applied to a dual port memory 2312. Alternate lines of samples are written into the memory 2312 at an 8×fsc rate and read from the memory at a 4×fsc rate to produce an interlaced output signal IF' (or QF').

Also shown in FIG. 23 are waveforms illustrative of the proscan input signal with first and second lines associated with samples C and X, and the interlace output signal (the first line with sample C stretched at a H/2 rate). Dual port memory 2312 outputs only the first line sample (C) of the input signal, in stretched form.

The output signals IF', QF' and YF' from converters 17a-17c exhibit a bandwidth of 0-7.16 MHz since the horizontal scanning rate for interlace scan signals is half that of progressive scan signals. In the conversion process, the progressive scan signal is subsampled, taking half the available pixel samples to produce the 2:1 interlaced main signal. Specifically, each pro-scan signal is converted to 2:1 interlaced format by retaining either the odd or even lines in each field and reading out the retained pixels at a 4×fsc rate (14.32 MHz). All subsequent digital processing of the interlaced signals occurs at the 4×fsc rate.

Referring to FIG. 1a, the helper signal, YT, provided by the network 17C, is applied to a format encoder 78 which compresses the pixel values corresponding to the image side panel regions and expands the pixel values corresponding to the center panel region to correlate the component 4 helper signal to the component 1 main signal. The signal provided by the format encoder 78 is lowpass filtered horizontally by means of a 750 KHz low pass filter, 79, and conveyed as helper signal YTN. Bandlimiting of the helper signal to 750 KHz is desirable to prevent this signal from interfering with the next lower RF channel in the broadcast spectrum when this signal is modulated onto the RF picture carrier.

Referring to FIG. 1a, interlaced widescreen signals IF', QF' and YF' from converters 17a-17c are respectively filtered by horizontal lowpass filters 19a, 19b and 19c to produce signals IF" and QF" each with a bandwidth of 0–600 KHz, and a signal YF" with a bandwidth of 0–5 MHz. These signals are next subjected to a format encoding process which encodes each of these signals into a 4:3 format by means of format encoding apparatus associated with a side-center signal separator and processor unit 18. Exemplary circuitry for use as the processor unit 18 is shown in FIG. 6.

Figure 6:
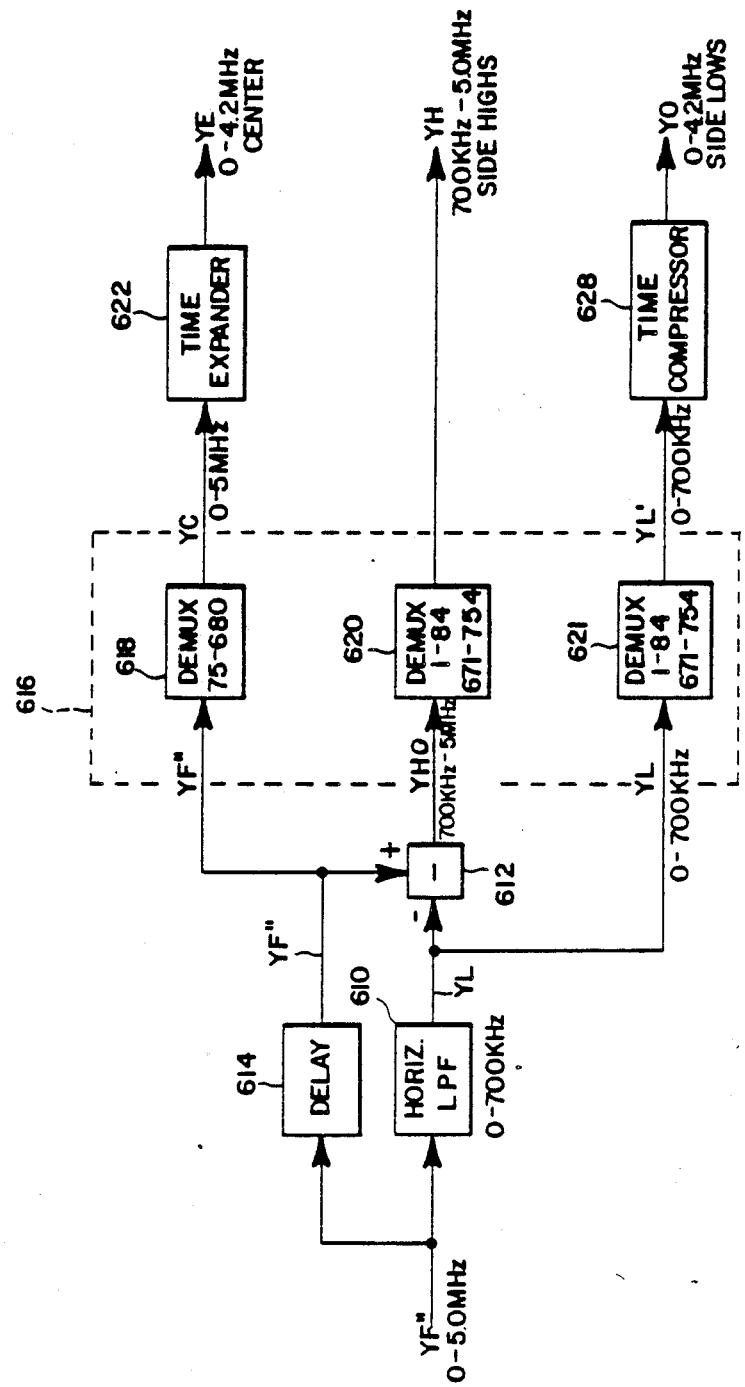

In FIG. 6, the signal YF" is applied to a horizontal low pass filter 610 having a passband from 0 to 700 KHz to produce a low frequency luminance signal YL. The signal YL is applied to the subtrahend input of a subtractive combiner 612. The signal YF" is also applied to a delay element 614 which compensates for the processing delay through the filter 610. The delayed YF" signal provided by the delay element 614 is applied to the minuend input port of the subtractive combiner 612. The output signal of the combiner 612 is a luminance signal YHO which occupies a band of frequencies from 700 KHz to 5 MHz.

Figure 3:
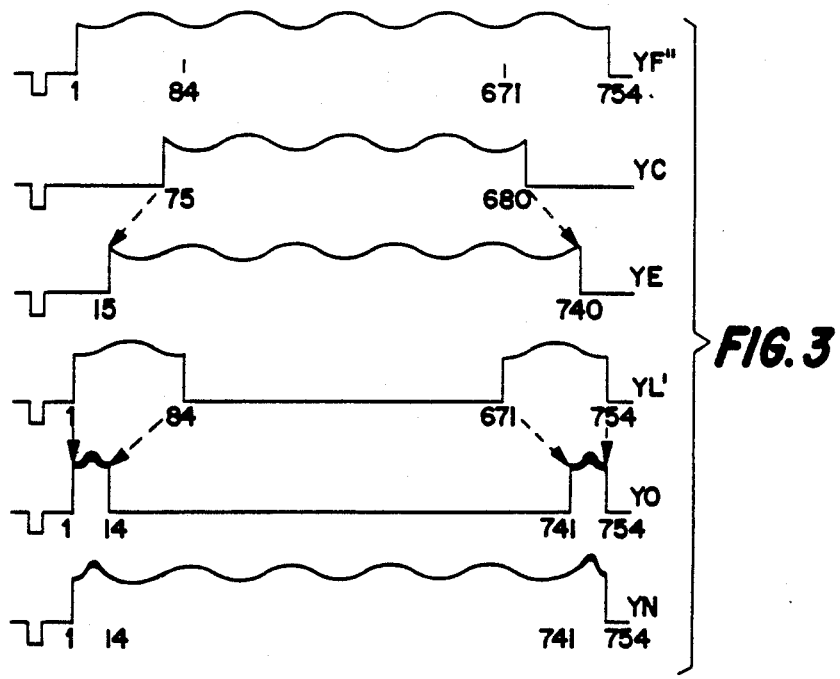
Figure 4:
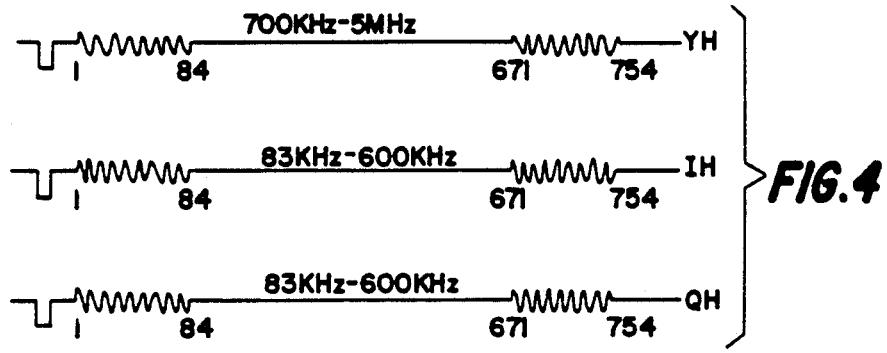

Delayed signal YF" and signals YHO and YL are applied to separate inputs of de-multiplexing apparatus 616, which includes de-multiplexing (DEMUX) units 618, 620 and 621 for respectively processing signals YF", YHO and YL. The details of de-multiplexing apparatus 616 are described below in reference to FIG. 8. DEMUX units 618, 620 and 621, respectively, derive full bandwidth center panel signal YC, side panel highs signal YH, and side panel lows signal YL' as illustrated in FIGS. 3 and 4.

Signal YC is time expanded by a time expander 622 to produce signal YE. Signal YC is time expanded with a center expansion factor sufficient to leave room for the left and right horizontal overscan regions. The center expansion factor (1.19) is the ratio of the intended width of signal YE (pixels 15–740) to the width of signal YC (pixels 75–680) as shown in FIG. 3.

Signal YL' is compressed with a side compression factor by a time compressor 628 to produce signal YO. The side compression factor (6.0) is the ratio of the width of the corresponding portion of signal YL' (e.g. left pixels 1–84) to the intended width of signal YO (e.g. left pixels 1–14) as shown in FIG. 3. The time expander 622 and time compressor 628 can be of the type shown in FIG. 12, described below.

Signals IE, IH, IO and QE, QH, QO are respectively developed from signals IF" and QF" in a manner similar to that by which signals YE, YH and YO are developed by the apparatus of FIG. 6. In this regard reference is made to FIG. 7, which illustrates apparatus for developing signals IE, IH and IO from signal IF". Signals QE, QH and QO are developed from signal QF" in the same manner. The circuitry shown in FIG. 7 is the same as that shown in FIG. 6 except that the low-pass filter 710 has a passband from 0 to 83 KHz instead of from 0 to 700 KHz for the corresponding filter 610 in FIG. 6.

Figure 7:
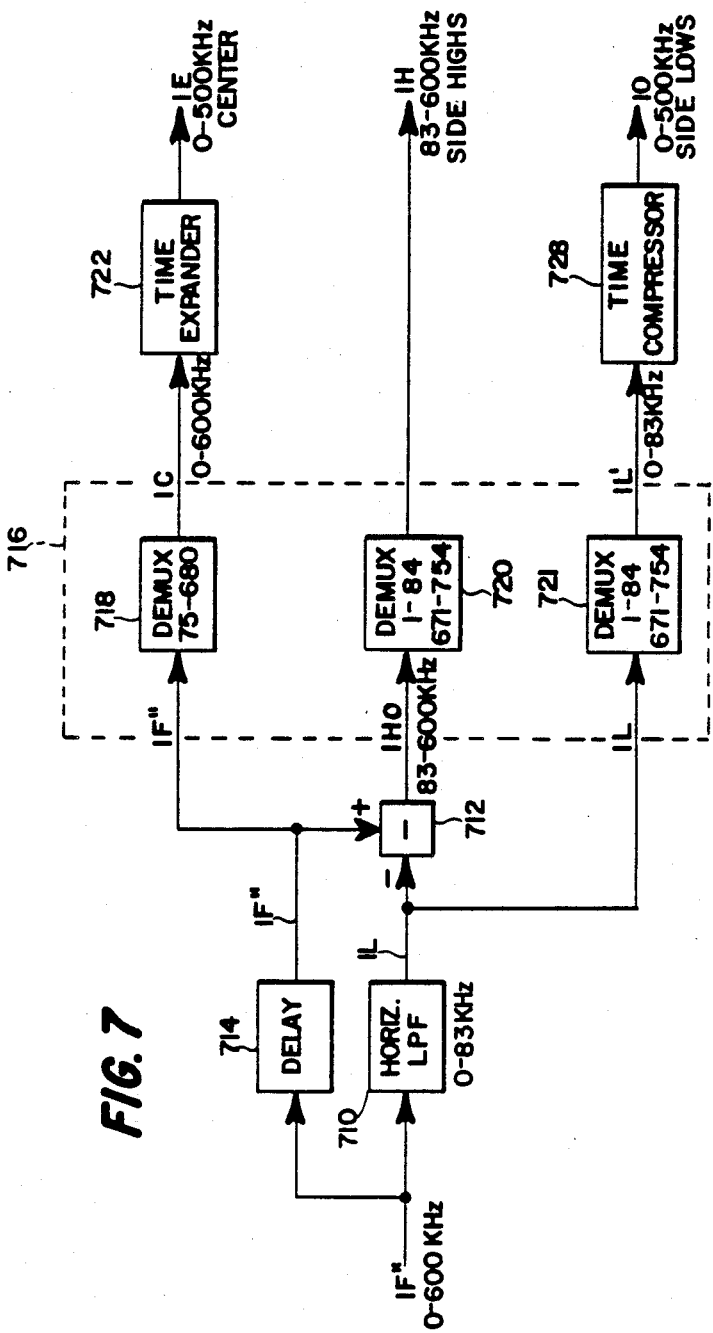

FIG. 8 illustrates a DEMUX apparatus 816 such as can be used for apparatus 616 of FIG. 6 and 716 of FIG. 7. The apparatus of FIG. 8 is illustrated in the context of DEMUX 616 of FIG. 6. Input signal YF" contains 754 pixels defining the image information. Pixels 1–84 define the left panel, pixels 671–754 define the right panel, and pixels 75–680 define the center panel which overlaps the left and right panels slightly. Signals IF" and QF" exhibit similar overlap. As will be discussed, such panel overlap has been found to facilitate combining (splicing) the center and side panels at the receiver to substantially eliminate boundary artifacts.

DEMUX apparatus 816 includes first, second and third de-multiplexer units 810, 812 and 814 respectively associated with left; center and right panel information. Each DEMUX unit has an input "A" to which signals YH, YF" and YL are respectively applied, and an input "B" to which a blanking signal (BLK) is applied. The blanking signal may be, for example, a level which is reproduced as a black image (i.e., 0 IRE). Unit 810 extracts output signal YH, containing the left and right highs, from input signal YH as long as a signal select input (SEL) of unit 810 receives a first control level from a count comparator 817. This level indicates the presence of left panel pixel elements 1–84 and right panel pixel elements 671–754. At other times, a second control level from count comparator 817 causes the BLK signal at input B rather than signal YH at input A to be coupled to the output of unit 810. Unit 814 and a count comparator 820 operate in a similar fashion for deriving side panel lows signal YL' from signal YL. Unit 812 couples signal YF" from its input A to its output to produce center panel signal YC only when a control signal from a count comparator 818 indicates the presence of center panel pixels 75–680.

Count comparators 817, 818 and 820 are synchronized to video signal YF" by means of a count value output signal from a counter 822 which responds to a clock signal at four times the chrominance subcarrier frequency (4×fsc), and to a synchronizing pulse signal H provided by the studio timing signal generator 2. Each output count value from counter 822 corresponds to a pixel position along a horizontal line. The signal H is a time reference signal which resets the counter 822 one pixel interval prior to the occurrence of pixel 1. To prevent visible seams at the junction of the side and center panels in the reproduced image, it is desirable for the signal H to be synchronized to the processed video signals. The apparatus for developing the signal H is described below in reference to FIG. 25.

Figure 12:
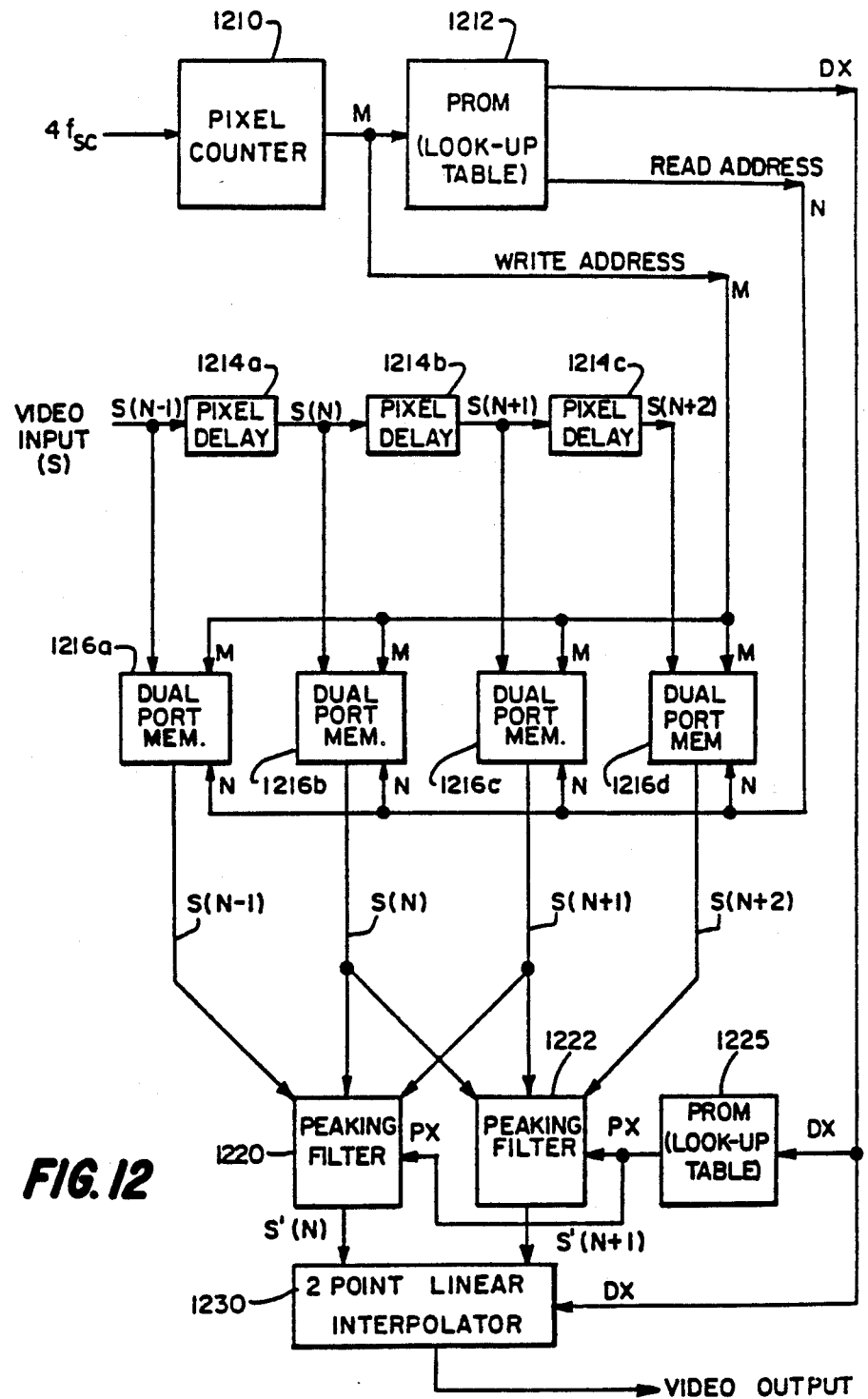
Figure 12A:
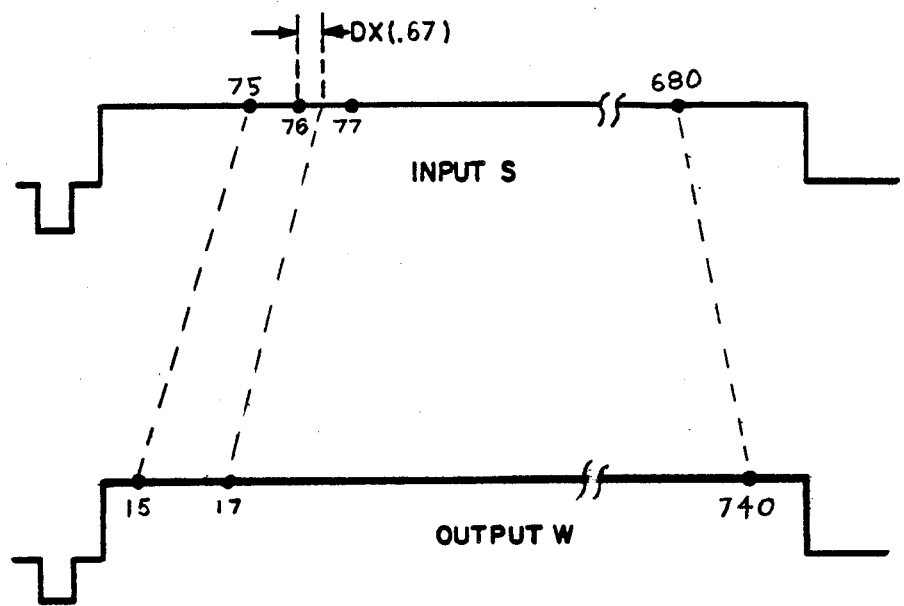

FIG. 12 illustrates raster mapping apparatus which can be used for the time expanders and compressors of FIGS. 6 and 7. In this regard, reference is made to the waveforms of FIG. 12a which illustrates the mapping process. FIG. 12a shows an input signal waveform S with a center portion between pixels 75 and 680 which is intended to be mapped into pixel locations 15–740 of an output waveform W by means of a time expansion process. End point pixels 75 and 680 of waveform S map directly into end point pixels 15 and 740 of waveform W. Intermediate pixels do not map directly on a 1:1 basis due to the time expansion, and in many cases do not map on an integer basis. The latter case is illustrated when, for example, pixel location 76.67 of input waveform S corresponds to integer pixel location 17 of output waveform W.

In FIG. 12, a pixel counter operating at a 4×fsc rate provides an output WRITE ADDRESS signal M representative of pixel locations (1 . . . 754) on an output raster. Signal M is applied to PROM (Programmable Read Only Memory) 1212 which includes a look-up table containing programmed values depending upon the nature of raster mapping to be performed, e.g., compression or expansion. In response to signal M, PROM 1212 provides an output READ ADDRESS signal N representing an integer number, and an output signal DX representing a fractional number equal to or greater than zero but less than unity. In the case of a 6-bit signal $DX=2^6=64$, signal DX exhibits fractional parts 0, 1/64, 2/64, 3/64 . . . 63/64.

To achieve signal expansion, for example, PROM 1212 is arranged to produce signal N which increases in value at a rate slower than that of signal M. Conversely, to achieve signal compression, PROM 1212 provides signal N which increases in value at a rate greater than that of signal M.

Video input signal S which may be one of the signals YC, IC, QC, $Y_L'$, $I_L'$ or $Q_L'$ is delayed by cascaded pixel delay elements 1214a, 1214b and 1214c to produce video signals S(N+2), S(N+1), and S(N) which are mutually delayed versions of the video input signal. These signals are applied to video signal input terminals of respective dual port memories 1216a-1216d, as are known. Signal M is applied to a write address input of each of memories 1216a-1216d, and signal N is applied to a read address input of each of memories 1216a-1216d. Signal M determines where incoming video signal information will be written into the memories, and signal N determines which values will be read out of the memories. The memories can write into one address while simultaneously reading out of another address.

Figure 12B:
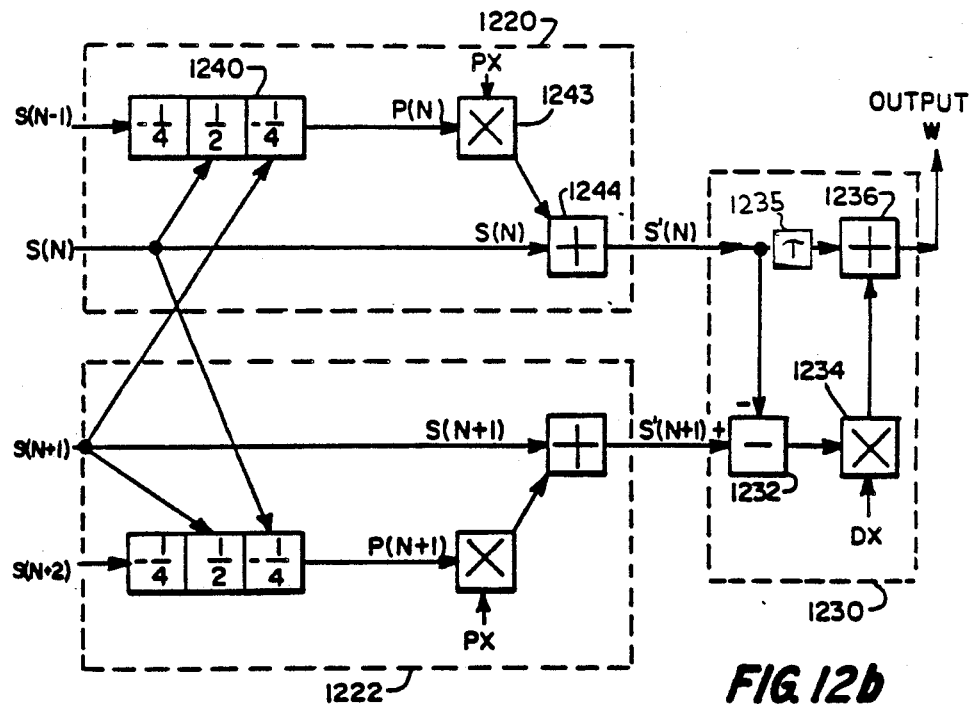
Figure 12C:
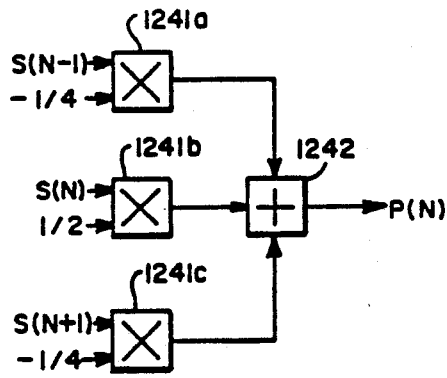
Figure 12D:
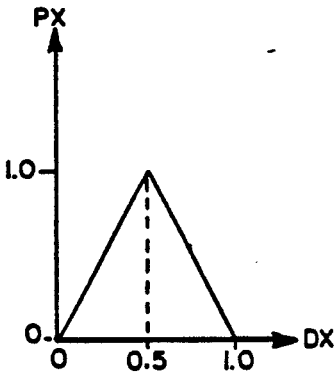

Signals S(N−1), S(N), S(N+1) and S(N+2) from memories 1216a-1216d are processed by a four-point linear interpolator including peaking filters 1220 and 1222, a PROM 1225 and a two point linear interpolator 1230, details of which are shown in FIGS. 12b and 12c. Peaking filters 1220 and 1222 receive three signals from the group of signals including signals S(N−1), S(N), S(N+1) and S(N+2), as shown, and a peaking signal PX. The value of peaking signal PX varies from zero to unity as a function of the value of signal DX, as shown in FIG. 12d, and is provided by PROM 1225 in response to signal DX. PROM 1225 includes a look-up table and is programmed to produce a given value of PX in response to a give value of DX.

Peaking filters 1220 and 1222 respectively provide peaked mutually delayed video signals S'(N) and S'(N+1) to the two-point linear interpolator 1230 which also receives signal DX. Interpolator 1230 provides a (compressed or expanded) video output signal, where output signal W is defined by the expression $$W = S'(N) + DX[S'(N+1) - S'(N)]$$

The described two-point interpolator and peaking function advantageously approximates a (sin X)/X interpolation function with good resolution of high frequency detail.

FIG. 12b shows details of peaking filters 1220 and 1222, and interpolator 1230. In FIG. 12b, signals S(N−1), S(N) and S(N+1) are applied to a band-pass filter 1240 in peaking filter 1220 where these signals are respectively weighted by coefficients −¼, ½ and -¼ and summed as shown in FIG. 12c. The output signal of the filter 1240 is multiplied by signal PX in multiplier 1243. The signal provided by the multiplier 1243 is summed with signal S(N) in adder 1244 to produce peaked signal S'(N). Peaking filter 1222 has the same structure and operation.

In two point interpolator 1230, signal S'(N) is subtracted from signal S'(N+1) in a subtractor 1232 to produce a difference signal which is multiplied by signal DX in a multiplier 1234. The output signal from multiplier 1234 is summed, in an adder 1236 with signal S'(N), which has been delayed by a delay element 1235 to compensate for the processing time through the multiplier 1234, to produce output signal W.

Referring to FIG. 1a, the signals YE, IE, QE and YO, IO, QO produced by the encoder 18 are combined by a side-center signal combiner 28, e.g. a time multiplexer, to produce signals YN, IN and QN with an NTSC compatible bandwidth and a 4:3 aspect ratio. These signals are of the form of signal YN shown in FIG. 3. To produce these signals, the combiner 28 is responsive to a pixel counter (not shown) which may be the same as the counter 822 shown in FIG. 8. In response to counter output values between 1 and 14, and between 741 and 754, the combiner 28 passes the compressed luminance signal YO as the signal YN. In response to counter values between 15 and 740, the combiner passes the signal YE as the signal YN. The signals $I_N$ and $Q_N$ are produced by the combiner 28 using means identical to that described above, operating on the signals IO and IE, and QO and QE, respectively. Combiner 28 also includes appropriate signal delays (not shown) for equalizing the transit times of the signals being combined.

A modulator 30, bandpass filter 32, H-V-T bandstop filter 34 and combiner 36 constitute an improved NTSC signal encoder 31. Chrominance signals IN and QN are quadrature modulated on a subcarrier SC at the NTSC chrominance subcarrier frequency, nominally 3.58 MHz, by the modulator 30 to produce a modulated signal CN.

Figure 9:
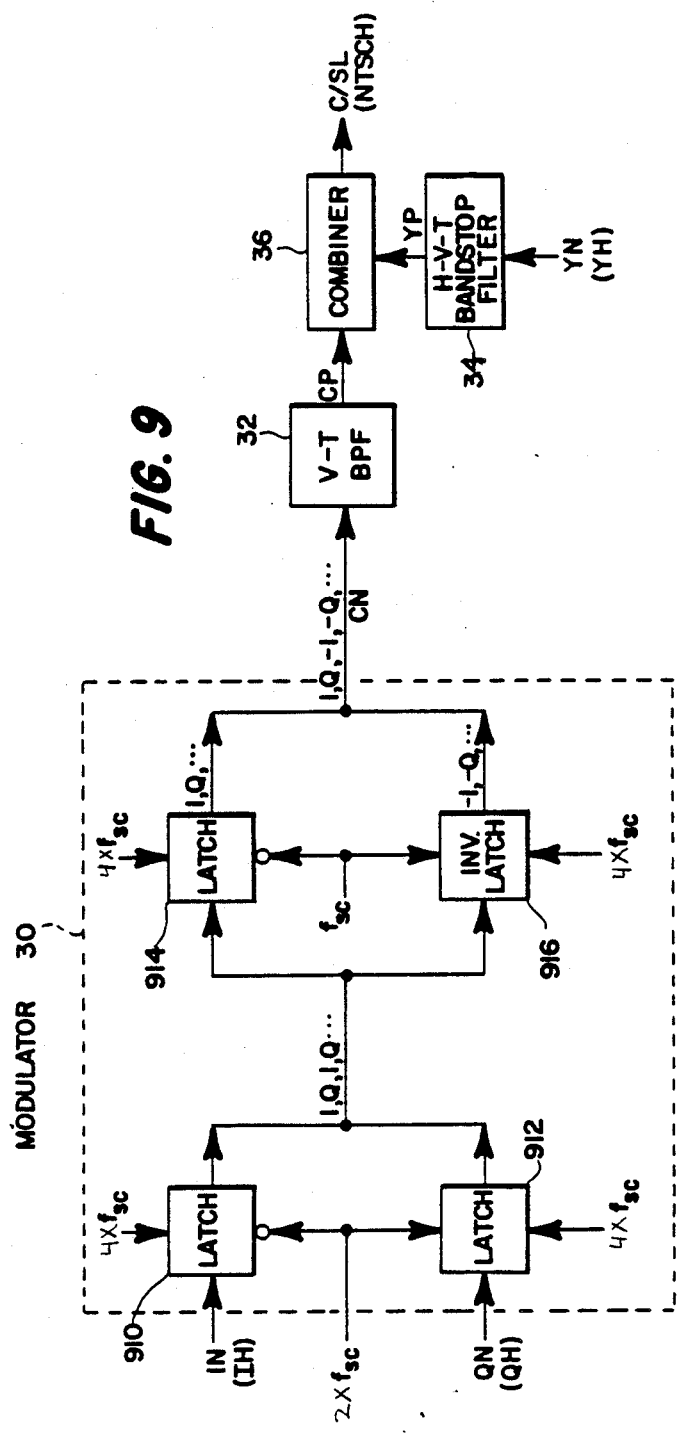

FIG. 9 shows details of modulator 30. In FIG. 9, signals IN and QN appear at a four times chrominance subcarrier rate (4×fsc) and are applied to signal inputs of latches 910 and 912, respectively. Latches 910 and 912 also receive a clock signal, 4×fsc, to transfer in signals IN and QN, and a switching signal, 2×fsc, which is applied to an inverting switching signal input of latch 910 and to a noninverting switching signal input of latch 912. The signals 4×fsc and 2×fsc are provided by the studio timing signal generator 2. The signal applied to the switching inputs of the latches 910 and 912 condition the output terminals of the latches to alternately exhibit a high impedance. The signal output terminals of latches 910 and 912 are combined into a single output line at which signals I and Q appear alternately and are applied to signal input terminals of a noninverting latch 914 and an inverting latch 916. The latches 914 and 916 are clocked at a 4×fsc rate and receive a switching signal, at the chrominance subcarrier frequency fsc, at inverting and noninverting inputs respectively. Noninverting latch 914 produces an alternating sequence of positive polarity samples I and Q, and inverting latch 916 produces an alternating sequence of inverted polarity I and Q signals, i.e. −I, −Q. The outputs of latches 914 and 916 are combined in a single output line on which appears an alternating sequence of I and Q signals of mutually opposite polarity pairs, i.e., I, Q, −I, −Q . . . etc., constituting signal CN. This signal is filtered by a two dimensional V-T filter 32 before being combined, in unit 36, with a signal YP, provided by a horizontal-vertical-temporal (H-V-T) filter 34. The output signal provided by the unit 36 is an NTSC encoded signal C/SL (component 1) of the form Y+I, Y+Q, Y−I, Y−Q, Y+I, Y+Q . . . and so on.

FIG. 10 illustrates a vertical-temporal (V-T) filter which can exhibit first and second V-T bandpass (A or B) configurations or a V-T low-pass configuration by adjusting weighting coefficients a1-a9. The table of FIG. 10a illustrates the weighting coefficients associated with V-T bandpass A and V-T bandpass B filter configurations which are employed in the disclosed system. An H-V-T bandstop filter such as filter 34 of FIG. 1a comprises the combination of a horizontal lowpass filter 1020 and a V-T bandpass B filter 1021 as shown in FIG. 10b. The V-T bandpass A filter is a frame comb filter which exhibits a frequency response characteristic having peaks corresponding to peaks in the frequency spectrum of the modulated chrominance signal. The V-T bandpass B filter is also a frame comb filter however its frequency response characteristic has nulls corresponding to peaks in the frequency spectrum of the modulated chrominance signal.

In the H-V-T bandstop filter of FIG. 10b, a horizontal lowpass filter 1020 exhibits a given cut-off frequency and provides a filtered low frequency signal component. This signal is subtractively combined in a combiner 1023 with a delayed version of the input signal from a compensating delay unit 1022 to produce a high frequency signal component. This high frequency signal component is applied to the V-T bandpass B filter 1021, the output port of which is coupled to an additive combiner 1025. The low frequency component from filter 1020 is subjected to a one frame delay by means of a network 1024 before being applied to the additive combiner 1025. The output signal of the combiner 1025 is an H-V-T bandstop filtered signal, for example, YP. V-T filter 1021 is a finite impulse response (FIR) filter such as that shown in FIG. 10 which utilizes the V-T bandpass B filter coefficients shown in FIG. 10a.

H-V-T bandstop filter 34 in FIGS. 1a and 9 is a frame comb filter above 1.5 MHz which removes a portion of the frequency components of luminance signal YN which correspond to upwardly moving diagonals. These frequency components are similar in appearance to chrominance subcarrier components and are removed from the luminance signal to make a hole in the frequency spectrum into which the modulated chrominance signal will be inserted. The removal of frequency components representing upward diagonal motion from luminance signal YN does not visibly degrade a displayed picture because it has been determined that the human eye is substantially insensitive to these frequency components. Filter 34 passes all frequencies up to approximately 1.5 MHz so as not to impair luminance vertical detail information.

An output center/side lows signal C/SL (component 1) from combiner 36 contains NTSC compatible information to be displayed, as derived from the center panel of the widescreen signal, as well as compressed side panel lows (both luminance and chrominance) derived from the side panels of the widescreen signal and situated in the left and right horizontal overscan regions which are not seen by a viewer of an NTSC receiver display. The compressed side panel lows in the overscan region represent one constituent part of the side panel information for a widescreen display. The other constituent part, the side panel highs, is developed by processor 18 as discussed above.

Figure 11A:
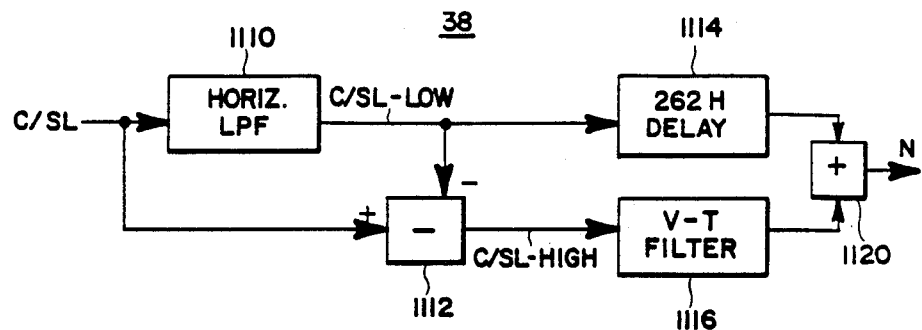
Figure 11B:
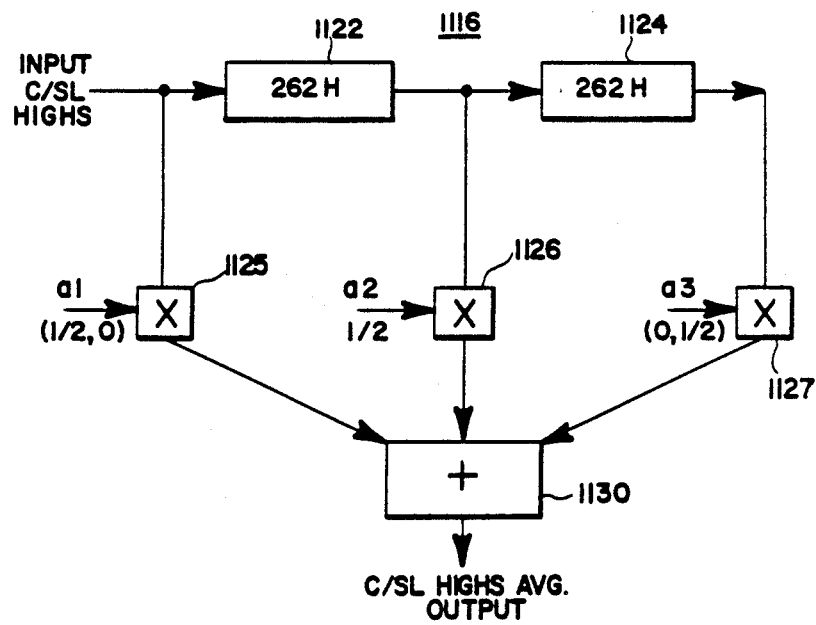

Referring to FIG. 1a, signal C/SL produced by the encoder 31 is processed by an intraframe averager 38 to produce a signal N, which is applied to an input port of an adder 40. The intraframe averaged signal N is essentially identical to signal C/SL because of the high correlation of intraframe image information in the signal C/SL. The averager 38 averages signal C/SL only above approximately 1.5 MHz to reduce or eliminate vertical-temporal crosstalk between the main and auxiliary signals. FIGS. 11a and 11b show details of highs intraframe averager 38.

As shown in FIG. 11a the intraframe averager 38 includes an input horizontal lowpass filter 1110 with a cut-off frequency of approximately 1.5 MHz, which receives signal C/SL. A low frequency component of input signal C/SL is produced at the output of filter 1110, and a high frequency component of input signal C/SL is produced at the output of a subtractive combiner 1112 arranged as shown. The low frequency component is subjected to a 262H (one field) compensatory delay by a unit 1114 before being applied to an adder 1120. The high frequency component of signal C/SL is processed by a V-T filter 1116 before being applied to the adder 1120. The output signal of the adder 1120 is the signal N.

Filter 1116 is shown in detail in FIG. 11b. The filter 1116 includes a pair of 262H delay elements 1122 and 1124. The input signal to the filter is applied to the delay element 1122 and to a multiplier 1125. The signal provided by the delay element 1122 is applied to the delay element 1124 and to a multiplier 1126. The output signal of the delay element 1124 is applied to a multiplier 1127. The multipliers 1125, 1126 and 1127 multiply their respective input signals by weighting coefficients a1, a2 and a3, respectively. The mutiplier outputs are applied to an adder 1130 which produces a C/SL highs time averaged signal. Weighting coefficient a2 remains constant, but coefficients a1 and a3 alternate between ½ and 0 from one field to the next. Coefficient a1 exhibits values of ½ and 0 when coefficient a3 exhibits respective values of 0 and ½. The switching of values for the coefficients a1 and a3 is synchronized to the incoming signals so that only corresponding pixel values from two fields in the same frame are averaged.

Referring to FIG. 1a, signals IH, QH, and YH provided by the format encoder 18 are placed in NTSC format by means of an NTSC encoder 60 which is the same as the encoder 31 described above. The output signal produced by the NTSC encoder 60, the signal NTSCH, is the side panel highs information in NTSC format. This signal is illustrated by FIG. 5.

The signal NTSCH produced by the encoder 60 is time expanded by a unit 62 to produce an expanded side highs signal ESH. Specifically, as shown in FIG. 5, the expansion is accomplished by a "mapping" process which maps left side panel pixels 1-84 of signal NSCH into pixel positions 1-377 of signal ESH, i.e., the left side highs of signal NTSCH are expanded to occupy one half the active line time of signal ESH. The right side panel portion (pixels 671-754) of signal NTSCH is similarly processed to occupy the other half of the active line time. The time expansion process reduces the horizontal bandwidth of the information comprising signal ESH (compared to that of signal NTSCH) by a factor of 377/84. The mapping process by which time expansion is accomplished can be realized by apparatus of the type shown in FIGS. 12-12d, described above.

Figure 5:
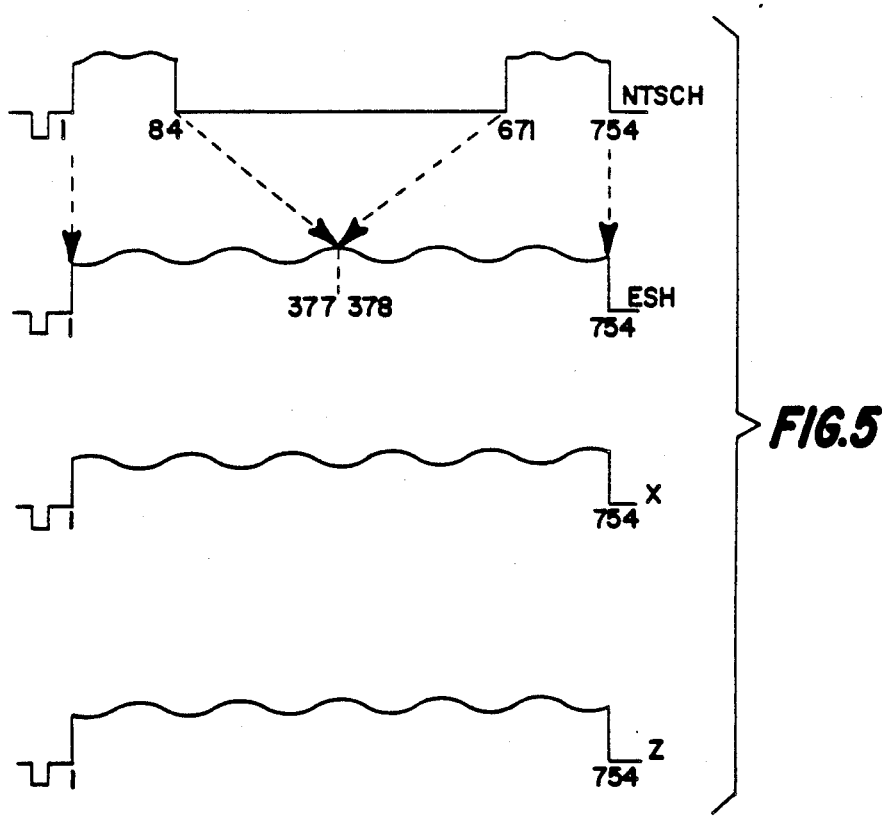

Signal ESH produced by the time expander 62 is intra-frame averaged by a network 64, of the type shown in FIG. 11b, to produce a signal X as illustrated in FIG. 5. The intraframe averaged signal X is essentially identical to signal ESH because of the high correlation of intraframe image information of signal ESH. Signal X is applied to a signal input port of a quadrature modulator 80.

Signal YF', provided by the progressive to interlace scan converter 17c, is filtered by a horizontal bandpass filter 70 with a passband of 5 MHz-6.2 MHz. The output signal from filter 70, representing horizontal luminance highs, is applied to an amplitude modulator 72 where it is heterodyned with a 5 MHz carrier signal $f_c$. The signal $f_c$ is generated by the studio timing signal generator 2, described below in reference to FIG. 25. Modulator 72 includes an output low pass filter (not shown) with a cut-off frequency of approximately 1.2 MHz to produce a signal with a 0–1.2 MHz passband at the output of modulator 72. Effectively, horizontal luminance highs in the frequency range 5.0 MHz–6.2 MHz have been shifted to the range 0–1.2 MHz as a result of the heterodyning process and subsequent low pass filtering. The amplitude of the signal $f_c$ used in the heterodyning process should be large enough so that the original signal amplitudes are retained after filtering by the 1.2 MHz low pass filter.

The frequency-shifted horizontal luminance highs signal from unit 72 is encoded by means of a format encoder 74 to spatially correlate this signal with the main signal, C/SL. The encoder 74 encodes the frequency shifted horizontal luminance highs into a standard 4:3 format using the techniques described above in reference to FIGS. 6–8. When the center portion of the input signal to encoder 74 is time expanded, its bandwidth drops to approximately 1.0 MHz from 1.2 MHz, and the output signal from encoder 74 becomes spatially correlated with the main signal. The side panel information is lowpass filtered within unit 72 to 170 KHz before being time-compressed by encoder 74. Alternatively, it is contemplated that the signal provided by the modulator 72 may be uniformly compressed by the format encoder 74 such that an entire line of samples 1–754 are encoded to occupy pixel positions 15–740 and the side panel pixel positions are left at the blanking level value. If this method of format encoding is used, the bandwidth of the low pass filter contained in the amplitude modulator 72 is desirably reduced from 1.2 MHz to 950 KHz.

The signal from encoder 74 is intraframe averaged by means of apparatus 76 which is the same as that illustrated in FIG. 11b. The signal produced by the averager 76 is applied to unit 80 as signal Z. Intraframe averaged signal Z is essentially identical to the signal from encoder 74 because of the high correlation of intraframe image information of the signal from encoder 74. The modulating signals X and Z occupy substantially the same band of frequencies, approximately 0–1.1 MHz.

The unit 80 performs nonlinear gamma function amplitude compression on large amplitude excursions of the two auxiliary signals, X and E, and then quadrature modulates the compressed signals onto quadrature phase related alternate subcarrier signals ASC and ASC'. A gamma of 0.7 is used for the amplitude compression, whereby the absolute value of each sample is raised to the 0.7 power and multiplied by the sign of the original sample value. Gamma compression reduces the visibility of potentially interfering large amplitude excursions of the modulated signals on existing receivers, and allows predictable recovery at the widescreen receiver since the inverse of the gamma function employed at the encoder can be readily implemented at the receiver decoder.

The amplitude compressed signals are then modulated on a 3.1075 MHz phase-controlled alternate subcarrier ASC, and a quadrature phase related signal ASC'. The frequency of signals ASC and ASC' is an odd multiple of one half the horizontal line frequency $(395 \times H/2)$. The signals ASC and ASC' are generated by the studio timing signal generator 2, described below in reference to FIG. 25. The phase of the alternate subcarrier is caused to alternate 180° from one field to the next. The field alternating phase of the alternate subcarrier permits the auxiliary modulating information of signals X and Z to overlap chrominance information and facilitates the separation of the auxiliary information using a relatively uncomplicated field storage device at the receiver. The quadrature modulated signal, M, is added to signal N in adder 40. The resulting signal, NTSCF, is a 4.2 MHz NTSC compatible signal.

Figure 24:
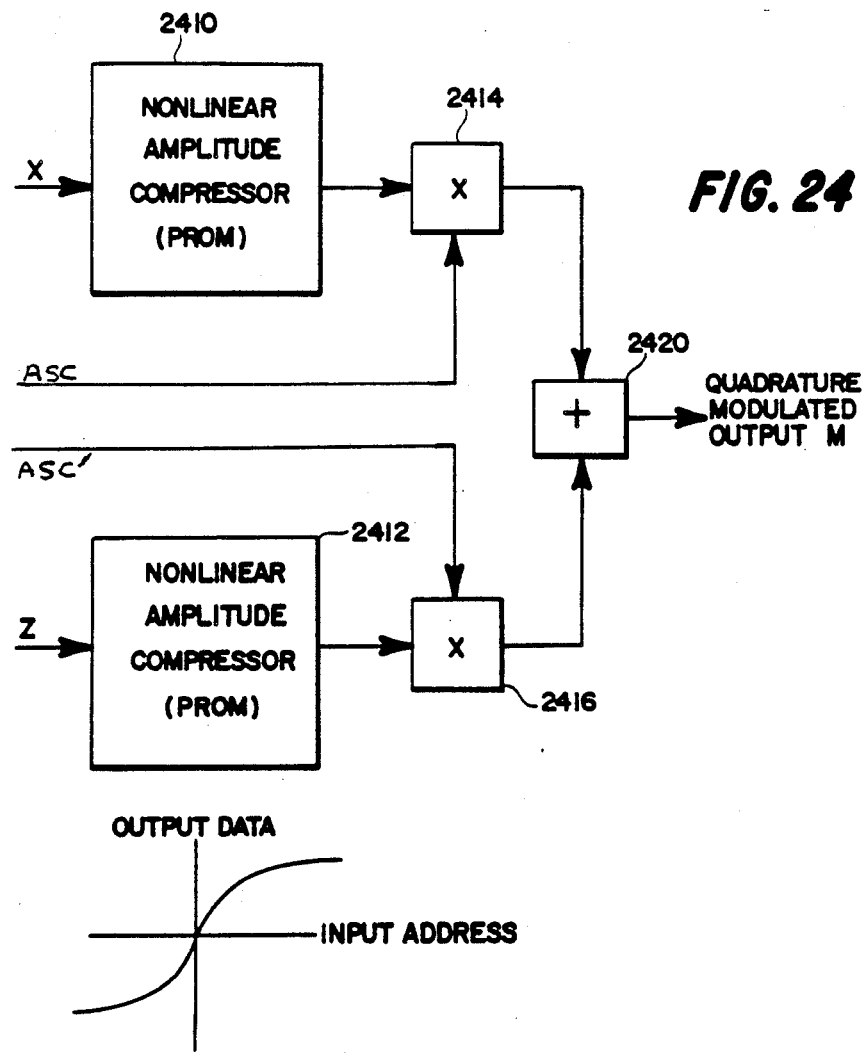

FIG. 24 shows details of unit 80. Signals X and Z are applied to address inputs of non-linear amplitude compressors 2410 and 2412, respectively. Compressors 2410 and 2412 are programmable read-only memory (PROM) devices each including a look-up table containing programmed values corresponding to the desired non-linear gamma compression function. This function is illustrated by the instantaneous input vs. output response curve adjacent to unit 2412. Compressed signals X and E from data outputs of units 2410 and 2412 are applied to signal input ports of signal multipliers 2414 and 2416, respectively. Reference inputs of multipliers 2414 and 2416 receive respective alternate subcarrier signals ASC and ASC' in mutually quadrature phase relationships from the generator 2. Output signals from multipliers 2414 and 2416 are added, in a combiner 2420, to produce a quadrature modulated signal M. Referring to FIG. 1a the signals M and N are summed by an adder 40 to form the signal NTSCF.

The fourth component or helper signal is derived from the signal YT provided by the progressive to interlace scan converter 17c. The luminance detail signal YT produced by the progressive to interlace scan converter 17c, exhibits a bandwidth of 7.16 MHz and is encoded into the 4:3 format by means of a format encoder 78 which is the same as that described in reference to FIGS. 6 and 8. The signal provided by the format encoder 78 is horizontally lowpass filtered to 750 KHz by a filter 79 to produce a signal YTN. The side portions are lowpass filtered to 125 KHz before time compression by means of an input lowpass filter of format encoder 78. This filter corresponds to input filter 610 of the apparatus shown in FIG. 6 but it has a cut-off frequency of 125 KHz. The side portion highs are discarded. Thus signal YTN is spatially correlated with main signal C/SL.

Signals YTN and NTSCF are converted from digital (binary) to analog form by means of digital to analog conversion (DAC) units 53 and 54 respectively. The signal provided by the DAC 54 is applied to one input terminal of an analog switch 8 another input terminal of the switch 8 is coupled to receive a signal provided by an analog switch 6. A signal SC2, provided by the studio timing signal generator 2 conditions the analog switch 8 to apply either active video signals from DAC 54 and a composite synchronization signal, OCPS, from the timing signal generator 2 or, an external video signal, EV from source 4 and the signal OCPS to one input terminal of the RF quadrature modulator 57. A switch 9 is controlled by signal SC2 to apply either the helper signal from DAC 53 or a helper signal from the external video source 4 to another terminal of the modulator 57. The quadrature modulator 57 modulates the two signals. applied to its input terminals onto an RF carrier in quadrature. The RF modulated signal is afterwards applied to a transmitter 55 for broadcast via an antenna 56.

As set forth above, the studio timing signal generator 2 generates a composite synchronization signal for the widescreen progressive scan camera 10, various clock, carrier and timing signals used by the widescreen EDTV encoder and a composite synchronization and training signal which is added to the EDTV signal to be transmitted. The generator 2 may develop these signals from an internal free-running oscillator or it may be genlocked to an external video signal, EV, provided by the source 4. Thus, the external video source 4 is optional. If it is absent, the system will synchronize itself. If it is present, it may be used only for synchronization purposes or it may provide encoded video signals to the switches 8 and 9 which override the encoded video signals available at the output terminals of the DACs 53 and 54. The composite synchronization signal, OCPS, provided by the studio timing signal generator 2 is inserted into the signals to be transmitted whether they are provided by the DACs 53 and 54 or the external video source 4. This configuration allows the equipment in a local television studio to be synchronized to, for example, programming provided by a network. Synchronization of this type is important if local programs are to be mixed with programming from other sources without annoying switching artifacts.

Figure 25:
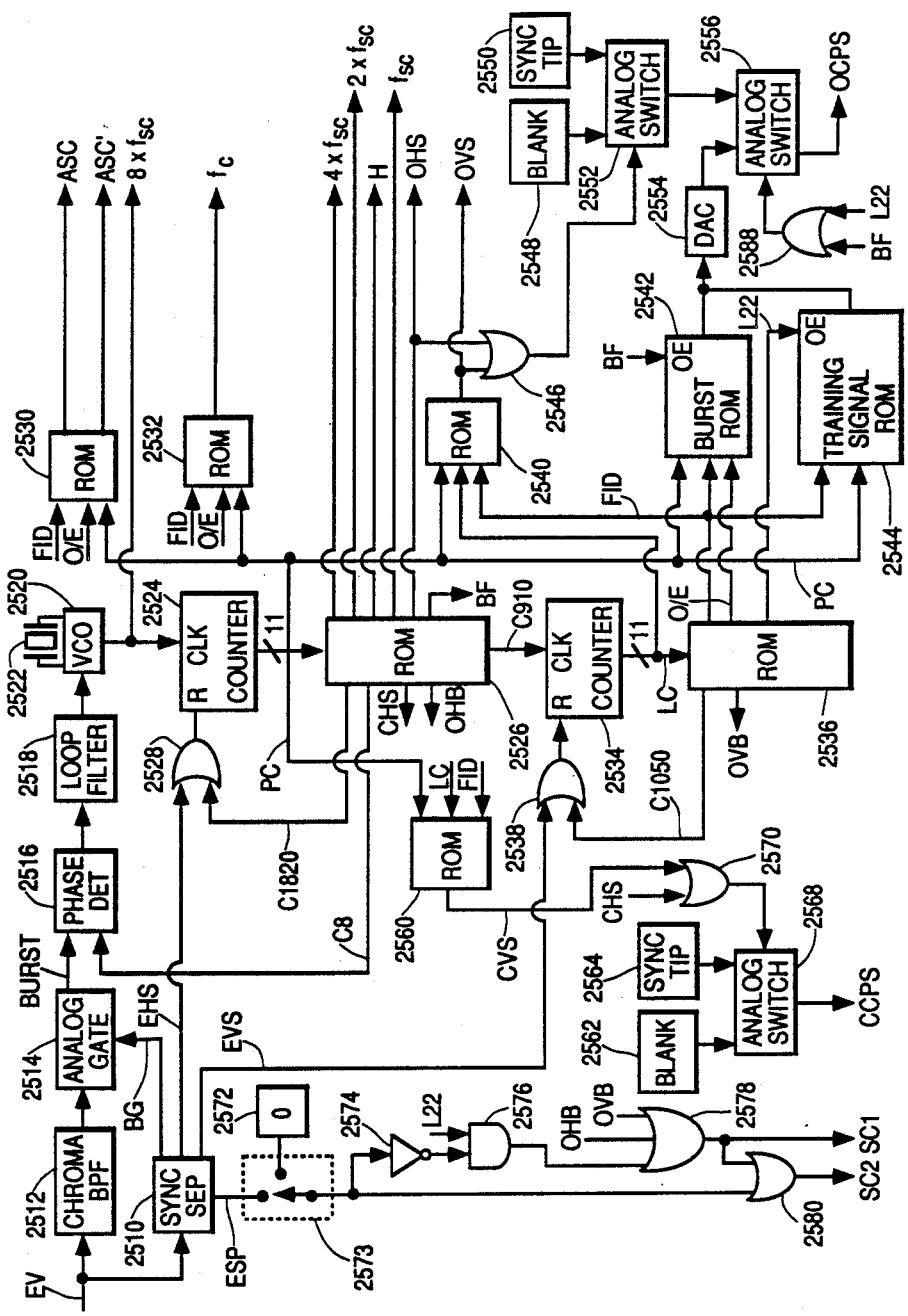

The following is an overview of exemplary circuitry, shown in FIG. 25, which may be used as the studio timing signal generator 2. Thw signal 8×fsc, generated by a voltage controlled oscillator (VCO) 2520, is applied to a counter 2524. The count value, a signal PC, provided by the counter 2524 represents the position, on a horizontal line, of the pixels being digitized by the ADCs 14. The signal PC is applied to a read-only memory (ROM) 2526 which generates timing signals representing various events occurring on each line of the signal, e.g. horizontal blanking and sync. A signal C910 having one pulse per horizontal line of the signal provided by the camera 10 is provided by the ROM 2526 to a counter 2534. The counter 2534 generates a signal LC representing the vertical position of the line of samples being digitized by the ADCs 14. The signal LC is applied to a ROM 2536 which generates signals defining events which occur once per field or once per frame such as vertical blanking. The signals PC and LC are applied to various ROMs 2530, 2532, 2540, 2542, 2544, and 2546 which generate signals defining the rest of the timing and oscillatory signals provided by the generator 2. The switching signals SW1 and SW2 as well as the analog composite synchronization signals CCPS and OCPS are also provided by the studio timing signal generator 2.

To simplify the explanation of the timing circuitry, compensating delays, which may be needed to supply the signals produced by the timing generator 2 to the remainder of the circuitry shown in FIG. 1a, are omitted. One skilled in the art of digital signal processing circuit design will know where such delays are needed in a particular system.

FIG. 25 is a block diagram of circuitry suitable for use as the studio timing signal generator 2. In FIG. 25, the signal EV which includes the in-phase component of an encoded widescreen EDTV signal plus relevant horizontal, vertical and color burst synchronization signal components, from the external video source 4, is applied to a conventional synchronizing signal separator circuit 2510. The circuit 2510 produces a burst gate signal, BG, and external horizontal and vertical synchronizing signals, EHS and EVS, respectively.

The signal EV is further applied to a chrominance bandpass filter 2512 which passes the chrominance band components of the signal EV to the relative exclusion of any other components. The output terminal of the filter 2512 is coupled to an analog gate 2514 which is conditioned by the burst gate signal, BG, to apply the color burst signal component, BURST, of the signal EV to one input terminal of a phase detector 2516. Another input terminal of the phase detector 2516 is coupled to receive a signal C8 provided by the ROM 2526. As explained below, the signal C8 has substantially the same frequency, fsc, as the signal BURST.

The phase detector 2516 produces an output signal which is proportional to the instantaneous difference in phase between the signal BURST and the signal C8. This phase difference signal is applied to a loop filter 2518. The loop filter 2518 integrates the phase difference signal to produce a signal which is proportional to the difference in frequency between the signals BURST and the initial frequency of the signal C8 which is related to the free-running frequency of the VCO 2520. This frequency difference signal is applied to a control input terminal of the VCO 2520. The VCO 2520 includes a resonant crystal 2522 which conditions the VCO to have a free-running frequency of approximately eight times fsc. The output signal, 8×fsc, of the VCO 2520 is applied to the clock input terminal, CLK, of the 11-bit counter 2524. The 11-bit output signal, PC (pixel count), provided by the counter 2524 is applied to the address input port of the ROM 2526. The ROM 2526 is a 2048×9 bit device which is programmed to produce various output signals in response to the count values applied to its address input port. One of these signals, C8, is in a logic zero state for four consecutive count values and then in a logic one state for the next four consecutive count values. Since the count value is incremented at a rate of 8×fsc, the signal C8 has a frequency substantially equal to fsc. This signal is applied to the phase detector 2516 as set forth above.

The combination of the phase detector 2516, loop filter 2518, VCO 2520 counter 2524 and ROM 2526 is a phase locked loop which produces a signal 8×fsc that is locked in phase to the color burst signal component of the external video signal, EV. As set forth above, the signal EV is an optional signal. If it is not present, the loop will operate at the free-running frequency of the VCO 2520.

The phase locked loop is further synchronized to the external horizontal synchronizing signal, EHS. This signal is applied to one input terminal of an OR gate 2528. Another input terminal of the OR gate 2528 is coupled to receive a signal C1820, provided by the ROM 2526. The signal C1820 includes a pulse which occurs once for every 1,820 consecutive pulses of the signal 8×fsc. The output terminal of the OR gate 2528 is coupled to the reset input terminal, R, of the counter 2524. For standard NTSC signals and wideband EDTV signals, the signal C1820 has substantially the same frequency as the horizontal line synchronizing signal. When the signal EHS is present, the pixel count signal, PC, produced by the counter 2524 is synchronized to the external source. When EHS is not present, the phase locked loop synchronizes itself.

The ROM 2526 also produces signals which define a 4×fsc clock signal (4×fsc), a ×fsc clock signal (2×fsc) the timing of the first active pixel position on a horizontal line of the output video signal (H), the timing of horizontal sync (OHS) and horizontal blanking (OHB)

for the output video signal, the timing of horizontal sync for the progressive scan camera (CHS), a timing window into which the burst component of the output signal is inserted (BF), and a signal C910, which includes a pulse that occurs once for every 910 consecutive pulses of the signal CK8. The signal C910 defines the start of each horizontal line of video signal provided by the progressive scan camera 10. This signal is applied to the clock input terminal, CLK, of the counter 2534, which, together with the ROM 2536, generates the vertical rate timing signals for the camera 10 and for the output video signal produced by the encoder.

Counter 2534 is an 11-bit counter which produces an output signal, LC (line count), that is applied to the address input port of the ROM 2536. A signal C1050 provided by the ROM 2536 is applied to one input terminal of an OR gate 2538, the other input terminal of which is coupled to receive the external vertical synchronizing signal EVS, provided by the synchronizing signal separating circuitry 2510. The signal C1050 includes a pulse that occurs once for every 1,050 consecutive values of the signal LC, and has substantially the same frequency as the signal EVS. The output terminal of the OR gate 2538 is coupled to the reset input terminal, R, of the counter 2534. The signal produced by the OR gate 2538 conditions the counter to reset its count value once for each field of video signal produced by the progressive scan camera 10. The field rates of the camera 10, the external video signal, EV, and the output signal produced by the widescreen EDTV encoder are the same.

In response to the line count signal, LC, the ROM 2536 produces a signal, FID, which contains the field identifier (i.e. 0, 1, 2 or 3) for the current field. This signal is used as set forth below to generate the alternate subcarrier signals, ASC and ASC', the color burst signal, the five MHz heterodyne carrier signal, fc, and to define the vertical syncrhonizing signals CVS and OVS for the camera 10 and for the video output signal, respectively. In addition, the ROM 2536 produces a signal OVB, which defines the vertical blanking interval for the output video signal, a signal, O/E, which indicates whether a line indicated by the signal LC is an odd or even line within its field and a signal, L22, which indicates when the value of LC corresponds to line 22 of each field of the output video signal.

The ROM 2530 is programmed to generate the alternate subcarrier signals ASC and ASC' in response to an address input signal which includes the pixel count signal, PC, provided by the counter 2524 and the signals FID and O/E provided by the ROM 2536. The signals ASC and ASC' are quadrature phase related signals having a nominal frequency of $395 \times fh/2$, 395 times one-half the horizontal line scanning frequency. The signals FID and O/E are included in the address signal for the ROM 2536 so that the phase of the signals ASC and ASC' may change by 180 degrees from line to line and from field to field, as set forth above. The signals ASC and ASC' are eight-bit sampled data signals having a sample rate of $4 \times fsc$. Since the signals ASC and ASC' have a known variation in phase from line to line and from field to field (i.e. 180 degrees), the ROM 2530 may contain samples representing two horizontal line periods of the alternate subcarrier signals.

In the present embodiment of the invention, the five MHz signal fc is generated in the same manner by the ROM 2532. This signal is not tied in frequency or phase to the horizontal line scanning signal or to the color subcarrier signal of the output video signal. However, it may be desirable to change the phase of this signal from line to line or from field to field to prevent it from distorting the reproduced image. Accordingly, the signals FID and O/E are included with the signal PC in forming the address signal for the ROM 2532. The signal fc is also an eight-bit sampled data signal having a sample rate of $4 \times fsc$. The ROM 2532 may hold sample values representing between one and four horizontal line intervals of the signal fc.

The ROM 2540 is responsive to an address signal which includes the signals PC, FID and LC for generating a signal OVS which indicates the timing of the various components of the vertical synchronization signal for the output video signal. The output signal, OVS, of the ROM 2540 is a one-bit binary signal which switches between logic-one and logic-zero states at times when the vertical synchronizing signal, which includes the equalizing pulses and serrations, changes between values corresponding to black level (i.e. 0 IRE) and sync tip (i.e. −40 IRE), respectively.

Another ROM, 2560, is responsive to an address signal which includes the component signals PC, LC and FID to generate a signal, CVS, which indicates the timing of the various components of the vertical synchronization signal for the progressive scan camera 10.

A sampled data burst signal which is inserted in the burst interval of each horizontal line of the output video signal is generated by the ROM 2542 in response to an address input signal which includes the signals PC, O/E and FID. The ROM 2542 includes a three-state output stage which is responsive to the burst flag signal, BF, to provide the eight-bit sampled data burst signal only during the burst interval, a high impedance is provided at the output port of the ROM 2542 at all other times.

The ROM 2544 produces a training signal for insertion into the output video signal during the time defined by the 22nd horizontal line interval of each field. The signals PC and FID are combined to form the address input signal for the ROM 2544. The ROM 2544 includes a three-state output stage which is responsive to the signal L22 to present the training signal at its output port only during the 22nd horizontal line interval of each output video field. A high impedance is presented at the output of the ROM 2544 at all other times. The signal FID is applied to the ROM 2544 because the training signal provided by the ROM is inverted once for each four fields of video signal. This inversion is sensed at the receiver, as described below, to align the four field sequence of the receiver to that of the transmitter. The output ports of the ROM's 2542 and 2544 are coupled together and to the input port of a digital to analog converter (DAC) 2554.

The DAC 2554 is a part of the circuitry used by the studio timing signal generator 2 to develop the analog composite synchronization signal, OCPS, which is inserted into the output video signal by the analog switches 6 and 8 described above in reference to FIG. 1a. To develop the signal OCPS, the signals OHS and OVS are combined in an OR gate 2546 to generate a control signal for an analog switch 2552. The switch 2552 is conditioned by this control signal to pass the analog value (e.g. −40 IRE) provided by a source of sync tip signal 2550, during the times that the output signal of the gate 2546 indicates that a synchronization signal is present, and to pass a blanking signal (e.g. 0 IRE) otherwise. The output signal of the analog switch 2552 is applied to one input terminal of a further analog switch 2556. A second input terminal of the switch 2556 is coupled to receive the combined burst and training signals provided by the DAC 2554. The analog switch 2556 is conditioned by a signal provided by an OR gate 2558 to pass the burst signal during the burst interval of each line and to pass the training signal during line 22 of each field. At all other times, the switch 2556 passes the signal provided by the analog switch 2552. The input signals to the OR gate 2558 are the burst flag signal, BF, from ROM 2526, and the line 22 signal, L22.

The composite synchronization signal, CCPS, for the progressive scan camera 10 is developed by apparatus similar to that used to develop the signal OCPS. The camera vertical synchronizing signal, CVS, is applied to one input terminal of an OR gate 2570, another input terminal of which is coupled to receive the camera horizontal synchronization signal, CHS, provided by the ROM 2526. The output signal of the OR gate 2570 is coupled to the control input terminal of an analog switch 2568. The switch 2568 is conditioned by this signal to pass an analog value (−40 IRE) from a source of sync tip 2564 for the synchronizing signals indicated by the signal provided by the OR gate 2570 and to pass a blanking level (0 IRE), from a source 2562, otherwise. The output signal of the analog switch 2568 is the camera composite synchronization signal, CCPS.

As set forth above in reference to FIG. 1a, the analog switches 6 and 8 are responsive to respective control signals SC1 and SC2 for conditionally inserting the external video signal, EV, and for unconditionally inserting the composite synchronization signal OCPS into the output signal of widescreen EDTV encoding system as set forth above, the signal OCPS is inserted regardless of the source of video signal to ensure that locally generated EDTV signals are synchronized to external (e.g. network) signals.

The control signals SC1 and SC2 are generated as follows. Referring to FIG. 25, the synchronization signal separation circuitry 2510 produces a signal ESP which indicates when an external video signal EV is present. The signal ESP is applied to one pole of a switch 2573, the other pole of which is coupled to a source of logic-zero, 2572. The wiper of the switch 2573 is manually controlled; when it is coupled to the signal ESP and the external video signal EV is present, the encoding system is bypassed and the signal EV is used both to generate the synchronizing signals OCPS and CCPS and to provide the video output signals of the encoder, when the wiper is coupled to the source 2572, the signal EV is only used to develop the synchronizing signals, the actual video signals are generated by the widescreen EDTV encoder from the signals provided by the camera 10. When the signal EV is not present, the synchronizing signals are developed by the signal generator 2 without a reference signal.

To generate the signal SC1, the signal provided by the switch 2573 is inverted by an inverter 2574 and then logically ANDed with the signal L22 in an AND gate 2576. The output signal of the AND gate 2576 is applied to one input terminal of an OR gate 2578. The other two input terminals of the OR gate 2578 are coupled to receive the output horizontal and vertical blanking signals, OHB and OVB. The output signal of the OR gate 2578 is the control signal SC1. The control signal SC2 is the logical OR of the signal provided by the switch 2573 and the signal SC1.

In operation, when the signal provided by the switch 2573 has a value of logic-one, the output signal of the encoder is the external video signal EV with the horizontal and vertical synchronizing signal components and the burst signal component of the signal OCPS inserted in blanking regions defined by the signal SC1. The training signal component of the signal OCPS is excluded; the 15 training signal component contained in the signal EV is passed with the signal through the switches 6 and 8. The training signal component of the external video signal EV is not overwritten to preserve the timing relationship which was established when the signal was generated. Since the training signal is established when a video signal is encoded, it is desirable that the signal not be changed until the video signal is decoded.

When the control signal SC2 has a logic-zero value, the horizontal and vertical synchronizing signals, and the burst signal contained in the signal OCPS are inserted into the video signals generated by the encoder in blanking intervals defined by the signals OHB and OVB; the training signal component of the signal OCPS is inserted in line 22 of the generated video signal.

As set forth above, the training signal is used to synchronize the encoding and decoding systems. The format of the training signal is not fixed. It may be any one of a number of different signals, two of which are presented below. In the present embodiment of the invention, the training signal is used to determine the timing of the first active video sample on each horizontal line interval of the video signal to within five nanoseconds (ns) and to ensure proper phase alignment of the signals ASC, ASC' and fc between the studio and the receiver.

FIG. 25a illustrates the burst flag signal, BF, the output horizontal blanking signal, OHB, and the timing reference signal H that are generated by the timing circuitry 2. The signal EV is included in FIG. 25a as a reference. As illustrated by the waveforms shown in FIG. 25a, the value of the signal PC, provided by the counter 2524, is reset to zero coincident with a positive going transition of the signal OHB. The first active sample time, indicated by the signal H, occurs when PC is equal to 308. The sample time before the start of the horizontal blanking interval is at PC equal to 1819.

Under the NTSC standard, the phase of the chrominance subcarrier signal is predetermined for each line of the video signal. Thus, the phase value of the first sample time for a particular line depends on the phase of the burst signal, on whether the line is an odd line or an even line, and in which field of the four field sequence the line occurs. The sample time of the first pixel on a horizontal line also corresponds to predetermined phases of the alternate subcarrier signals, ASC and ASC', and to the heterodyning carrier signal, fc, since in the timing signal generator 2, these signals are derived from the pixel count signal, PC.

In the receiver, the training signal is recovered, used to adjust the phase of a 4×fsc sampling clock signal and to adjust a count-down circuit which develops a horizontal line synchronizing signal from the sampling clock signal. This count-down circuit is also used to regenerate the alternate subcarrier signals, ASC and ASC', and the heterodyning carrier signal, fc. The synchronizing circuitry is described below in reference to FIG. 26.

In this embodiment of the invention, the training signal is inserted into line 22 of the video signal produced by the encoder. This line is in the active video portion of the signal, not in the vertical blanking interval. The training signal is inserted in the active video region as opposed to the vertical blanking interval, because, in many television broadcast and cablecast plants, the synchronization signals are stripped from the video signals during processing and then reinserted before the signal is transmitted. It has been noticed by the inventors that the operation of removing and reinserting the synchronization signals may produce slight timing errors in the signal provided by the broadcast and cablecast plants. These timing errors appear as a horizontal or vertical shift in the position of the displayed image relative to the original image, or as errors in colors reproduced in the displayed image. In the system described herein, timing errors of this type may produce additional distortion in the reproduced image as set forth above in the background of the invention. These errors are avoided in the present embodiment because the training signal, which determines the timing of the various component signals in the receiver, is inserted in a vertical overscan region of the active video region of the processed signal and, thus is not removed during processing at the plant. It is contemplated, however, that the training signal may be inserted in the vertical blanking interval.

The training signal used in this embodiment of the invention is a repeated psuedo-random noise (PN) sequence which has been band-limited to fit within the frequency spectrum of an NTSC video signal. The use of a PN sequence for a time reference is well known. See, for example, W. Peterson, "Error Correcting Codes", MIT Press, 1961 pp 147–148. An alternative training signal is also presented, this sequence is a raised-cosine 2T pulse which has been non-causally filtered before being stored in the ROM 2544.

Figure 25B:
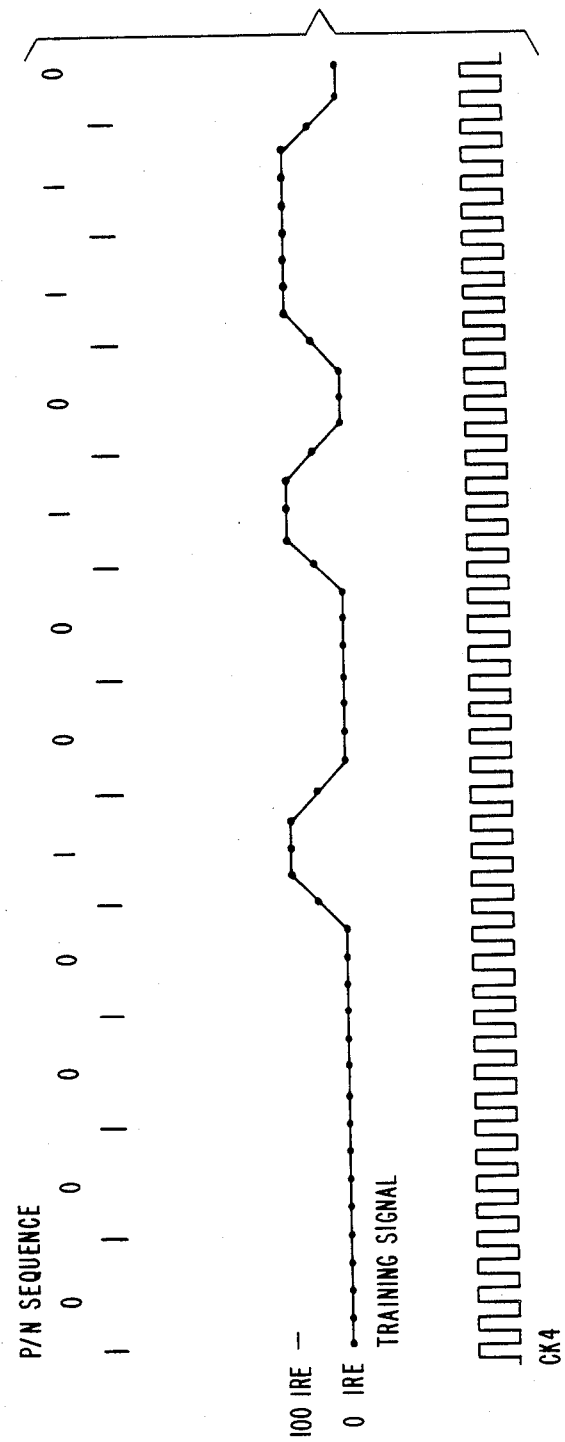

The particular PN sequence used in this embodiment of the invention includes 31 bits of information and is repeated six times during the 22nd horizontal line interval of each field. Because the transmitted signal is band-limited to 4.2 MHz, each bit of the PN sequence used in the training signal is represented by four 4×fsc samples. The six repetitions of the sequence may be averaged in the receiver to increase the accuracy of the first sample time determination when the video signal is received through a noisy transmission channel. FIG. 25b illustrates the timing of the training signal.

The first 12 bits of the PN sequence are illustrated on the top line of FIG. 25b. The complete PN sequence includes 31 bits: 0,0,0,0,1,0,0,1,0,1,1,0,0,1, 1,1,1,0,0,0,1,1,0,1,1,1,0,1,0,1. As illustrated by the waveform for the training signal, the second waveform shown in FIG. 25b, the zero and one levels of the PN sequence correspond to digital sample values which represent 0 IRE and 100 IRE, respectively. The band-limiting of the PN sequence limits the rise and fall time of the training signal to two sample periods of the signal 4×fsc, or 140 ns. The training signal illustrated in FIG. 25b, is provided by the ROM 2444 in response to successive values of the signal PC, which increases in value at a rate of 8×fsc. The first sample of the first instance of the training signal is provided when PC equals 312, and the last sample value of the sixth instance of the training signal is provided when PC equals 1816.

Figure 25C:
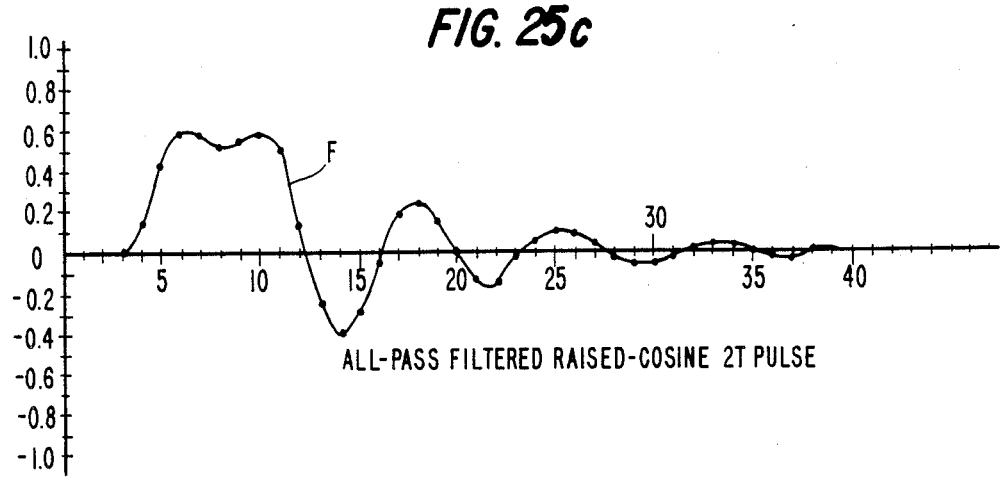

The alternative training signal is a non-causally filtered raised-cosine 2T pulse illustrated by FIG. 25c. This training signal is developed as follows. Samples, SC, of a raised-cosine 2T pulse are generated using the equation (1).

$$SC = 0 \text{ for } N = 0 \text{ to } 3$$
$$SC = (1 - \text{cosine}[2PI(N-3)/7])/2 \text{ for } N = 4 \text{ to } 9$$
$$SC = 0 \text{ for } N = 10 \text{ to } 40 \tag{1}$$

where N is a count of sample times having a sampling frequency of 4×fsc.

The samples SC are then applied to an all-pass filter. An exemplary all-pass filter has the transfer function AF(z) set forth in equation (2), where z-transform variable.

$$AF(z) = 1.291(0.774z^2 - 1.2z + 1)/(z^2 - 1.2z + 0.774) \tag{2}$$

Figure 25D:
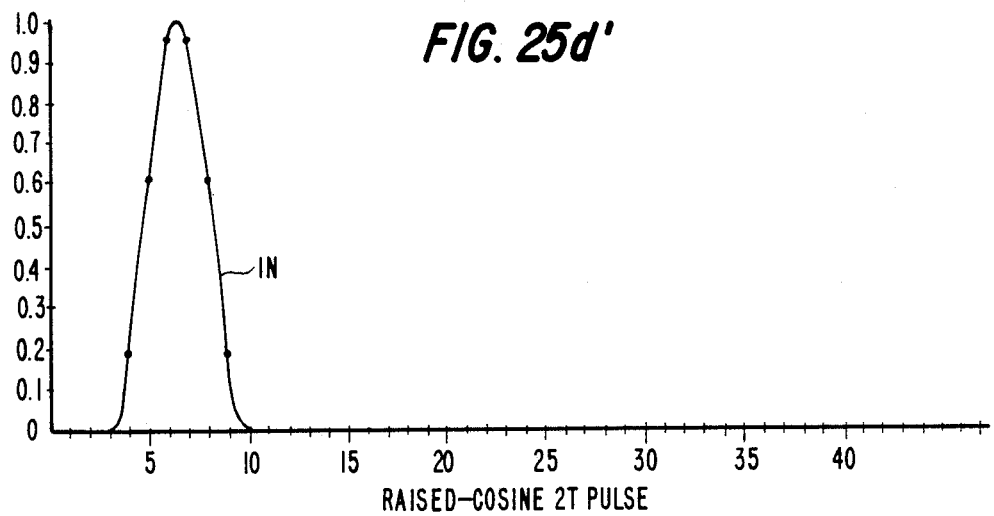
Figure 25D:
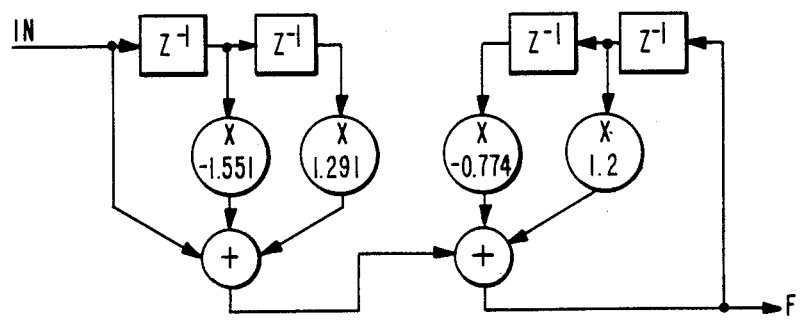

Circuitry which realizes this filter is shown in FIG. 25d. This filter is known as an all-pass filter because it passes all frequencies with equal gain but with unequal phase response. This filter has a pair of complex poles and a pair of complex zeros in the Z-plane that are at the same respective angles but have inverse radius.

The signal, F, shown in FIG. 25c is the output signal produced by this all-pass filter in response to the 2T pulse. This signal has substantially the same frequency spectrum as the 2T pulse, since the filter which produced it is an all-pass filter, but the signal is spread temporally and, so, is less susceptible to impulse noise distortion than an unfiltered 2T pulse. Before it is used as the training signal, the 40 sample sequence which defines signal F is time-reversed, such that the filtered sample zero becomes sample 40 and the filtered sample 40 becomes sample zero. This time-reversed sequence is repeated six times during the 22nd horizontal line interval of each field to generate the training signal.

When, in a receiver, the repetitions of this training signal are accumulated and the resultant signal is applied to a filter having the transfer function set forth in equation (2), a time reversed 2T pulse may be substantially recovered. Any impulse noise distortion in the recovered 2T pulse will be temporally spread.

Figure 13:
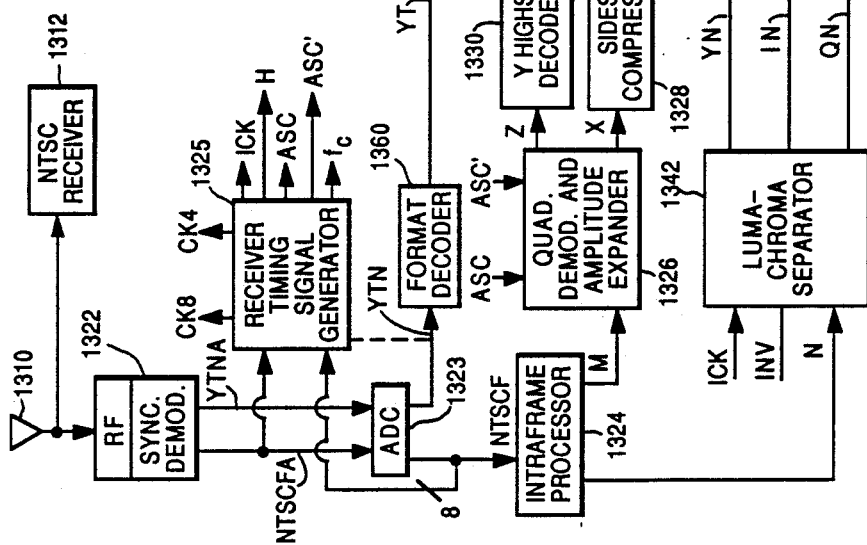
FIG. 13 shows a block diagram of a portion of a widescreen EDTV receiver including decoder apparatus in accordance with the present invention.

In FIG. 13, a broadcast compatible widescreen EDTV interlaced television signal is received by an antenna 1310 and applied to an antenna input of an NTSC receiver 1312. Receiver 1312 processes the compatible widescreen signal in normal fashion to produce an image display with a 4:3 aspect ratio, with the widescreen side panel information being in-part (i.e., the low frequency components) compressed into the horizontal overscan regions out of sight of the viewer, and being in part (i.e., the high frequency components) contained in the modulated alternate subcarrier signal which is perceptually hidden in the display produced during standard receiver operation.

In FIG. 13, the compatible widescreen EDTV signal received by antenna 1310 is also applied to a widescreen Progressive scan receiver 1320 capable of displaying a video image with a wide aspect ratio of, e.g., 5:3. The received widescreen signal is processed by an input unit 1322 including radio frequency (RF) tuner and amplifier circuits and a synchronous video demodulator (a quadrature demodulator) which produces a baseband video signal (NTSCFA) representing the in-phase component of the RF video signal and a signal (YTNA) representing the quadrature phase component of the RF video signal and analog-to-digital (ADC) converter circuits which digitize the signals NTSCFA and YTNA to produce digitized signals NTSCF and YTN. The ADC circuits operate at a sampling rate of four times the chrominance subcarrier frequency (4×fsc).

Both the analog and digital versions of the signal NTSCF are applied to a receiver timing signal generator 1325. The analog signal is used to develop coarse synchronization signals and the training signal component of the digital signal is used to fine-tune the synchronization signals. Optionally, the digitized version of the signal YTN, representing the quadrature component of the training signal, may also be applied to the generator 1325 to improve the fine-tuning of the synchronization signals. The receiver timing signal generator 1325 is responsive to the horizontal and vertical synchronizing signal components, to the color synchronizing burst signal component and to the training signal component of the signal NTSCFA for generating various timing signals used by the receiver. These timing signals include a 4×fsc clock signal, CLK4; a clock signal, ICK, having negative-going transitions which occur coincident with the I color difference signal phase of the received color subcarrier signal; two signals, ASC and ASC', which represent the quadrature alternate subcarrier signals and are substantially identical to the signals of the same name produced by the encoder; a signal fc which represents the five MHz heterodyning carrier signal used by the encoder in the processing of component 3 of the EDTV signal; and a signal, H, which indicates which of the samples in a horizontal line interval of the signal NTSCF is the first active video sample. These signals are used by the widescreen progressive scan receiver 1320 as described below.

Figure 26:
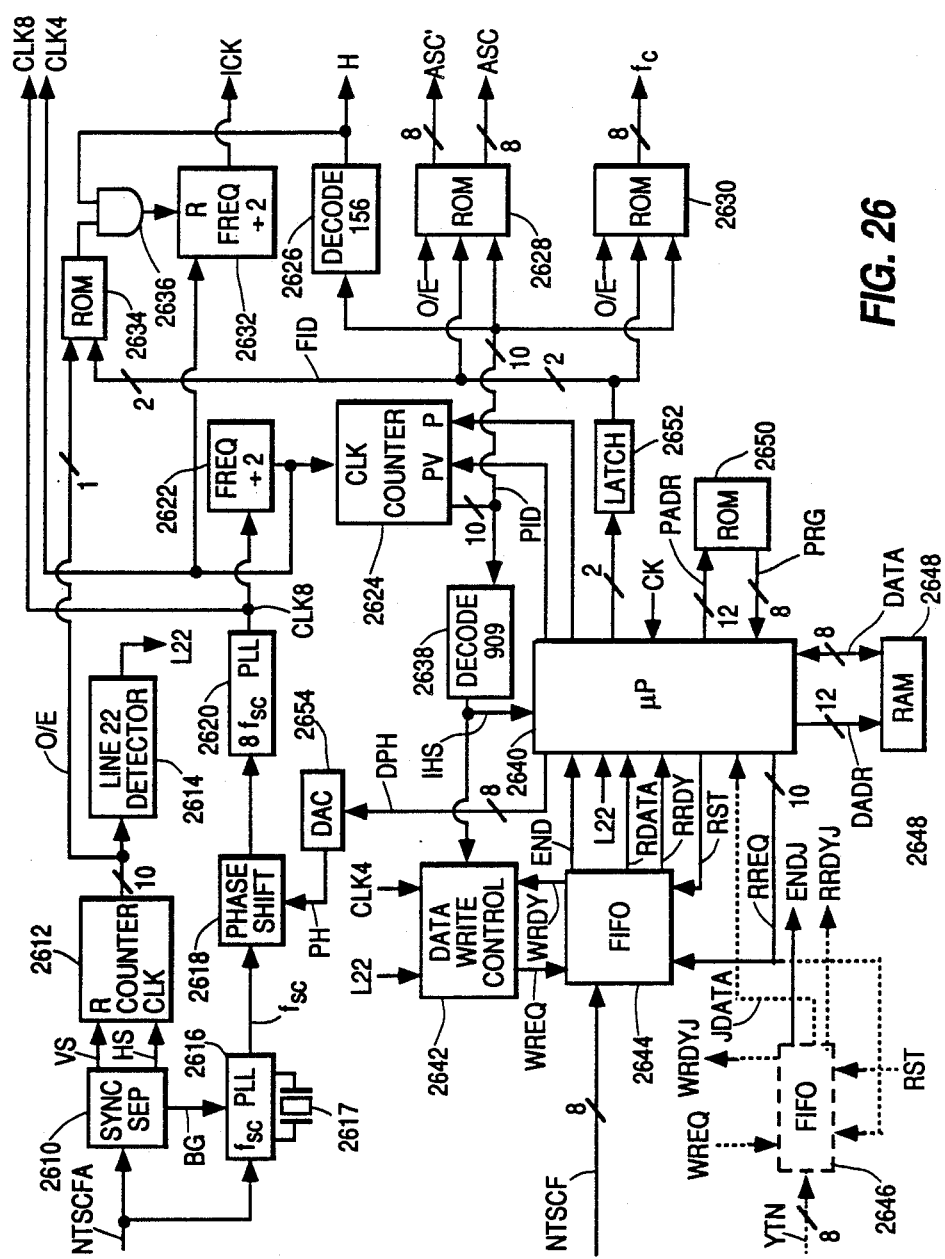

The following is an overview of the operation of an exemplary receiver timing signal generator 1325 shown in FIG. 26. The generator includes a phase locked loop system which generates a clock signal, CLK4, having a frequency that is substantially equal to 4×fsc and that is locked in phase to the color burst signal component of the signal NTSCFA. The pulses of this signal are counted to produce a pixel identifying signal, PID, and an internal horizontal sync pulse, IHS. A microprocessor 2640 is responsive to the signal IHS, and to a signal, L22, which indicates the active pixel interval of the $22^{nd}$ horizontal line of each field, to collect samples of the training signal and to correlate them to a stored version of the training signal held in a ROM 2650. From this correlation, the microprocessor 2640 adjusts the phases of the signals CLK4 and IHS so that they are aligned with the training signal to within five ns. The microprocessor 2640 also generates a signal FID which indicates which field of the NTSC four field sequence is currently being processed. The signals PID and FID are applied as address signals to ROMs internal to the timing signal generator to produce the signals ASC, ASC' and fc.

Specifically, in the arrangement shown in FIG. 26, the analog in-phase signal, NTSCFA is applied to conventional synchronizing signal separation circuitry 2610 which separates the horizontal line synchronization signal, HS, and the vertical field synchronization signal, VS, from the signal NTSCFA. The signals VS and HS are applied to the respective reset and clock input terminals of a ten-bit counter 2612. The output signal of this counter is the line number, in the current field, of the samples of the signals NTSCF and YTN that are currently being provided by the ADC 1323. This signal is applied to a line 22 detector 2614 which generates a signal L22. The signal L22 is a pulse occurring once per field which spans the $22^{nd}$ horizontal line interval of the field.

A burst gate signal BG, is also produced by the circuitry 2610. This signal is applied to a conventional PLL 2616 which uses the burst gate signal to separate the burst signal component from the signal NTSCFA. The PLL 2616, which includes a resonant crystal, 2617, regenerates the chrominance subcarrier signal, Fsc, which is locked in phase to the burst signal component of the signal NTSCFA. The signal Fsc is applied to one input terminal of a conventional controllable phase shifting circuit 2618. The circuit 2618 is responsive to an analog phase shift control signal, PH, applied to a control input terminal, for shifting the phase of the signal Fsc by an angle between −45 and +45 degrees. The phase shift control signal PH is provided by the microprocessor 2640 via a DAC 2654. The generation of the signal PH is described below in reference to FIGS. 26a through 26f.

The phase shifted signal Fsc, provided by the circuitry 2618, is applied to a further PLL 2620. The PLL 2620, which may be of conventional design, provides an output oscillatory signal, CLK8, that has a frequency substantially equal to 8 x fsc and that is locked in phase to the signal Fsc. The signal CLK8 is applied to a frequency divider 2622 which halves the frequency of the signal CLK8 to produce the signal CLK4.

The signal CLK4 is applied to the clock input terminal of a ten-bit counter 2624. The output signal of the counter 2624 is the signal PID which, when the system is synchronized, contains a sample index, relative to the start of the horizontal blanking interval, for each sample of the signals NTSCF and YTN provided by the ADC's 1323. This sample index is used to generate the various timing and synchronization signals as described below. The signal PID is applied to the input port of a decoding circuit 2638. The circuit 2638 generates the pulse signal, IHS, which is in a logic-one state for one period of the signal CLK4 coincident with the signal PID having a value of 909.

The signal IHS is applied to an input terminal of data write control circuitry 2642. The circuitry 2642 is responsive to the signals IHS, CLK4 and L22 and to a write ready signal, WRDY, for generating a write request signal, WREQ, for a first-in-first-out (FIFO) memory 2644. The FIFO 2644 is responsive to the signal WREQ to store samples of the signal NTSCF that are applied to its input port. When the FIFO is ready to accept a new sample, it applies a logic-one value as the signal WRDY to the data write control circuitry 2642. The FIFO 2644 is conditioned by the signal WREQ to store all of the samples of the signal NTSCF occurring between the time that the signal L22 indicates that samples from the $22^{nd}$ horizontal line interval of a field are being provided and the occurrence of the pulse of the signal IHS. When the signal IHS is properly aligned to the training signal, this operation stores the complete training signal component of the signal NTSCF into the FIFO 2644.

In an alternative embodiment of the invention, the signal WREQ is further coupled to a FIFO 2646 (shown in phantom) to condition the FIFO 2646 to store samples representing the $22^{nd}$ line interval of the signal YTN. These samples are used by the microprocessor 2640 to correlate the received training signal to the stored training signal and so synchronize the timing signals used in the receiver to those used in the studio. In this alternative configuration, the signal WRDY from the FIFO 2646 is logically ANDed (not shown)

with the signal WRDY provided by the FIFO 2644 for application to the data write control circuit 2642.

The sample values stored during the 22$^{nd}$ horizontal line interval of a field are read from the FIFO 2644 during the ensuing field interval. The microprocessor 2640 reads data from the FIFO 2644, via the buss RDATA, by repeatedly causing a pulse signal RREQ to be generated. The FIFO indicates that it is ready to provide the next sample value by applying a logic-one value, as a signal RRDY, to the microprocessor 2640. When the last data value stored of the FIFO 2644 has been read, the FIFO applies a logic one value as the signal END to the microprocessor 2640. When the microprocessor 2640 receives a one-valued END signal, it causes a pulse signal RST to be generated which, in turn, resets the FIFO 2644, enabling it to accept data for the next field. In the alternate embodiment of the invention, the FIFO 2646 provides signals RRDYJ, ENDJ and JDATA which correspond to the signals RRDY, END and RDATA provided by the FIFO 2644. The signals END and ENDJ are logically ORed (not shown) so that either one may indicate the end of valid data to the microprocessor 2640.

The data read from the FIFO 2644 and optionally from FIFO 2646 are correlated to samples stored in the ROM 2650 which, for the PN sequence, are substantially identical to one repetition of the samples of the training signal stored in the ROM 2544 of the studio timing signal generator 2. When the filtered and time-reversed 2T pulse is used as a training signal, the stored training signal is substantially a time reversed version of the 2T pulse that was used to generate the training signal.

In order to obtain as close a correlation between the received and stored training signals as is possible, the microprocessor 2640 adjusts the phase of the signal IHS via a signal applied to the preset value (PV) input port of the counter 2624. When a pulse of the signal IHS occurs, the instantaneous value of the signal applied to the PV input port of the counter is loaded as the initial count value. The microprocessor 2640 adjusts the phase of the signal CLK4 by changing the value of the phase shift signal PH applied to the phase shift circuitry 2618. The correlation operation is repeated on each field of the received signal to maintain the synchronization of the receiver within close tolerances (i.e. within 5 ns). The signals PV and PH are, in effect, time reference signals which align the signals derived from the signal P$_{sc}$ and the counter 2624 to corresponding signals generated by the widescreen EDTV encoder described above with reference to FIG. 1a.

In the present embodiment of the invention, the ROM 2650 includes a stored program which controls the functioning of the microprocessor 2640. In addition to the ROM 2650, the microprocessor 2640 uses a RAM 2648 as a scratchpad memory during the correlation process.

The correlation process performed by the microprocessor 2640 is illustrated by the flow charts shown in FIGS. 26a through 26f. To simplify the explanation of the correlation process, the description below initially assumes that samples of the PN sequence training signal are stored in the FIFO 2644. Modifications to the process to use the FIFO 2646 and to use the time reversed 2T pulse as the training signal are described separately.

Figure 26A:
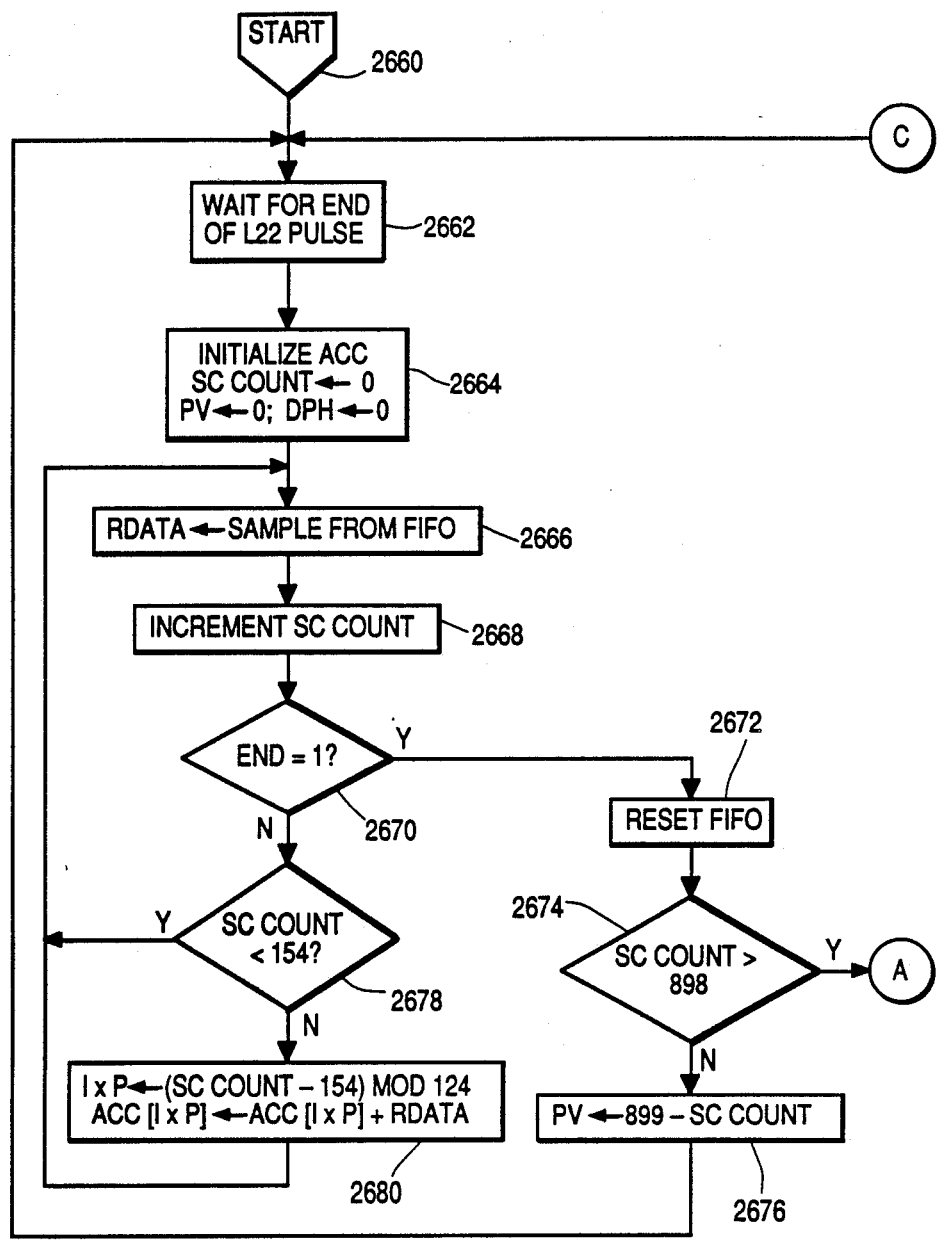
Figure 26B:
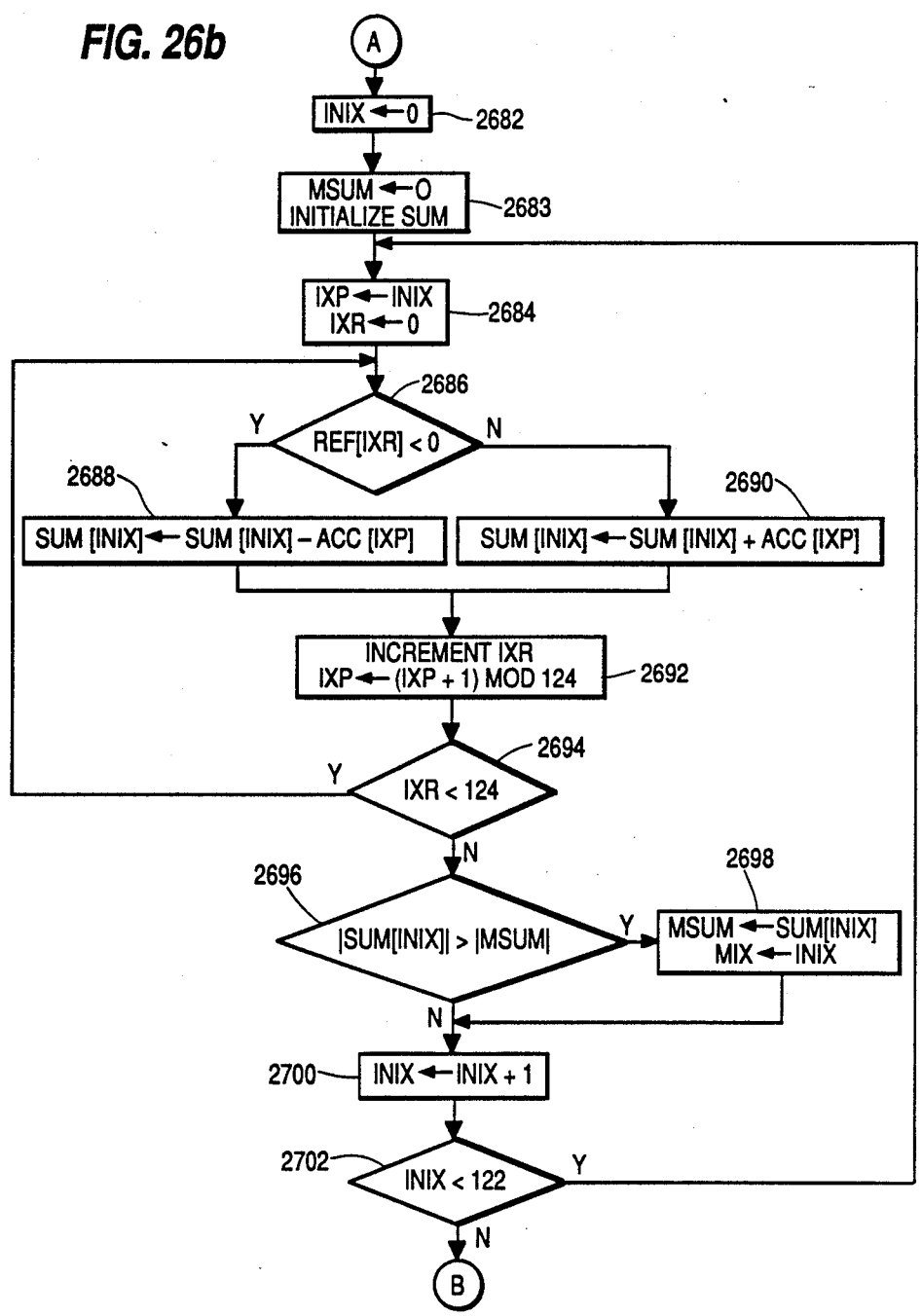
Figure 26C:
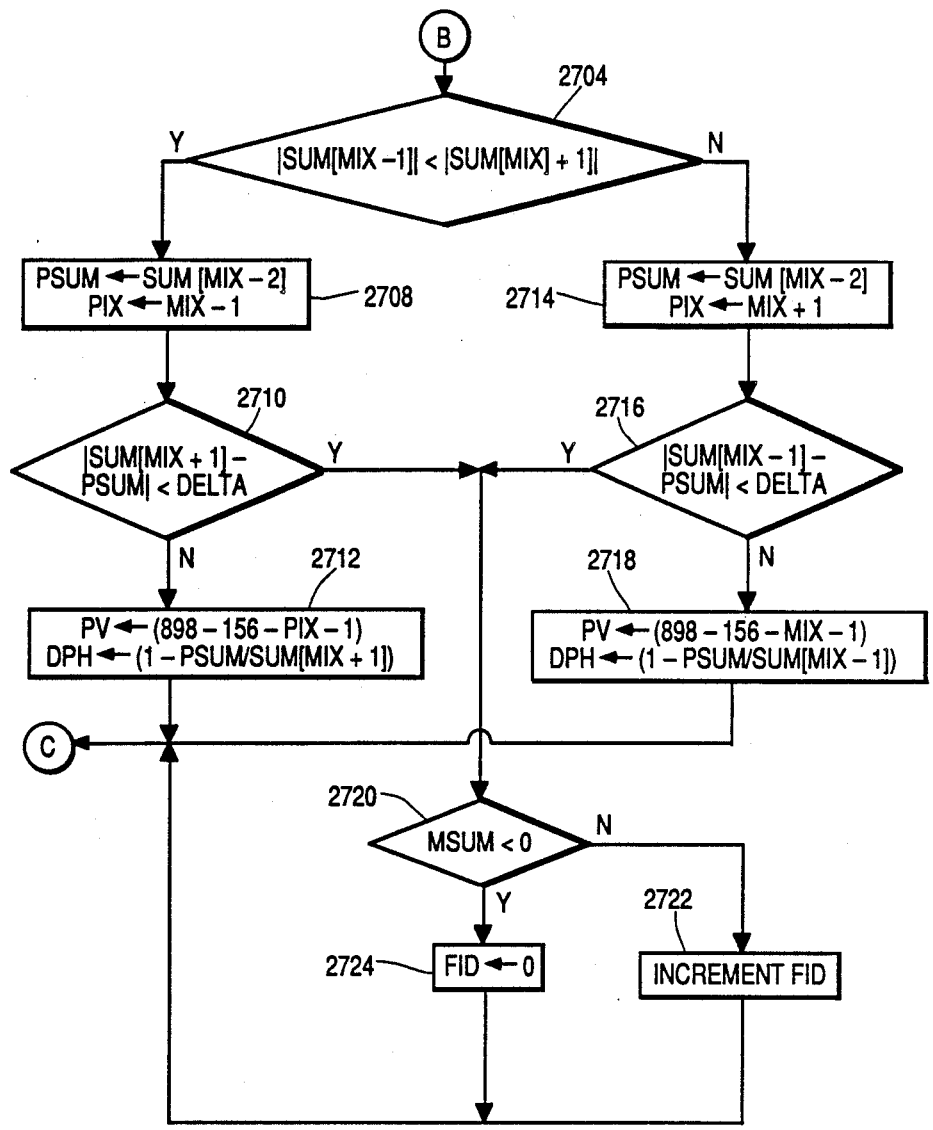

The following is an overview of the processing represented by the flow charts in FIGS. 26a through 26c. After initializing the memory locations used by the microprocessor (steps 2662–2664), the program in FIG. 26a extracts sample values from the FIFO 2644 and accumulates them in 124 memory locations of a data array ACC (steps 2666, 2668 and 2680). If the program determines (step 2674) that the samples were not taken at the proper time during line 22, it conditions the microprocessor to change the preset value, PV applied to the counter 2624 (step 2676) to correct the timing error, and then repeats the sample accumulation steps.

In FIG. 26b, the program conditions the microprocessor 2640 to calculate a sequence of sum-of product values. Each sum-of-product value represents the sum of each sample held in the array ACC multiplied by a corresponding value from a reference array REF which hold one instance of the training signal. The different sum-of-product values indicate different alignments of the samples from the arrays ACC and REF. As it calculates the different sum of product values, the microprocessor (at step 2698) determines the maximum sum of product value and the alignment of the arrays ACC and REF which produced it.

The program steps illustrated by FIG. 26c use the results of the correlation operation illustrated by FIG. 26b to calculate new values for the phase adjust signal PH and for the signal PV. This adjustment brings the timing and clock signal generated by the circuits illustrated in FIG. 26 into proper alignment with the corresponding signals used in the widescreen EDTV encoder.

The process begins in FIG. 26a with a block 2660 labeled START. This block represents, for example, any initialization procedures which are performed by the microprocessor before the correlation process begins. When the system is initialized, the microprocessor, at step 2662, waits for a negative-going transition of the signal L22. This transition marks the end of the 22$^{nd}$ horizontal line interval of a field. When this transition is detected, the training signal should be stored in the FIFO 2644. At step 2664, the microprocessor 2640 zeroes each entry in an array of memory locations, ACC, and assigns a value of zero to the variable SCCOUNT and to the output signals PV and DPH. The array ACC is used to accumulate the repetitions of the training signal; the variable SCCOUNT holds a count of the sample values read from the FIFO 2644. At step 2666, the microprocessor 2640 reads a sample value from the FIFO 2644, assigns the sample value to the variable RDATA. At step 2668, the microprocessor increments the sample count variable, SCCOUNT.

As each sample value is read from the FIFO 2644, the microprocessor, at step 2670, checks the state of the signal END provided by the FIFO 2644. If the signal END is in a logic-one state, no more samples may be read from the FIFO 2644. In this instance, the microprocessor 2640 resets the FIFO 2644 at step 2672. If, at step 2674, the sample count (SCCOUNT) is greater than 898, indicating that a complete training signal was stored into the FIFO 2644, the microprocessor 2640 branches to block 2682 of FIG. 26b. Otherwise, at step 2676, a value of 899 minus the sample count (SCCOUNT) is assigned to the signal PV and the correlation process is restarted. The steps 2672 through 2676 ensure that the signal IHS is roughly aligned with the signal L22 before a correlation is attempted.

If, at step 2670, the signal END is in a logic-zero state, the microprocessor, at step 2678, checks if the sample count is less than 154. If so, the samples represent the portion of the 22$^{nd}$ horizontal line interval which includes the horizontal blanking interval. This interval is ignored since it does not include any of the training signal. Consequently, the yes (Y) branch from the decision block 1678 conditions the microprocessor 2640, at step 2666, to read the next sample value from the FIFO 2644.

If the sample count, SCCOUNT, at step 2678 is greater than or equal to 154, the microprocessor accumulates the sample value, RDATA, in the array ACC. Since each repeated sequence of the training signal includes 124 sample values, samples that are separated by 123 intervening samples are corresponding sample values from successive sequences. The step 2680 determines the index (IXP) in the array ACC for the current sample using modulo (MOD) 124 addition (step 2680) and then adds the sample value to the accumulated sum at that index. The microprocessor 2640 branches to the step 2666 once the step 2680 has been performed.

The step 2682 of FIG. 26b, which is performed due to a Y branch from the decision block 2674, begins the correlation process. In this process, the accumulated data in the array ACC is correlated to reference data in an array REF which is stored in the ROM 2650. The correlation process treats each of the arrays ACC and REF as being circular in structure, that is, it assumes that the entry at index 0 follows the entry at index 123. Ideally, the correlation process would proceed as follows. Each value in the array ACC is multiplied by a corresponding value in the array REF and the resultant products are summed to generate one value. Next, the indicies of the arrays ACC an REF are offset to change their correspondence and another value would be generated. This process is repeated until all possible correspondences have been tried. It is a property of the PN sequence that the largest generated value occurs at the closest correlation between the arrays ACC and REF.

Referring to FIG. 26b, the step 2682 assigns a value of zero to a variable INIX which holds the index offset value for the arrays ACC and REF. In step 2683, a variable MSUM which holds the maximum sum of products value is assigned a value of zero and each entry of an array SUM is set to zero. The array SUM holds the sum-of-product values for each correspondence between ACC and REF as they are calculated. The next step, 2684, assigns the value in INIX to the index, IXP, for the array ACC and assigns a value of zero to the index, IXR, for the array REF.

The steps 2686, 2688 and 2690 implement an approximation of a multiplication operation that is used to form each product of a sum of products value. The decision block 2686 checks if the currently indexed reference value is negative. If so, the Y branch of the decision block causes step 2688 to be executed next. Otherwise, step 2690 is executed. Step 2688 subtracts the currently indexed value of ACC from the value in the array SUM, while step 2690 adds the indexed value of ACC to the value in the array SUM. This process effectively reduces the array REF to an array containing only values of +1 or −1 to the extent that the entries of the array REF multiply entries of the array ACC. Since, in the present embodiment of the invention, television signals are quantized in eight-bit twos complement values, where −40 IRE and 100 IRE correspond to respective quantized values of −128 and +127, samples of the training signal representing values less than 30 IRE are negative and samples representing values greater than 30 IRE are positive. While this approximation is less rigorous than a true multiplication operation, the inventors have determined that it produces satisfactory results and significantly reduces the computation time for the correlation operation.

Step 2692 increments the index variables IXR and IXP. The variable IXP is incremented modulo 124 to implement the circular correlation described above. The decision block 2694 causes the sum and product operations to repeat while IXR is less than 124. When IXR equals 124, all entries of the reference array have been used and the sum and product operation is complete for the offset value held in the variable INIX.

The decision block 2696 compares the absolute value of the newly computed sum to the absolute value of the largest sum computed so far, MSUM. If the new sum is greater than MSUM, it is assigned, at step 2698, to MSUM, and the offset, INIX, between the arrays ACC and REF that was used to develop the new sum is assigned to the variable MIX. After executing step 2698—or on the no (N) branch of the decision block 2696—the value of the variable INIX is increased by one. If, at step 2702, the value of INIX is less than 123, the computation of the sum of products terms continues, at step 2684, with a larger offset between the arrays ACC and REF.

When the value of INIX equals or exceeds 122, the circular correlation of the arrays ACC and REF is complete. The microprocessor 2640 next executes the decision block 2704 shown in FIG. 26c. The block 2704 compares the sum of product values for the index offset values that immediately surround MIX. If the magnitude of the sum of product value for the index less than MIX is greater than that for the index greater than MIX, the step 2708 assigns SUM [MIX−2] to a variable PSUM and assigns the value MIX−1 to a variable PIX. Otherwise the values of SUM [MIX+2] and MIX+1 are assigned to the variables PSUM and PIX in the step 2714. These steps establish the optional offset between the arrays ACC and REF as being between the values held in MIX and PIX. Decision blocks 2710 and 2716 following the respective steps 2708 and 2716 check the magnitude of the respective difference between SUM[MIX +1 and PSUM or SUM[MIX - 1]and PSUM against a minimum threshold value, DELTA. A difference less than this threshold value indicates that the receiver and transmitted signal are aligned to within 5 ns. If the difference exceeds the threshold value, further adjustment in the phases of the signals CLK4 and IHS is desirable. Thus, at the respective steps 2712 and 2718, the microprocessor 2640 assigns new values to the variables PV and DPH. The determination of whether a phase adjustment is needed and calculation of the phase adjustment value to be assigned to the variable DPH use product-of-sum values that are displaced by one index in each direction from MIX and PIX. These product-of-sum values lie on portions of a bell-shaped curve that have the greatest slope. Consequently, these product-of-sum values are the most sensitive to the slight phase changes caused by adjusting the value of the signal PH.

After executing either of the steps 2712 or 2718 or on the Y branches of either of the decision blocks 2710 or 2716, the microprocessor 2640 executes the decision block 2720. The block 2720 checks if the largest sum of products value is negative. If so, the value of the signal FID, provided by the microprocessor 2640 to a latch 2652, is set to zero at step 2724. Otherwise, the value of FID is incremented at step 2722. As set forth above, the training signal provided by the encoder is inverted (i.e. 100 IRE corresponds to −128 and −40 IRE corresponds to +127) once every four fields to transmit the field identifier (0, 1, 2, or 3) to the receiver. After executing either of the steps 2722 or 2724, the microprocessor 2640 branches to step 2662 to begin the correlation operation for the next video field. Thus, the correlation operation continues as long as widescreen EDTV signals are received.

Since the NTSC video signal is transmitted as a vestigial sideband signal, and since the training signal, whether it is the PN sequence or the filtered and time-reversed 2T pulse, occupies the full bandwidth of the video signal, the correlation operation described above may be affected by multipath distortion. A strong secondary (ghost) signal may cause crosstalk between the in-phase and quadrature phase components of the primary video signal by changing the apparent phase of the video carrier signal. This apparent phase error occurs because the carrier detected by the synchronous demodulator 1322 of FIG. 13 is the vector sum of the carriers of the primary and ghost signals. When this detected carrier is used to demodulate the video signal, portions of in-phase component of the primary signal appear in the demodulated quadrature phase component and vice-versa. This reduces the amplitude of the training signal and adds quadrature distortion to it.

Figure 26D:
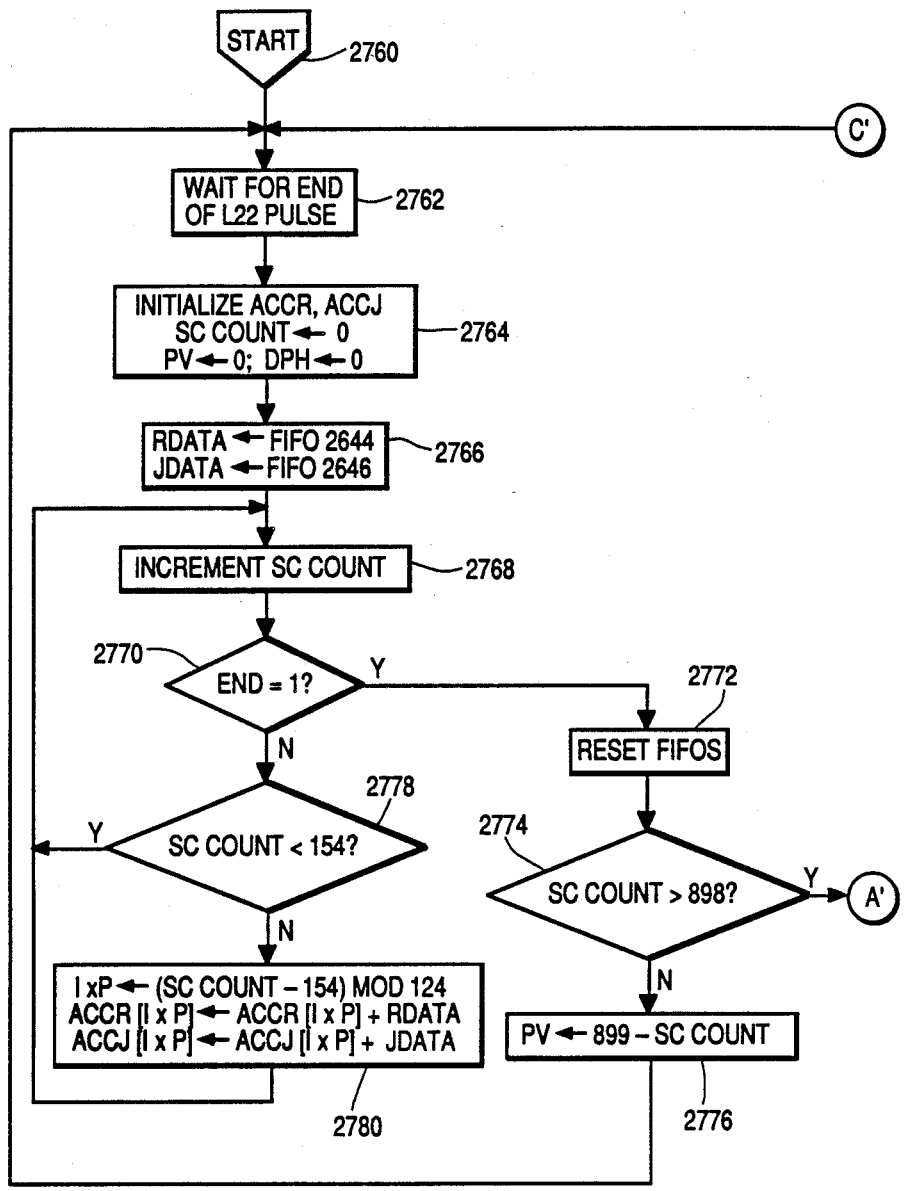
Figure 26E:
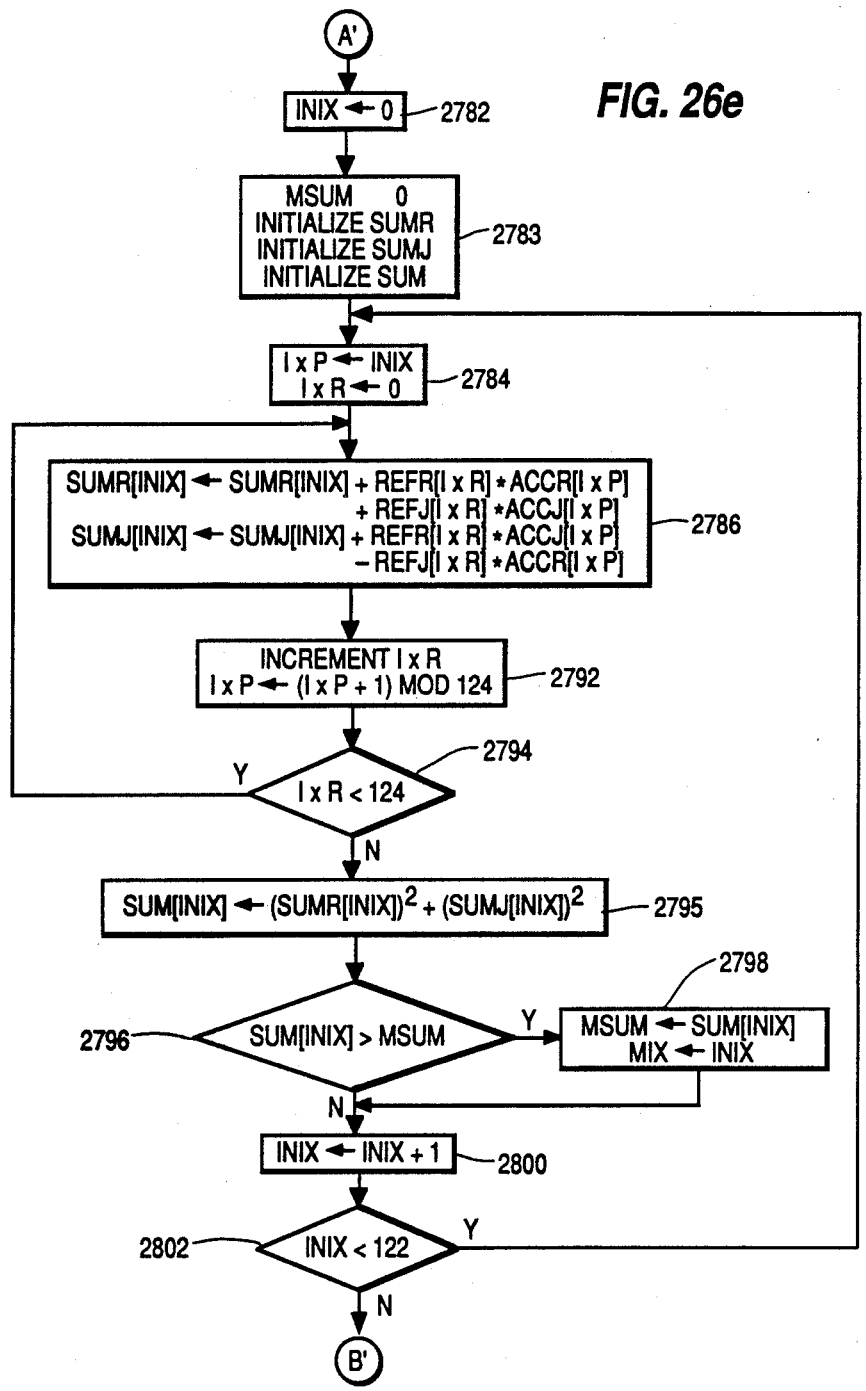
Figure 26F:
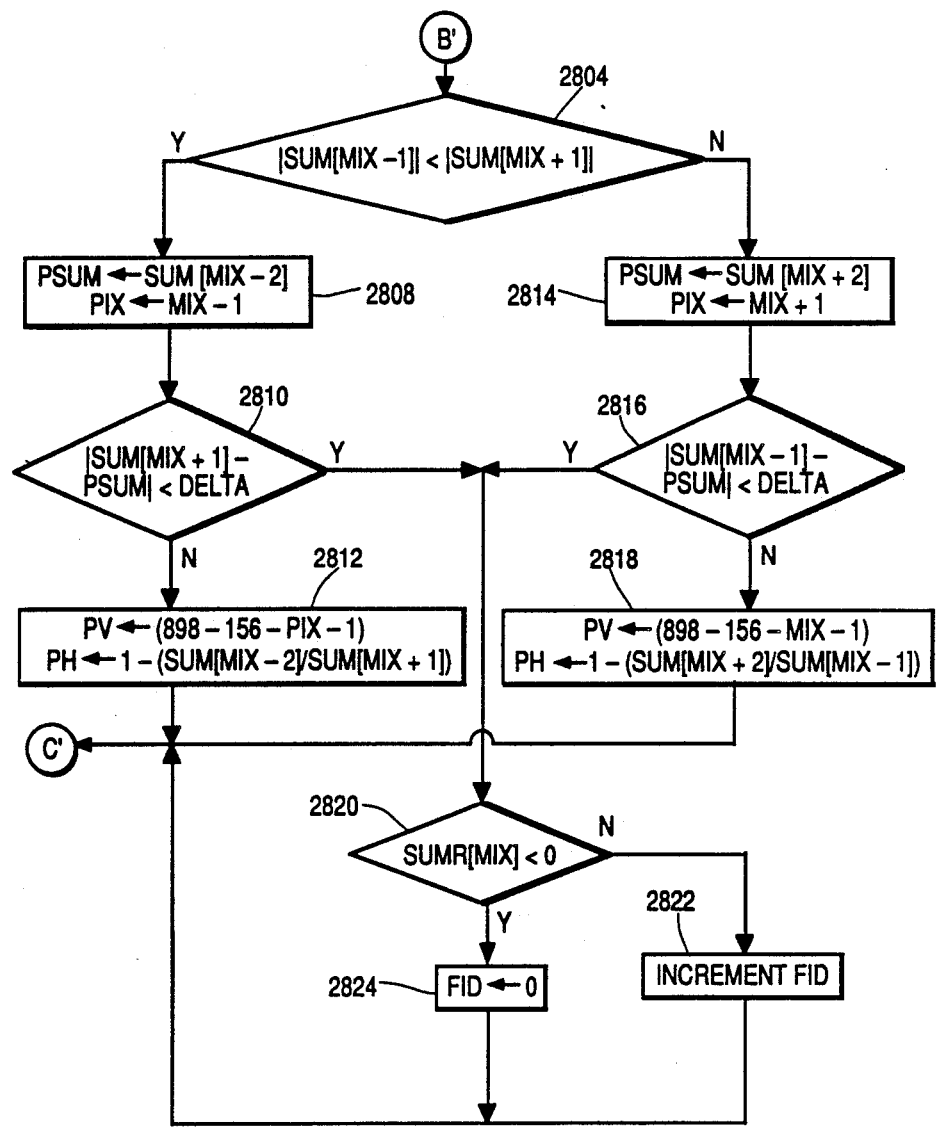

One method of compensating for potential multipath distortion is to use both the in-phase and quadrature phase components of the training signal in the correlation operation. This is accomplished by treating the in-phase and quadrature components of the video signal, NTSCF and YTN, respectively as the real and imaginary parts of a single complex signal. Modifications of the FIGS. 26a, 26b and 26c to accommodate the signal YTN in addition to the signal NTSCF are shown in FIGS. 26d, 26e and 26f, respectively. The algorithm described by these figures is essentially the same as the algorithm described above. Consequently, only the differences between the FIGS. 26a, 26b and 26c and the respective FIGS. 26d, 26e, 26f are described. In FIG. 26d a variable JDATA and an array ACCJ are added to hold the quadrature phase samples provided by the FIFO 2646. Sample values are provided to the variable JDATA from the FIFO 2646 at step 2766. At step 2780, samples from the FIFO 2646 are accumulated in the array ACCJ at the same time that samples from the FIFO 2644 are accumulated in an array ACCR. The array ACCR is the same as the array ACC of FIG. 26a.

When step 2782 of FIG. 26e is executed, the arrays ACCR and ACCJ have values representing the respective accumulation of six instances of the in-phase component and six instances of the quadrature phase component of the training signal. At step 2783, arrays SUMR and SUMJ are initialized in addition to the array SUM. At step 2786, the product of samples representing the in-phase component of the training signal held in the array ACCR and samples of a stored in-phase training signal, held in an array REFR, and the product of samples representing the quadrature phase component of the training signal held in the array ACCJ and samples of a stored quadrature phase training signal, held in an array REFJ are summed and stored into an array SUMR. At step 2786, the product of corresponding values in the arrays REFJ and ACCR is subtracted from the product of values in the arrays REFR and ACCJ. The resulting difference values are accumulated in an entry of the array SUMJ. Corresponding values in the array SUMR and SUMJ are squared and summed in step 2795 to calculate a value for the array SUM. The calculation illustrated in step 2786 is a multiplication of a complex vector (ACCR, ACCJ) representing the in-phase and quadrature phase components of the received training signal by the complex conjugate, a complex vector (REFR, REFJ) representing the in-phase and quadrature phase components of the stored reference training signal.

When step 2804 of FIG. 26f is executed, the array SUM holds values representing the sum-of-products of the arrays ACCR, ACCJ and REFR, REFJ for each correspondence of indicies between the two sets of arrays. The algorithm in FIG. 26f differs from that of FIG. 26c in that the absolute value operation is not used in steps 2704, 2710, and 2716, and that the value SUMR [MIX] is used in place of MSUM in step 2720. Since the value SUMR [MIX] is the product of the in-phase components of the received and reference training signals at the index corresponding to a maximum sum-of-products value, it is essentially the same as the value MSUM used in FIG. 26c. The value MSUM is not used in this alternative algorithm to synchronize the field sequence of the television receiver to that of the widescreen EDTV encoder because, due to the squaring operations in step 2786, the value of MSUM is always positive.

In addition to compensating for multipath distortion, the algorithm illustrated by FIGS. 26d–26f may improve the image produced by an EDTV receiver from a weak or noisy signal. This improvement in performance occurs because the correlation operation uses signal energy in the quadrature component of the received signal in addition to energy in the in-phase component. The algorithm presented above with reference to FIGS. 26a–26c uses only energy in the in-phase component of the received signal.

If the time-reversed filtered 2T pulse is used as the training signal, the correlation process is modified to include additional calculations (not shown) between the step 2674 of FIG. 26a and step 2682 of FIG. 26b which simulate the filter shown in FIG. 25c, and to replace the steps 2686, 2688 and 2690 with a step (not shown) that actually multiplies the entries in the array ACC by entries in the array REF. It may also be desirable to shorten the number of samples in the repeated sequence to, for example, 40, since there is negligible energy in the filtered 2T signal beyond 40 samples. Otherwise, the procedure for correlating the training signal to the reference signal is the same as that described above. As an alternative to simulating the all-pass filter, shown in FIG. 25d, using the microprocessor 2640, the receiver timing signal generator shown in FIG. 26 may include circuitry (not shown) such as that shown in FIG. 26d, at the input port of the FIFO 2644. This circuitry would cause a sequence of six repetitions of a time-reversed 2T pulse to be stored in the FIFO 2644. In this embodiment, the stored training signal would also be a time-reversed 2T pulse.

Referring, once more, to FIG. 26, the pixel identification signal, PID, generated by the counter 2624 is applied to a decoder 2626 which emits a time reference pulse signal, H, having a pulse width of approximately 70 ns when the value of the signal PID is 156. This time reference pulse is emitted once for each horizontal line of video signal and corresponds to the first sample of active video on the line. The signal PID; the field identification signal, FID, generated by the microprocessor 2640 and stored in the latch 2652; and a signal O/E, provided by the counter 2612, which indicates whether the current line of samples is an odd or an even line in its field; are applied to ROMs 2628 and 2630. These ROMs may be programmed similarly to the respective ROMs 2530 and 2532 described above in reference to FIG. 25. The only difference between the ROMs 2628, 2630 and the ROMs 2530, 2532 is the number of bits in the address signal PID. The signal PID in FIG. 26 is a ten-bit signal which changes at a rate of 4×fsc while the signal PC used in FIG. 25 is an eleven-bit signal which changes at a rate of 8×fsc. The ROM 2628 generates the alternate subcarrier signals ASC and ASC'. The ROM 2630 generates the 5 MHz heterodyning signal fc. These signals are used by the decoder circuitry as described below.

The signal O/E and the signal FID are further applied to a ROM 2634. The ROM 2634 is programmed to produce a logic-one output signal for each horizontal line interval in which the first active video sample has a chrominance signal component at the Q phase of the regenerated color subcarrier signal, Fsc. The signal provided by the ROM 2634 is logically ANDed with the signal H by an AND gate 2636. The pulse signal provided by the AND gate 2636 is applied to the reset input terminal, R, of a frequency divider 2632. The signal input terminal of the frequency divider 2632 is coupled to receive the 4×fsc clock signal, CK4. The output signal of the frequency divider 2632 is the signal ICK which has a frequency substantially equal to 2×fsc and which has negative going transitions that occur in substantial coincidence with the I phase of the color subcarrier signal, Fsc.

Referring to FIG. 13, the signal NTSCF is applied to an intraframe averager-differencer unit 1324 which averages (additively combines) and differences (subtractively combines) image lines 262H apart within a frame, at frequencies greater than 1.7 MHz, to recover main signal N and quadrature modulated signal M substantially free from V-T crosstalk. A 200 KHz horizontal crosstalk guardband is provided between the 1.7 MHz lower limit operating frequency of the intra-frame averager-differencer 1324 and the 1.5 MHz lower limit operating frequency of the intra-frame averager 38, used in the encoder of FIG. 1a. This guard band substantially eliminates crosstalk between the signal M and the luminance signal components of the signal N. The recovered signal N contains information which is essentially visually identical to image information of main signal C/SL, due to the high visual intraframe image correlation of original main signal C/SL as intraframe averaged in the encoder of FIG. 1a.

Figure 15:
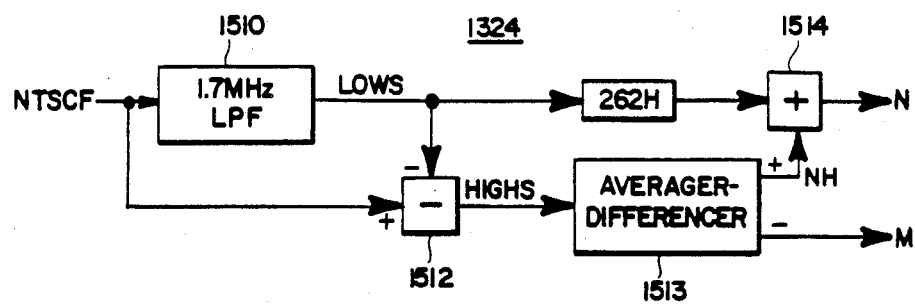
Figure 16:
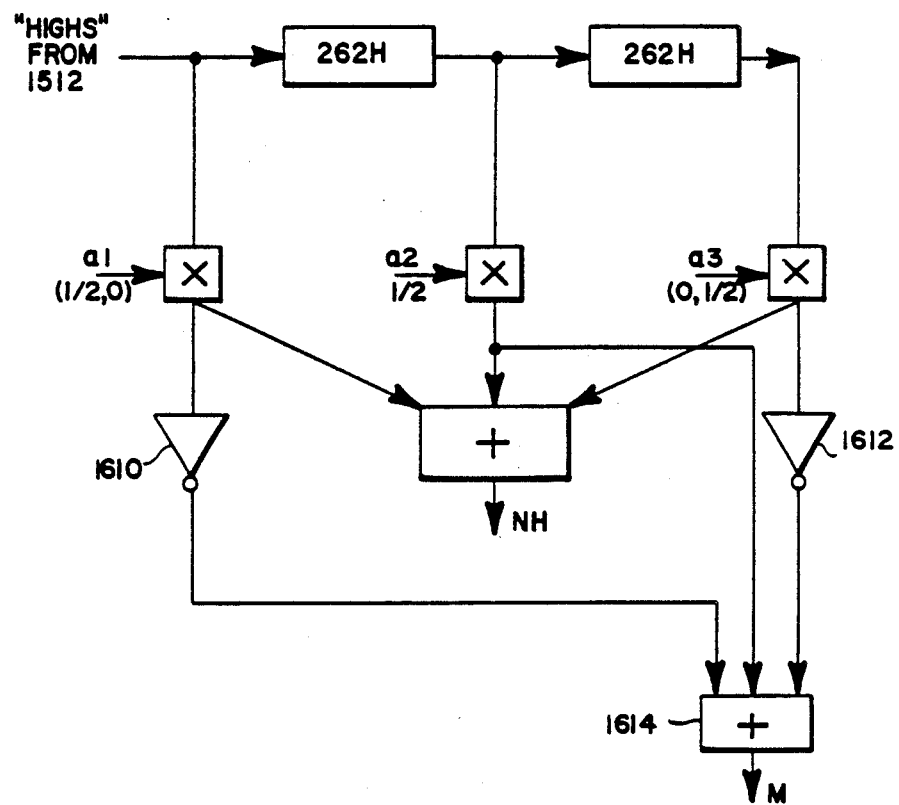

Details of averager-differencer unit 1324 are shown in FIG. 15. Signal NTSCF is low pass filtered by unit 1510 to produce a "LOWS" component which is subtractively combined with signal NTSCF in a unit 1512 to produce the "HIGHS" component of signal NTSCF. This component is delayed by one field period, averaged (additively combined) and differenced (subtractively combined) by a unit 1513 to produce an averaged highs component NH at an averaging output (+), and signal M at a differencing output (−). Exemplary circuitry for use as the averager-differencer 1513 is shown in FIG. 16. Component NH is summed in an adder 1514 with a 262H delayed output signal from filter 1510 to produce signal N.

Figure 27:
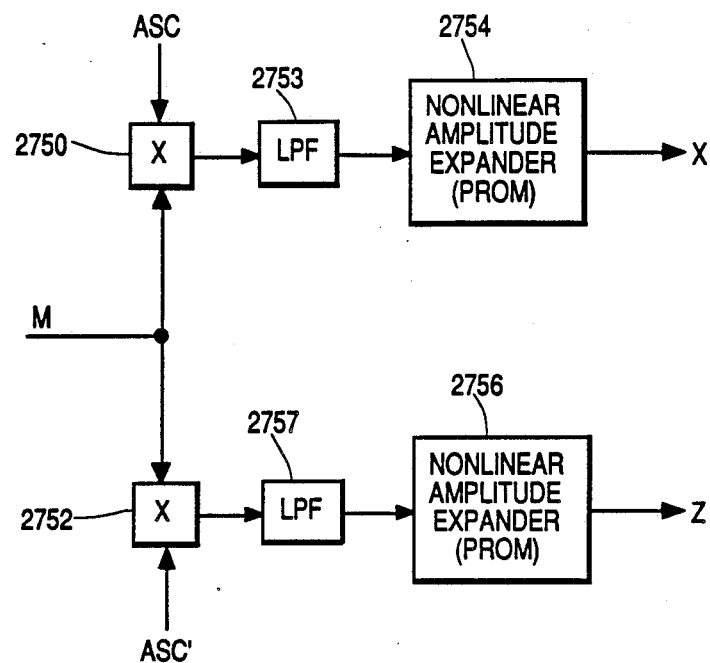

Referring to FIG. 13, the signal M is coupled to a quadrature demodulator and amplitude expander unit 1326 for demodulating auxiliary signals X and Z in response to alternate subcarrier signals ASC and ASC' which have the same characteristics as the signals ASC and ASC' described above in reference to the widescreen EDTV encoder circuitry. Demodulated signals X and Z contain information which is essentially visually identical to image information of signal ESH and of the output signal from unit 74 in FIG. 1a, respectively, due to the high intraframe image correlation of these signals as intraframe averaged by the encoder of FIG. 1a. Exemplary circuitry which may be used for the quadrature demodulator and amplitude expander 1326 is shown in FIG. 27. This circuitry includes two multipliers 2750 and 2752 which multiply the signal M by ASC and ASC', respectively. The signals provided by the multipliers 2750 and 2752 are filtered by respective low-pass filters 2753 and 2757, which have a passband from, for example 0 to 1.5 MHz. The filters 2752 and 2757 remove unwanted high-frequency modulation components. The signals provided by the filters 2753 and 2757 are subject to an inverse gamma function, via the PROM's 2754 and 2756 respectively, to produce the signals X and Z.

Referring to FIG. 13, a unit 1328 time compresses the color encoded side panel highs (signal X) so that they occupy their original time slots, thereby recovering signal NTSCH. The signal NTSCH is substantially identical to the signal NTSCH described above in reference to FIG. 1a.

A luminance (Y) highs decoder 1330 decodes the luminance horizontal highs (signal E) into widescreen format. The sides are time expanded to reverse the time compression performed by the encoder of FIG. 1a, and the center is time compressed to reverse the time expansion performed by the encoder of FIG. 1a.

Figure 17:
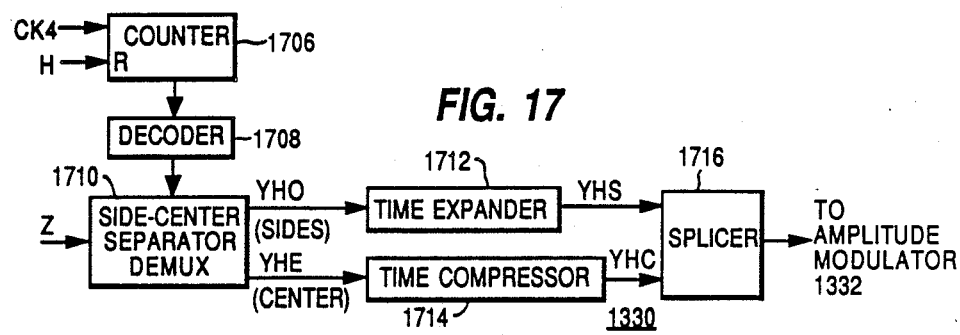

In FIG. 17, which shows details of unit 1330 of FIG. 13, signal Z is applied to a side-center separator (demultiplexer) 1710 which provides separated luminance highs side and center signals, YHO and YHE respectively. The demultiplexer 1710 is controlled by a counter 1706 and a decoder 1708. The counter 1706 is reset by the signal H at a time corresponding to the first active pixel of the signal Z and is clocked by the 4×fsc signal CK4 to count the pixels of the signal Z. The decoder 1708 is responsive to a count value signal provided by the counter 1706 to produce a control signal which conditions the demultiplexer 1710 to direct side panel pixels (count values 0–13 and 740–753) to the signal YHO and to direct the center panel pixels (count values 14–739) to the signal YHE. The signals YHO and YHE are respectively time expanded and time compressed by units 1712 and 1714 using mapping techniques, described above in reference to FIGS. 12 and 12a through 12d to produce signals representing the luminance high frequency components for the sides and center of the image, YHS and YHC, respectively. These signals are spliced by a unit 1716.

Figure 14:
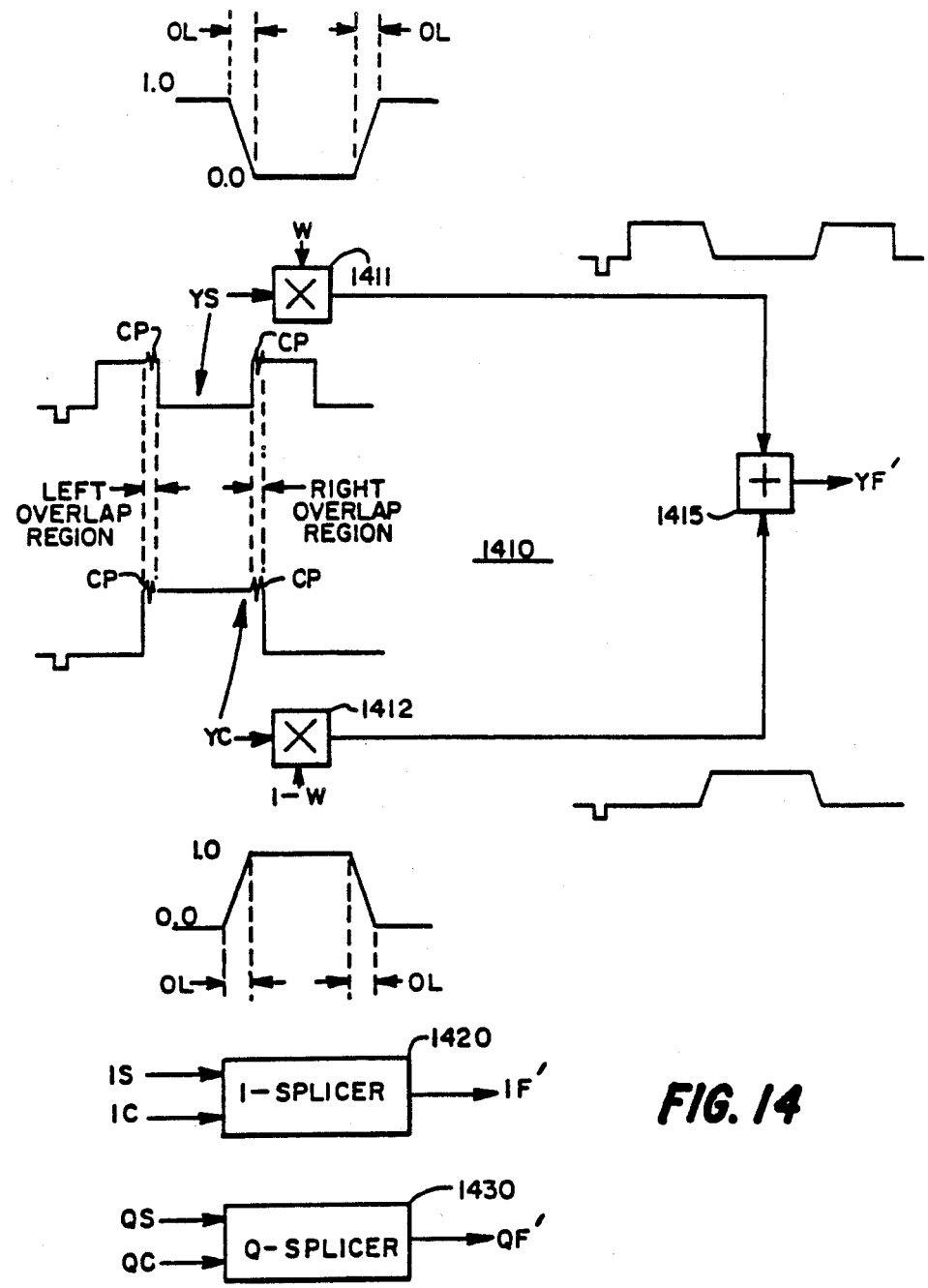

FIG. 14 depicts side panel-center panel splicing apparatus suitable for use as splicer 1716. In FIG. 14, the splicer is shown as comprising a network 1410 for producing full bandwidth luminance signal YF' from side panel luminance signal component YS and center panel luminance signal component YC, as well as an I signal splicer 1420 and a Q signal splicer 1430 which are identical in structure and operation to network 1410. The center panel and the side panels are purposely overlapped by, for example, ten pixels; the center and side panel signals have shared several redundant pixels throughout the signal encoding and transmission process as illustrated by FIG. 3.

In the widescreen receiver, the center and side panels are reconstructed from their respective signals, but because of the time expansion, time compression and filtering performed on the side and center panel signals, several pixels at the side and center panel boundaries are corrupted, or distorted. The overlap regions (OL) and corrupted pixels (CP; slightly exaggerated for clarity) are indicated by the waveforms associated with signals YS and YC in FIG. 14. If the panels had no overlap region, the corrupted pixels would be abutted against each other, and a seam would be visible. An overlap region ten pixels wide has been found to be wide enough to compensate for three to five corrupted boundary pixels.

In the splicer 1410, a multiplier 1411 multiplies side panel signal YS by a weighting function W in the overlap regions, as illustrated by the associated waveform. The signal produced by the multiplier 1411 is applied to a signal combiner 1415. Similarly, a multiplier 1412 multiplies center panel signal YC by a complementary weighting function (1−W) in the overlap regions, as illustrated by the associated waveform, and applies the resultant signal to the combiner 1415. The weighting functions W and 1−W exhibit a linear ramp-type characteristic over the overlap regions and contain values between 0 and 1. After weighting, the side and center panel pixels are summed by combiner 1415 so that each reconstructed pixel is a linear combination of side and center panel pixels.

The weighting functions preferably should approach unity near the innermost boundary of the overlap region, and should approach zero at the outermost boundary. This will insure that the corrupted pixels have relatively little influence on the reconstructed panel boundary.

Weighting functions W and 1−W can be readily generated by a network including a look-up table (not shown) responsive to an input signal representative of pixel positions, and a subtractive combiner not shown). The look-up table is programmed to provide ramp function output values from 0 to 1 in the overlap region, in response to the input signal. The input signal can be developed in a variety of ways, such as by a pixel counter which is reset by the signal H.

Referring to FIG. 13, an amplitude modulator 1332 amplitude modulates the signal from decoder 1330 on a 5.0 MHz carrier fc. The amplitude modulated signal is afterwards high pass filtered by a filter 1334 with a 5.0 MHz cut-off frequency to remove the lower sideband. In the output signal from filter 1334, center panel frequencies of 5.0 to 6.2 MHz are recovered, and side panel frequencies of 5.0 to 5.2 MHz are recovered. The signal from filter 1334 is applied to an adder 1336.

Signal NTSCH from compressor 1328 is applied to a unit 1340 which separates the luminance highs from the chrominance highs to produce signals YH, IH and QH. This can be accomplished by the arrangement of FIG. 18.

Figure 18:
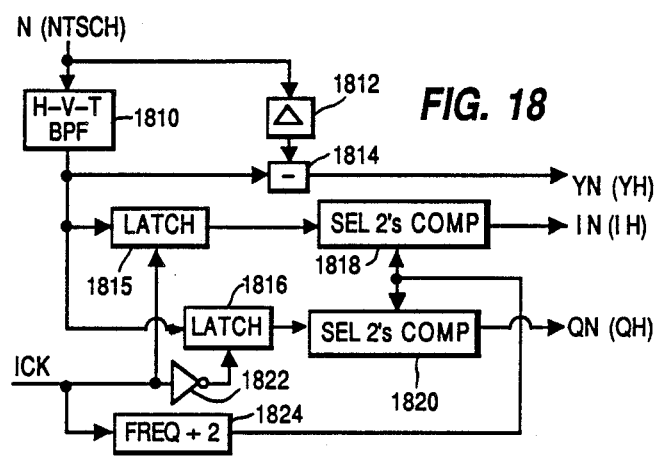

In FIG. 18 an H-V-T bandpass filter 1810, which has the configuration of FIG. 10c and a passband of 3.58 ±0.5 MHz, passes chrominance-band components of the signal NTSCH to a subtractive combiner 1814, which receives the signal NTSCH that has been delayed through a transit time equalizing delay 1812. The separated luminance highs signal YH appears at the output of combiner 1814. The filtered signal NTSCH from filter 1810 is quadrature demodulated by circuitry which includes latches 1815 and 1816, selective twos complementing circuits 1818 and 1820, an inverter 1822 and a frequency divider 1824. The latches 1815 and 1816 are responsive to the signal ICK and its logical inverse, respectively, to sore samples representing the respective I and Q color difference signals. As set forth above, in reference to FIG. 9, these samples alternate in polarity. To invert the polarity of alternate ones of each of the I and Q color difference samples, the demodulator includes the selective two's complementing circuits 1818 and 1820. These circuits are responsive to a signal provided by the frequency divider 1824, having a frequency that is half the frequency of the signal ICK to invert only alternate ones of the sample values provided by the latches 1815 and 1816. The output signals of the two's complementing circuits 1818 and 1820 are the respective color difference signals IH and QH.

Signal N from unit 1324 is separated into its consituent luminance and chrominance components YN, IN and QN by means of a luminance-chrominance separator 1342 which may be the same as the separator 1340, described above.

Signals YH, IH, QH and YN, IN, QN are provided as inputs to a Y-I-Q format decoder 1344 which decodes the luminance and chrominance components into widescreen format. Details of decoder 1344 are shown in FIG. 19.

Figure 19:
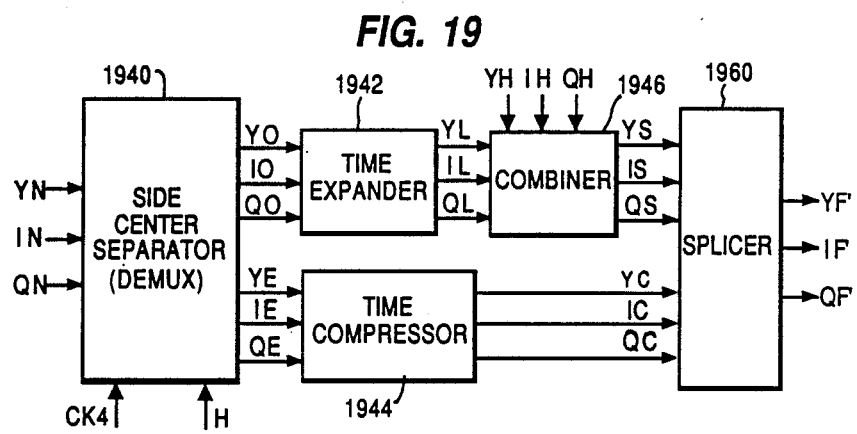

In FIG. 19, signals YN, IN and QN are separated into compressed side panel lows YO, IO, QO and into expanded center panel signals YE, IE, QE by means of a side-center panel signal separator (time de-multiplexer) 1940. Demultiplexer 1940 can employ the principles of demultiplexer 1710 and its peripheral circuits 1706 and 1708 discussed previously in reference to FIG. 17.

Signals YO, IO and QO are time expanded by a side expansion factor (the inverse of the side compression factor in the encoder of FIG. 1a) by means of a time expander 1942 to restore the original spatial relationship of the side panel lows in the widescreen signal, as represented by restored side panel lows signals YL, IL and QL. Similarly, to make room for the side panels, center panel signals YE, IE and QE are time compressed by a center compression factor (the inverse of the center expansion factor in the encoder of FIG. 1a) by means of a time compressor 1944 to restore the original spatial relationship of the center panel signal in the widescreen signal. The output signals produced by the compressor 1944 are the restored center panel signals YC, IC and QC. Compressor 1944 and expander 1942 can be of the type described above in reference to FIG. 12.

Spatially restored side panel highs YH, IH and QH are combined with spatially restored side panel lows YL, IL and QL by a combiner 1946 to produce reconstructed side panel signals YS, IS and QS. These signals are spliced to the reconstructed center panel signal YC, IC and QC by means of a splicer 1960 to form a partially reconstructed widescreen luminance signal $YF_o'$ and reconstructed widescreen color difference signals IF' and QF'. Splicing of the side and center panel signal components is accomplished in a manner which virtually eliminates a visible seam at the boundary between the center and side panels, apparatus suitable for use as the splicer 1960 is described above in reference to FIG. 14.

Referring to FIG. 13, the signal $YF_o'$ provided by the decoder 1344 is coupled to the adder 1336 where it is summed with the high frequency luminance signal from filter 1334 to generate a reconstructed wide bandwidth luminance signal, YF'.

Signals YF', IF' and QF' are converted from interlaced to progressive scan format by means of converters 1350, 1352 and 1354, respectively. Luminance progressive scan converter 1350 also responds to "helper" luminance signal YT from a format decoder 1360, which decodes encoded "helper" signal YTN. Decoder 1360 decodes signal YTN into widescreen format, and exhibits a configuration of the type shown in FIG. 17.

The I and Q converters 1352 and 1354 convert interlace scan signals to progressive scan signals by temporally averaging lines one frame apart to produce the missing progressive scan line information. This can be accomplished by apparatus of the type shown in FIG. 20.

In FIG. 20, interlace signals IF' (or QF') are delayed 263H by an element 2010 and then applied to the input port of a dual-port memory 2020. This delayed signal is subjected to an additional 262H delay by an element 2012 before being added to the undelayed input signal in adder 2014. The output signal from adder 2014 is coupled to a divide-by-two network 2016. The signal produced by the network 2016 is applied to the input port of a dual-port memory 2018. Memories 2020 and 2018 accept data at a 4×fsc rate and provide data at an 8×fsc rate. The output ports of the memories 2018 and 2020 are coupled to a multiplexer (MUX) 2022 which switches between the signals provided by the memories 2018 and 2020 to produce an output progressive scan signal IF(QF). Also shown in FIG. 20 are waveforms illustrative of the interlace input signal (two lines, with pixel samples C and X designated) and the proscan output signal comprising pixel samples C and X.

The luminance progressive scan converter unit 1350 is similar to that shown in FIG. 20, except that signal YT is added as shown by the arrangement of FIG. 21.

Referring to FIG. 13, widescreen progressive scan signals YF, IF and QF provided by the converters 1350, 1352 and 1354 are converted to analog form by means of a digital-to-analog converter 1362 which produces signals Y, I and Q that are applied to a video signal processor and matrix amplifier unit 1364. The video signal processor component of unit 1364 includes signal amplifying, DC level shifting, peaking, brightness control, contrast control and other conventional video signal processing circuits. Matrix amplifier 1364 combines luminance signal Y with color difference signals I and Q to produce color image representative video signals R, G and B. These color signals are amplified by display driver amplifiers in unit 1364 to a level suitable for directly driving a widescreen color image display device 1370, e.g. a widescreen kinescope.

What is claimed is:

1. Apparatus comprising:
   a source of television signal having a main signal component including a luminance signal sub-component and a color information signal sub-component, an encoded augmentation signal component, and a training signal component;
   signal separating means, coupled to said source, for separating said main signal component, said encoded auxiliary signal component and said training signal component from said video signal;
   main signal processing means, coupled to said signal separating means, for separating the luminance signal sub-component and the color information signal sub-component from said main signal component;
   means, coupled to said signal separating means, for processing said training signal component to develop a time-reference signal;
   decoding means, coupled to said signal separating means and responsive to said time-reference signal for decoding said encoded augmentation signal component to generate a decoded auxiliary signal;
   means for combining said decoded auxiliary signal with one of said luminance signal sub-component and said color information signal sub-component to generate video signals representing an enhanced video image.

2. The apparatus set forth in claim 1, wherein:
   said television signal includes first and second synchronizing signal components having a mutual phase relationship which repeats with a period of N field intervals, where N is a positive integer greater than one;
   said training signal is reversed in polarity for one out of every N field intervals to indicate the phase relationship; and
   said means for processing said training signal includes means responsive to the polarity of said training signal for generating said first and second synchronizing signal components having substantially said mutual phase relationship.

3. The apparatus set forth in claim 1 wherein:
   said training signal includes plural repetitions of a basic training signal and occurs during a portion of one horizontal line period in each field period of said television signal;
   said means for processing said training signal includes:
   sample value accumulating means for combining the plural repetitions of the basic training signal occurring during one field period of said television signal to develop an accumulated basic training signal; and
   means for correlating said accumulated basic training signal to a reference training signal to to generate said time-reference signal.

4. The apparatus set forth in claim 3 wherein:
   said training signal includes an in-phase component and a quadrature phase component;
   said sample value accumulating means includes means for separately combining the plural repetitions of the in-phase and quadrature phase components of said basic training signal to develop respective in-phase and quadrature phase accumulated basic training signals; and
   said means for correlating includes means for correlating said in-phase and quadrature phase accumulated training signals with in-phase and quadrature phase reference training signals to generate said time reference signal.

5. The apparatus set forth in claim 3 wherein said basic training signal and said reference training signal represent a pseudo-random noise sequence.

6. The apparatus set forth in claim 3 wherein:
   said basic training signal is a time-reversed all-pass filtered raised-cosine 2T pulse;
   said reference training signal is a time-reversed raised-cosine 2T pulse; and
   said means for correlating includes: means for filtering said basic training signal to generate a modified training signal representing a time-reversed raised-cosine 2T pulse; and means for correlating said modified training signal to said reference training signal.

7. The apparatus set forth in claim 1, wherein:
the color information signal sub-component of said main signal component includes first and second color difference signals which modulate a suppressed subcarrier signal in quadrature and a color reference burst signal having substantially the same frequency as said suppressed subcarrier signal;
said means for processing said training signal includes means responsive to said to said color reference burst signal and to said training signal for generating a reference oscillatory signal; and
said main signal processing means includes means, responsive to said reference oscillatory signal, for demodulating the color information signal sub-component of said main signal component to obtain said first and second color difference signals.

8. The apparatus set forth in claim 7 wherein:
the television signal provided by said source represents an image having significantly greater horizontal detail than a conventional television image;
said main signal component includes said luminance signal sub-component and said color information signal sub-component which represent an image having substantially the same level of horizontal detail as said conventional television image;
said auxiliary signal component includes a frequency-shifted, high-pass filtered luminance signal, representing the difference in horizontal detail between the image represented by the signal provided by said source and the image represented by said main signal component, and occupying a band of frequencies within the band of frequencies occupied by said main signal component;
said means for processing said training signal includes means responsive to said time-reference signal and to said reference oscillatory signal for generating an oscillatory carrier signal;
said decoding means includes means for heterodyning said oscillatory carrier signal with said frequency-shifted, high-pass filtered luminance signal to generate a high-pass filtered luminance signal; and
said combining means includes means for additively combining said high-pass filtered luminance signal and said main signal component to generate said video signals representing said enhanced video image, having greater horizontal detail than said conventional television image.

9. The apparatus set forth in claim 8, wherein:
the frequency-shifted, high-pass filtered luminance signal of said auxiliary signal component modulates a suppressed alternate subcarrier signal having a frequency within the band of frequencies occupied by said main signal component;
said means for processing said timing signal includes means responsive to said time-reference signal and to said reference oscillatory signal for regenerating said alternate subcarrier signal; and
said decoding means includes means, responsive to said auxiliary signal component and to said regenerated alternate subcarrier signal, for demodulating said frequency-shifted high-pass filtered luminance signal.

10. The apparatus set forth in claim 1, wherein:
the television signal provided by said source represents a widescreen image having an aspect ratio greater than a conventional aspect ratio;
said main signal component includes first, second and third portions representing respective center panel and left and right side panel portions of said widescreen image, wherein said center panel portion has an aspect ratio substantially equal to said conventional aspect ratio, and wherein said second and third portions represent relatively low detail information in the side panel portions of said widescreen image;
said auxiliary signal component includes first and second portions representing relatively high detail information in the respective left and right side panel portions of said widescreen image; and
said decoding means includes means, responsive to said time-reference signal, for aligning the first and second portions of said encoded auxiliary signal component with the respective second and third portions of said main signal signal component to produce said decoded auxiliary signal component.

11. A system for controlling the relative timing of a plurality of signal components of an augmented video signal, comprising:
a source of augmented video signal including main and auxiliary component signals;
a source of training signal representing a predetermined instant in a horizontal line period of said video signal;
means for combining said augmented video signal and said training signal to generate a transmitted signal;
means, coupled to receive said transmitted signal, for separating the training signal from said transmitted signal;
means for processing said training signal to generate a time-reference signal indicative of said predetermined instant;
means, coupled to receive said transmitted signal, for separating the main and auxiliary component signals therefrom;
means, responsive to said time-reference signal, for aligning said main and auxiliary signals to produce time-aligned main and auxiliary signals;
means for combining said tim-aligned main and auxiliary signals to generate video signals representing an enhanced image.

12. The system set forth in claim 11, wherein: said source of augmented video signal includes:
a source of enhanced video signal representing a widescreen image having an aspect ratio greater than a conventional aspect ratio;
means for separating said enhanced video signal into said main and auxiliary signal components, said main signal component representing an image having a conventional aspect ratio and said auxiliary signal component representing an enhancement signal for reconstructing with said main signal component, said widescreen image;
said source of said training signal includes timing means for generating a composite synchronizing signal including horizontal and vertical synchronizing signal components and a color reference burst signal component, and said training signal, wherein said predetermined instant is defined relative to a pulse of said horizontal synchronizing signal; and
said means for combining includes:
means for combining said main and auxiliary signal components with said composite synchronizing signal to generate a combined signal; and means for inserting said training signal between two consecutive pulses of said horizontal synchronizing signal component of said combined signal to generate said transmitted video signal.

13. The system set forth in claim 12, wherein said timing means includes:
   means for generating a basic training signal having a predetermined displacement in time from said pulse of said horizontal synchronizing signal; and
   means for repeating said basic training signal an integral number of times to generate said training signal.

14. The system set forth in claim 11 wherein said basic training signal is a pseudo-random noise sequence.

15. The system set forth in claim 12, wherein said basic training signal is a time-reversed, all-pass filtered, raised-cosine 2T pulse.

16. The system set forth in claim 12, wherein:
   said combined signal includes an active video interval which contains image information and a vertical blanking interval which contains no image information; and
   said training signal occurs within said active video interval.

17. The system set forth in claim 13, wherein said means for processing said training signal includes:
   sample value accumulating means, coupled to said means for separating said training signal from said transmitted signal, for combining instances of the repeated basic training signal from the training signal to generate an accumulated basic training signal; and
   means for correlating said accumulated basic training signal with a reference training signal to generate said time-reference signal.

18. The system set forth in claim 16 wherein:
   said training signal includes in-phase and quadrature-phase components;
   said sample value accumulating means includes means for separately combining the repeated instances of the respective in-phase and quadrature phase components of said training signal to generate respective in-phase and quadrature phase accumulated basic training signals; and
   said means for correlating includes complex value correlating means for correlating a first complex signal which includes said in-phase and quadrature phase accumulated basic training signals with a second complex signal which include in-phase and quadrature phase reference training signals, to generate said time reference signal.

19. A method of processing an augmented video signal which includes main and auxiliary video signal components and a training signal component that occurs within one horizontal line interval of said augmented video signal and includes multiple instances of a basic training signal, comprising the steps of:
   sampling the training signal component from the augmented video signal at instants determined by a sampling clock signal to generate a sampled data training signal;
   accumulating corresponding samples of said multiple instances of said basic training signal to generate an accumulated basic training signal;
   correlating said accumulated basic training signal with stored samples representing said basic training signal to generate a time-reference signal;
   separating said main and auxiliary video signal components from said augmented video signal;
   processing said main and auxiliary video signals in time relative to said time-reference signal to generate time-aligned main and auxiliary video signals;
   combining said time-aligned main and auxiliary video signals to generate video signals representing an enhanced image.

20. The method set forth in claim 19, wherein said correlating step includes the steps of:
   (1) establishing a first correspondence between the respective samples of said accumulated basic training signal and said stored basic training signal;
   (2) multiplicatively combining sample values of said accumulated basic training signal with corresponding sample values of said stored basic training signal to generate product samples;
   (3) summing said product samples to generate a trial sum value;
   (4) comparing said trial sum value against a maximum sum value and, if the magnitude of said trial sum value is greater than said maximum sum value, replacing said maximum sum value with said trial sum value and storing an indication of the correspondence between the respective samples of said accumulated basic training signal and said stored basic training signal as a maximum correspondence index;
   (5) incrementally changing the time correspondence between the respective samples of said accumulated basic training signal and said stored training signal;
   (6) repeating steps (2) through (5) until step (5) reestablishes said first correspondence; and
   (7) generating said time-reference signal indicative of said maximum correspondence index;

21. The method set forth in claim 20, wherein the step (2) includes the step of multiplying samples of said accumulated basic training signal by +1 and −1, respectively, when the corresponding samples of said stored basic training signal are of a first polarity and a second polarity, respectively.

* * * * *